US012676940B2

(12) United States Patent
Huang et al.

(10) Patent No.: US 12,676,940 B2
(45) Date of Patent: Jul. 7, 2026

(54) VIDEO RECORDING SETTING METHOD, DEVICE, AND COMPUTER-READABLE STORAGE MEDIUM

(71) Applicant: Honor Device Co., Ltd., Shenzhen (CN)

(72) Inventors: Yufei Huang, Shenzhen (CN); Jie Yi, Shenzhen (CN); Siyue Niu, Shenzhen (CN); Wenhan Feng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 61 days.

(21) Appl. No.: 18/864,733

(22) PCT Filed: Sep. 8, 2023

(86) PCT No.: PCT/CN2023/117879
§ 371 (c)(1),
(2) Date: Nov. 11, 2024

(87) PCT Pub. No.: WO2024/124993
PCT Pub. Date: Jun. 20, 2024

(65) Prior Publication Data
US 2025/0317527 A1     Oct. 9, 2025

(30) Foreign Application Priority Data

Dec. 13, 2022    (CN) .......................... 202211596283.1

(51) Int. Cl.
| | |
|---|---|
| *H04N 5/262* | (2006.01) |
| *H04N 7/01* | (2006.01) |
| *H04N 23/63* | (2023.01) |

(52) U.S. Cl.
CPC ........... *H04N 5/2621* (2013.01); *H04N 7/013* (2013.01); *H04N 23/632* (2023.01)

(58) Field of Classification Search
CPC ......... H04M 1/72403; H04M 1/72469; H04M 2250/52; H04N 23/45; H04N 23/62;
(Continued)

(56) References Cited

U.S. PATENT DOCUMENTS

| | | | |
|---|---|---|---|
| 2018/0063434 A1* | 3/2018 | Seol ...................... | G06V 40/197 |
| 2022/0224828 A1* | 7/2022 | Lim ........................ | H04N 23/63 |

(Continued)

FOREIGN PATENT DOCUMENTS

| | | |
|---|---|---|
| CN | 107395969 A | 11/2017 |
| CN | 108289167 A | 7/2018 |

(Continued)

OTHER PUBLICATIONS

Little C Chat Technology; "Don't make hand gestures when taking photos during the May Day holiday. Use your mobile phone to record multiple scenes and easily dominate your circle of friends";May 2, 2021; Retrieved from the internet, URL:https://v.qq.com/x/page/r32437g7rs1.html.

(Continued)

*Primary Examiner* — Amy R Hsu
(74) *Attorney, Agent, or Firm* — Slater Matsil, LLP

(57) ABSTRACT

This application provides a video recording setting method. The method includes: displaying, by the electronic device, a first video picture, a second video picture, and a first control; displaying, by the electronic device, a second control, a third control, and a fourth control in response to a first user operation performed on the first control, where the second control is displayed in a selected state, and the third control is displayed in an unselected state; stopping displaying, by the electronic device, the first video picture in response to a third user operation; and displaying, by the electronic device, the second control, the third control, and a fifth control in response to a fourth user operation performed on (Continued)

the first control, where the second control is displayed in an unselected state, and the third control is displayed in a selected state.

17 Claims, 67 Drawing Sheets

(58) Field of Classification Search
CPC .. H04N 23/631; H04N 23/632; H04N 23/667; H04N 23/90; H04N 5/2621; H04N 5/2624; H04N 5/772; H04N 7/013
See application file for complete search history.

(56) References Cited

U.S. PATENT DOCUMENTS

| | | | | |
|---|---|---|---|---|
| 2024/0129620 | A1* | 4/2024 | Wang | H04N 5/265 |
| 2024/0236596 | A1* | 7/2024 | Liu | H04N 21/4402 |
| 2024/0365008 | A1* | 10/2024 | Li | H04N 23/45 |

FOREIGN PATENT DOCUMENTS

| | | | |
|---|---|---|---|
| CN | 109525884 | A | 3/2019 |
| CN | 110012352 | A | 7/2019 |
| CN | 110784735 | A | 2/2020 |
| CN | 112954210 | A | 6/2021 |
| CN | 112954218 | A | 6/2021 |
| CN | 113573120 | A | 10/2021 |
| CN | 112770058 | B | 7/2022 |
| CN | 114845059 | A | 8/2022 |
| CN | 114915722 | A | 8/2022 |
| CN | 115002336 | A | 9/2022 |
| WO | 2020125410 | A1 | 6/2020 |
| WO | 2022252660 | A1 | 12/2022 |

OTHER PUBLICATIONS

ColorOS; "Multi-view video";Jul. 28, 2022; Retrieved from the internet, URL:https://weibo.com/tv/show/1034:4796244837728282.

* cited by examiner

VIDEO RECORDING SETTING METHOD, DEVICE, AND COMPUTER-READABLE STORAGE MEDIUM

CROSS-REFERENCE TO RELATED APPLICATIONS

This application is a national stage of International Application No. PCT/CN2023/117879, filed on Sep. 8, 2023, which claims priority to Chinese Patent Application No. 202211596283.1, filed on Dec. 13, 2022. The disclosures of both aforementioned applications are hereby incorporated by reference in their entireties.

TECHNICAL FIELD

This application relates to the field of photographing technologies, and specifically, to a video recording setting method, a device, and a computer-readable storage medium.

BACKGROUND

To improve user experience, electronic devices such as a mobile phone and a tablet computer are generally configured with a plurality of camera lenses. For example, currently, many mobile phones are configured with a plurality of front-facing camera lenses and a plurality of rear-facing camera lenses. Based on this, some mobile phones may further provide a user with a multi-lens video recording (which may also be referred to as dual-scene video recording, multi-scene video recording, dual-view video recording, and the like) function and the like in addition to providing the user with camera functions such as photographing and video recording. In various shooting modes provided by the multi-lens video recording function, one or more camera lenses may be used to perform shooting, for example, a front-rear dual-camera mode, a picture-in-picture mode, a front single-camera mode, a rear single-camera mode, and a rear-rear dual-camera mode. The user may select a corresponding camera function based on a requirement of the user to perform shooting. To reduce difficulty in video processing by the user, in an interface existing before shooting starts, the electronic device may display a beauty icon, allowing the user to trigger and select a beauty level. Then, in a video shooting process, the electronic device may process, based on settings of the user before shooting starts, a video shot in real time. However, in a conventional technology, beauty processing is generally performed on only one channel of video picture. For example, in the front-rear dual-camera mode, beauty processing is performed on only a picture shot by the front-facing camera lens. Consequently, user experience is poor.

SUMMARY

Embodiments of this application provide a video recording setting method, a device, and a computer-readable storage medium, to resolve a problem in a conventional technology that beauty processing can be performed on only one channel of video picture in a video shooting process.

According to a first aspect, an embodiment of this application provides a video recording setting method, applied to an electronic device including a front-facing camera lens and a rear-facing camera lens, where the method includes:

The electronic device displays a first video picture, a second video picture, and a first control, where the first video picture is a video picture collected in real time by the front-facing camera lens, the second video picture is a video picture collected in real time by the rear-facing camera lens, the first video picture has a first beauty effect, and the second video picture has a second beauty effect;

the electronic device displays a second control, a third control, and a fourth control in response to a first user operation performed on the first control, where the second control is displayed in a selected state, the third control is displayed in an unselected state, and the first video picture has a third beauty effect in response to a second user operation performed on the fourth control;

the electronic device stops displaying the first video picture in response to a third user operation; and the electronic device displays the second control, the third control, and a fifth control in response to a fourth user operation performed on the first control, where the second control is displayed in an unselected state, the third control is displayed in a selected state, and the second video picture has a fourth beauty effect in response to a fifth user operation performed on the fifth control.

In a possible implementation, the third user operation is an operation of selecting a multi-lens video recording mode by a user, and before the third user operation is performed, an operation of invoking the multi-lens video recording mode may be further included. This is not specifically limited herein.

In a possible implementation, the electronic device adjusts a frame rate of the first video picture in response to the second user operation performed on the fourth control; and the electronic device adjusts a frame rate of the second video picture in response to the fifth user operation performed on the fifth control.

In a possible implementation, after the electronic device stops displaying the first video picture in response to the third user operation, the method further includes: The electronic device adjusts a display ratio of the second video picture.

In a possible implementation, before the electronic device receives the third user operation, the method further includes: In response to a sixth user operation performed on the third control, the electronic device stops displaying the fourth control, displays the fifth control, displays the second control in an unselected state, and displays the third control in a selected state, where the second video picture has a fifth beauty effect in response to a seventh user operation performed on the fifth control.

In a possible implementation, before the electronic device receives the fifth user operation, the method further includes: In response to an eighth user operation performed on the second control, the electronic device stops displaying the fifth control, displays the fourth control, displays the second control in a selected state, and displays the third control in an unselected state; and in response to a ninth user operation performed on the fourth control, the electronic device stores a sixth beauty effect that is set by a user.

In a possible implementation, after in response to a ninth user operation performed on the fourth control, the method further includes: The electronic device displays a third video picture in response to a tenth user operation, where the third video picture is a video picture collected in real time by the front-facing camera lens, and the third video picture has the sixth beauty effect.

In a possible implementation, the tenth user operation is an operation of selecting the multi-lens video recording mode by the user, and before the tenth user operation is performed, an operation of invoking the multi-lens video recording mode may be further included. This is not specifically limited herein.

In a possible implementation, after the electronic device displays the third video picture in response to the tenth user operation, the method further includes: The electronic device stops displaying the second video picture.

In a possible implementation, the first beauty effect, the second beauty effect, the third beauty effect, the fourth beauty effect, the fifth beauty effect, and the sixth beauty effect are beauty processing effects of video pictures corresponding to different beauty parameter values. The beauty parameter value may be 0-10, or may be 0-100. This is not specifically limited herein.

In a possible implementation, the first beauty effect, the second beauty effect, the third beauty effect, the fourth beauty effect, the fifth beauty effect, and the sixth beauty effect are beauty processing effects of video pictures corresponding to different beauty modes. The beauty mode may be a classic mode, a smooth mode, a skin tone mode, a whitening mode, and the like.

According to a second aspect, an embodiment of this application provides a video recording setting method, applied to an electronic device including a front-facing camera lens and a rear-facing camera lens, where the method includes:

The electronic device displays a first video picture, a second video picture, a second control, and a third control, where the first video picture is a video picture collected in real time by the front-facing camera lens, the second video picture is a video picture collected in real time by the rear-facing camera lens, the first video picture has a first beauty effect, and the second video picture has a second beauty effect;

in response to an eleventh user operation performed on the second control, the electronic device stops displaying the second control, and displays a fourth control, where the first video picture has a third beauty effect in response to a twelfth user operation performed on the fourth control; and in response to a thirteenth user operation performed on the third control, the electronic device stops displaying the third control, and displays the second control and a fifth control, where the second video picture has a fourth beauty effect in response to a fourteenth user operation performed on the fifth control.

In a possible implementation, the electronic device adjusts a frame rate of the first video picture in response to the twelfth user operation performed on the fourth control; and the electronic device adjusts a frame rate of the second video picture in response to the fourteenth user operation performed on the fifth control.

In a possible implementation, before the electronic device receives the eleventh user operation, the method further includes: The electronic device stops displaying the first video picture and the second control in response to a fifteenth user operation; and in response to a sixteenth user operation performed on the third control, the electronic device stops displaying the third control, and displays the fifth control, where the second video picture has a fifth beauty effect in response to a seventeenth user operation performed on the fifth control.

According to a third aspect, an embodiment of this application provides an electronic device, including one or more processors, a memory, and one or more computer programs, where the one or more computer programs are stored in the memory, the one or more computer programs include instructions, and when the instructions are executed by the electronic device, the electronic device is enabled to perform the method according to either the first aspect or the second aspect.

According to a fourth aspect, an embodiment of this application provides a computer-readable storage medium, including computer instructions, where when the computer instructions are run on an electronic device, the electronic device is enabled to perform the method according to either the first aspect or the second aspect.

According to the technical solutions provided in the embodiments of this application, in a multi-channel shooting mode, beauty processing can be performed on a plurality of channels of video pictures, thereby improving user experience.

DETAILED DESCRIPTION OF ILLUSTRATIVE EMBODIMENTS

Figure 1A:
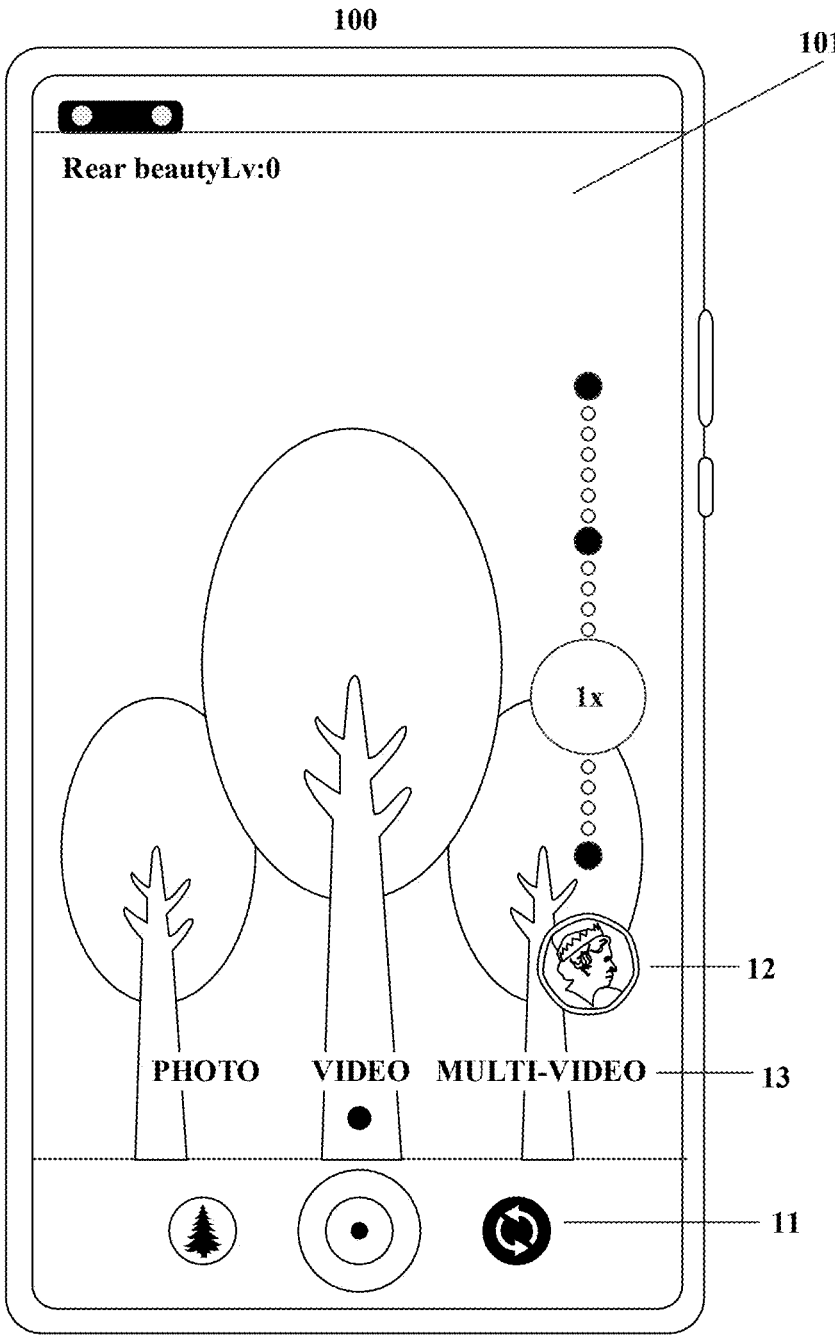
FIG. 1A is a schematic diagram of a video recording interface of a mobile phone according to an embodiment of this application.
Figure 1B:
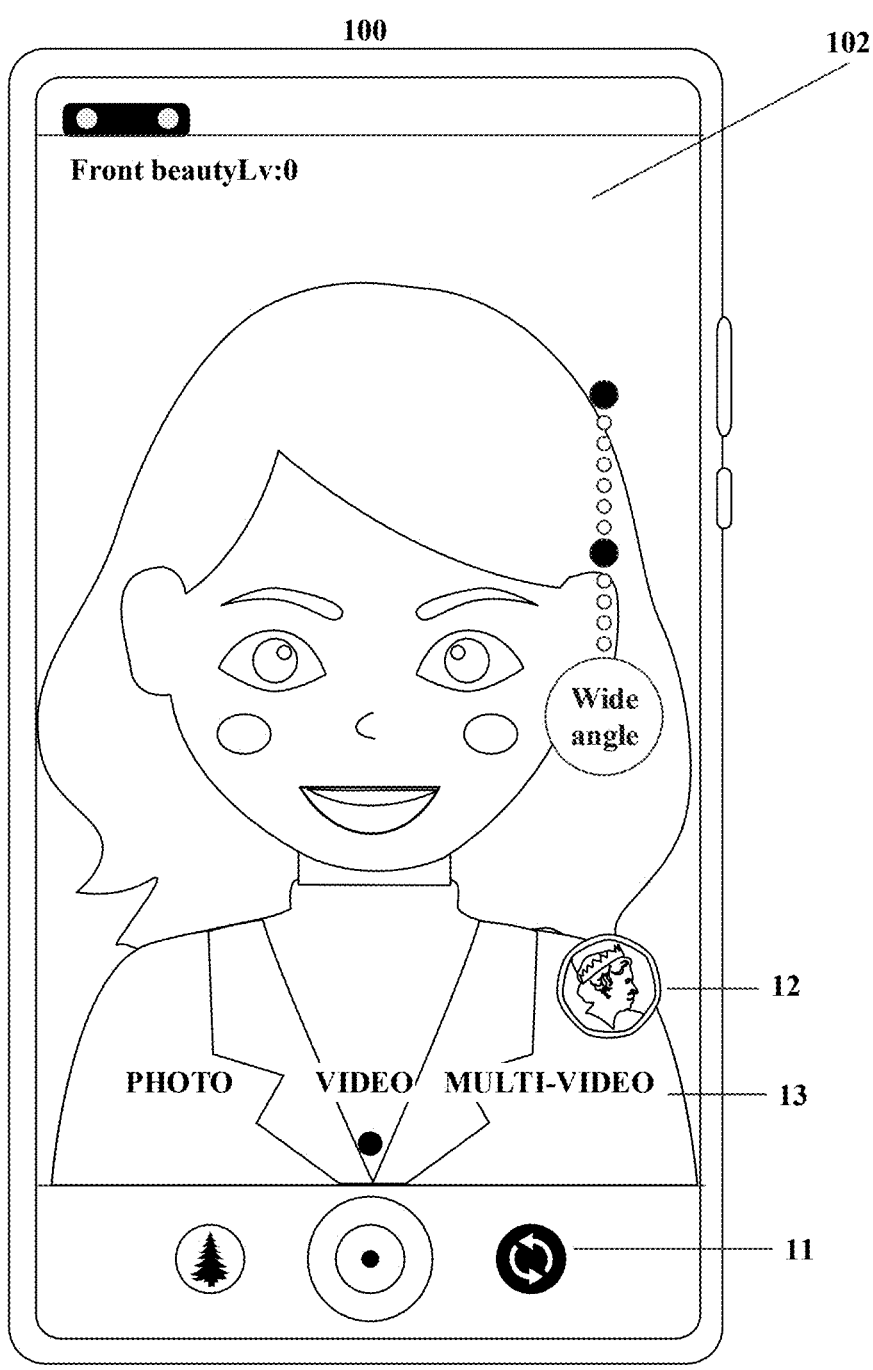
FIG. 1B is a schematic diagram of a video recording interface of a mobile phone according to an embodiment of this application.
Figure 1C:
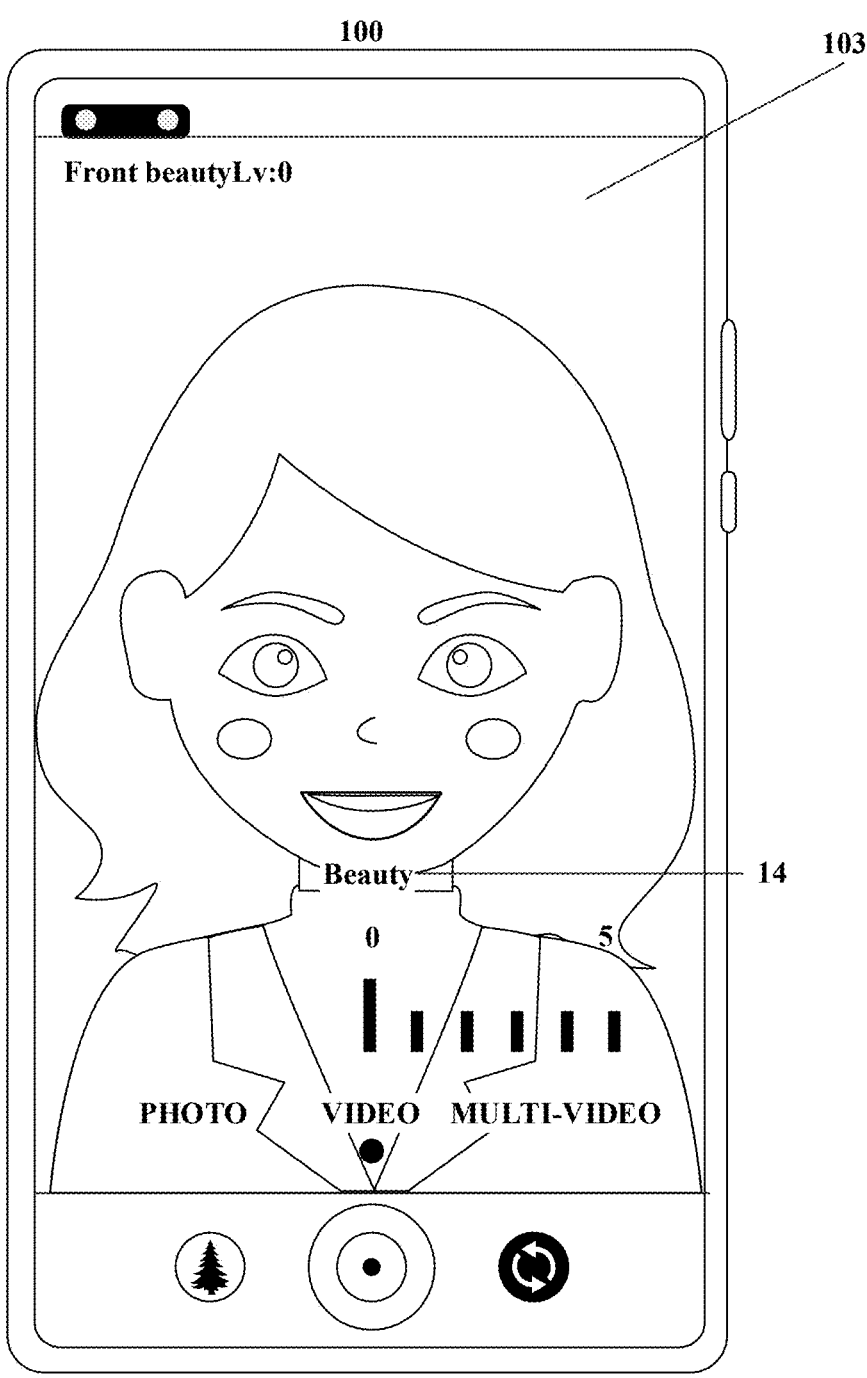
FIG. 1C is a schematic diagram of a video recording interface of a mobile phone according to an embodiment of this application.

The terms "first", "second", "third", and the like in the specification, claims, and accompanying drawings of this application are used to distinguish between different objects, but are not used to limit a specific sequence.

In the embodiments of this application, words such as "example" or "for example" are used to indicate an example, illustration, or description. Any embodiment or design solution described as "example" or "for example" in the embodiments of this application should not be explained as being preferred or advantageous over other embodiments or design solutions. Exactly, use of the words such as "example" or "for example" is intended to present related concepts in a specific manner.

To facilitate understanding of the solutions in this application, the following first describes various video recording modes in a video recording setting method applied to this application.

FIG. 1A-FIG. 1F are schematic diagrams of video recording/multi-lens video recording interface of a mobile phone according to an embodiment of this application. For example, when a user selects a video recording function on a camera application running on the mobile phone 100, the mobile phone 100 may display a camera interface 101 shown in FIG. 1A or a camera interface 102 shown in FIG. 1B. A background real-time image collected by a rear-facing camera lens is displayed in the camera interface 101. A foreground real-time image collected by a front-facing camera lens is displayed in the camera interface 102. The camera interface 101 and the camera interface 102 include a video recording mode switching control 11, and the mobile phone may receive a trigger operation (for example, a tap operation) of a user on the video recording mode switching control 11. The mobile phone switches between the camera interface 101 and the camera interface 102 in response to the trigger operation of the user on the video recording mode switching control 11. The camera interface 101 and the camera interface 102 further include a beauty control 12, and the mobile phone may receive a trigger operation (for example, a tap operation) of the user on the beauty control 12. In response to the trigger operation of the user on the beauty control 12, the mobile phone may display a camera interface 103 (for example, in FIG. 1C, a camera interface obtained after the user taps the beauty control 12 in the camera interface 102) shown in FIG. 1C. The mobile phone invokes a configuration control 14 of a beauty function, and an example of the configuration control of the beauty function is a skin beauty control. The mobile phone may select a corresponding beauty level in response to a trigger operation (such as a slide operation or a tap operation) of the user on the configuration control 14, so as to implement parameter configuration of the beauty function.

Figure 1D:
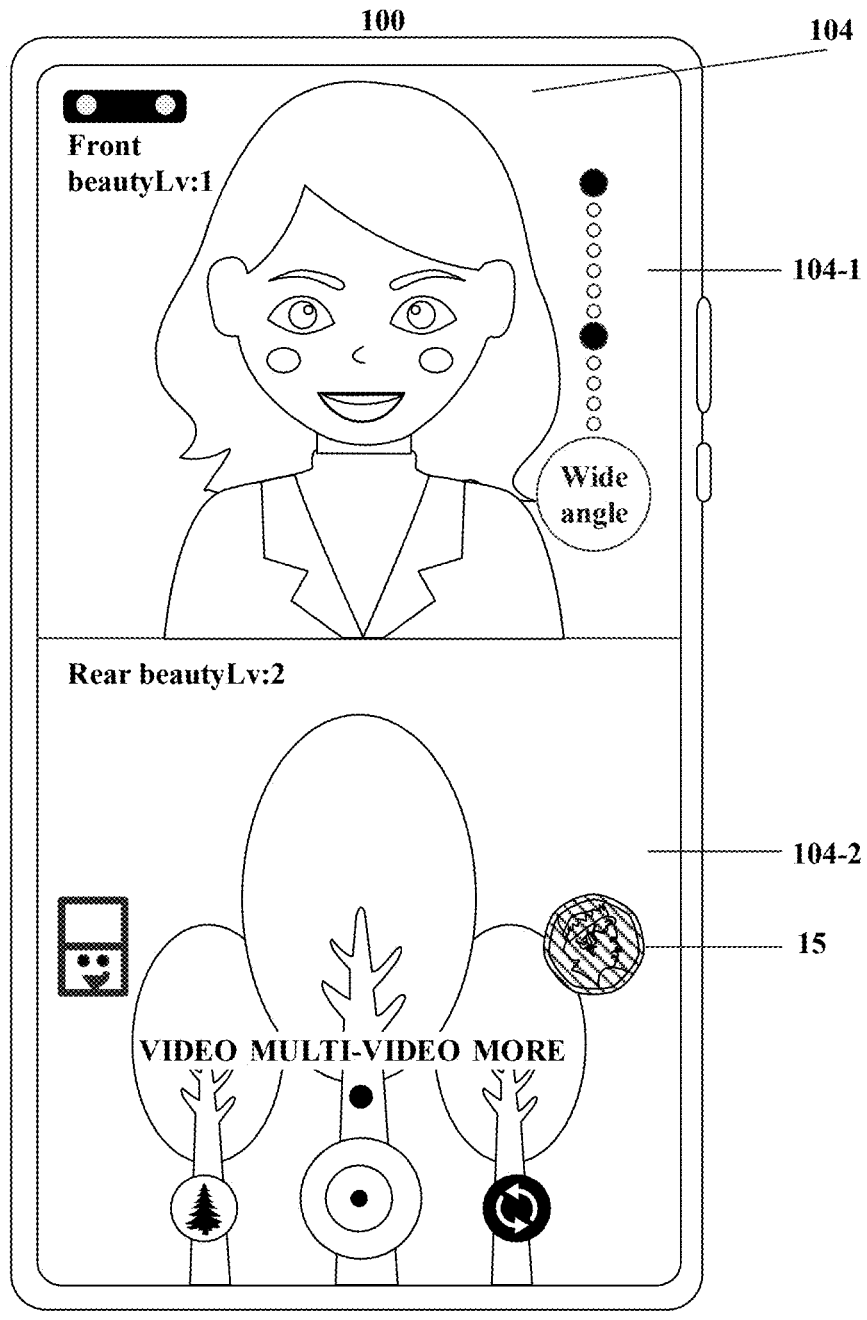
FIG. 1D is a schematic diagram of a multi-lens video recording interface of a mobile phone according to an embodiment of this application.

After the user taps the beauty control 12 in the camera interface 101 or the camera interface 102 to configure a beauty parameter, if a multi-lens video recording function 13 is selected, the mobile phone 100 may display a camera interface 104 shown in FIG. 1D. The camera interface 104 includes a foreground real-time image 104-1 collected by the front-facing camera lens and a background real-time image 104-2 collected by the rear-facing camera lens. The camera interface 104 includes a beauty control 15. The beauty control 15 is in an enabled state, to indicate that the beauty parameter value is not 0, and an example of the enabled state is that the control is highlighted. For example, in the camera interface 104 shown in FIG. 1D, a front beauty parameter value is 1, and a rear beauty parameter value is 2. In this case, the beauty control 15 is in an enabled state. In addition, in the camera interface 104, if the front beauty parameter value is 1 and the rear beauty parameter value is 0, or the front beauty parameter value is 0 and the rear beauty parameter value is 2, the beauty control 15 is also in an enabled state, that is, the beauty control 15 being in an enabled state may be used to indicate that the beauty parameter value is in a non-o state.

To facilitate understanding of this embodiment of this application, the user sets a beauty parameter of a front-facing camera or a beauty parameter of a rear-facing camera in one mode. During switching to another different mode, the beauty parameter of the front-facing camera or the beauty parameter of the rear-facing camera inherits a parameter value that is previously set. The figure shows that front beautyLv represents the front beauty parameter value, and rear beautyLv represents the rear beauty parameter value. That is, after the user sets a beauty parameter of the camera each time, the mobile phone records and stores the beauty parameter that is set. Before next setting, regardless of which mode the user enables for video recording or multi-lens video recording, the mobile phone processes, based on the stored beauty parameter, an image collected in real time. However, the front beautyLv and the rear beautyLv may not be displayed in a camera interface of an actual product. Instead, an image in the camera interface of the actual product is an image processed based on a beauty parameter that is previously set. If beautyLv is 0, the mobile phone does not perform beauty processing on a corresponding video picture. If beautyLv is not 0, the mobile phone performs beauty processing on a corresponding video picture at a corresponding level. In some other embodiments, the beauty control 15 being in an enabled state may be further used to indicate that the mobile phone is performing beauty processing on the video picture.

Figure 1E:
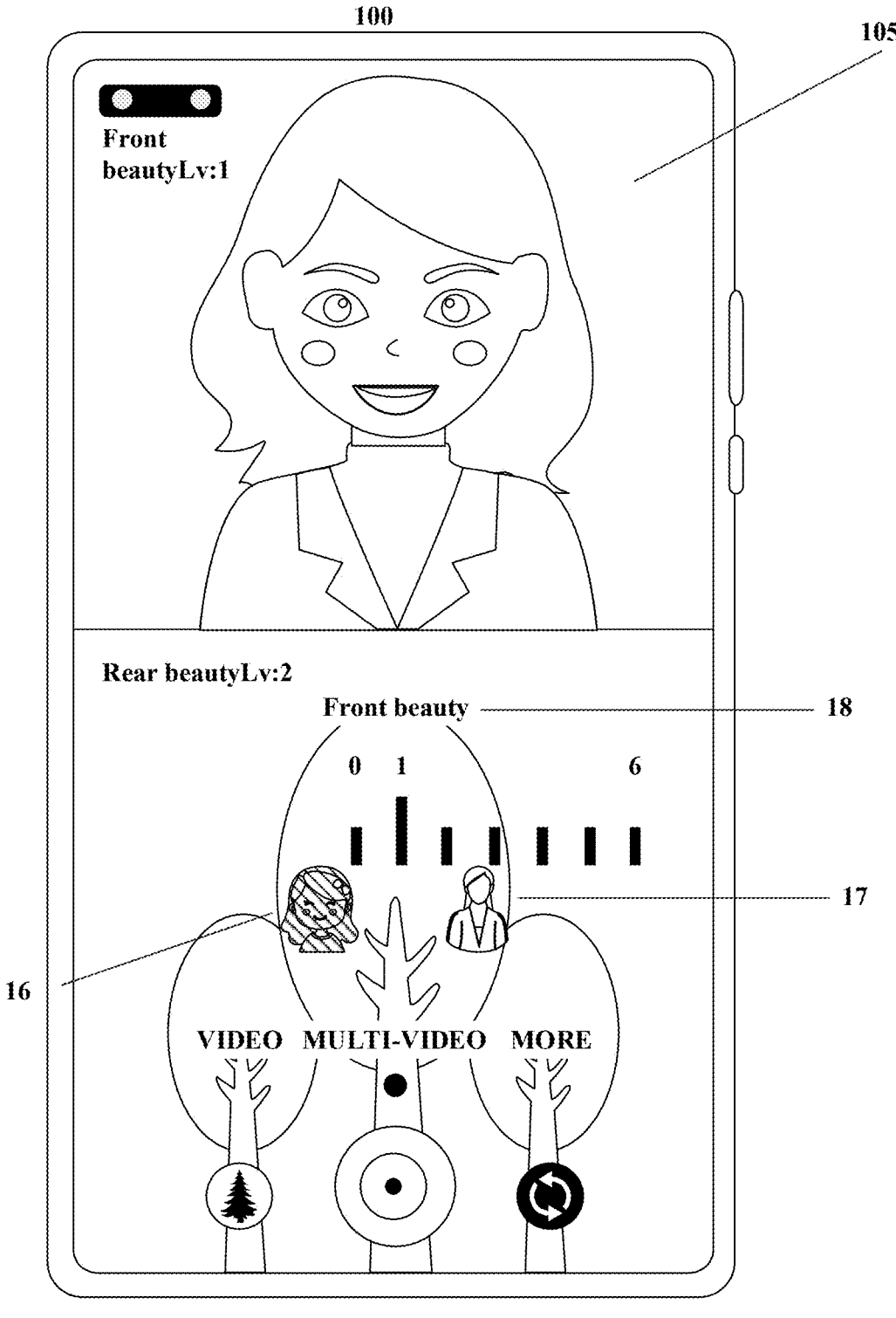
FIG. 1E is a schematic diagram of a multi-lens video recording interface of a mobile phone according to an embodiment of this application.

If the user taps the beauty control 15, the mobile phone 100 may display a camera interface 105 shown in FIG. 1E. The beauty control 15 expands into a front beauty control 16, a rear beauty control 17, and a configuration control 18 (hereinafter referred to as a front configuration control) of a front beauty function. The front beauty control 16 is in a selected state, to indicate that the mobile phone is currently in a front beauty parameter adjustment state. The rear beauty control 17 is in an unselected state. An example of the selected state is that the control is highlighted. An example of the unselected state is that the control is darkened. The user may configure a front beauty parameter by adjusting the front configuration control 18. FIG. 1E shows the following example: After the user taps the beauty control 12 in the camera interface 102 to configure the front beauty parameter value as 1, the front beauty parameter value displayed in the camera interface 105 is 1, that is, after the user configures the front beauty parameter, the mobile phone 100 may store the front beauty parameter value.

Figure 1F:
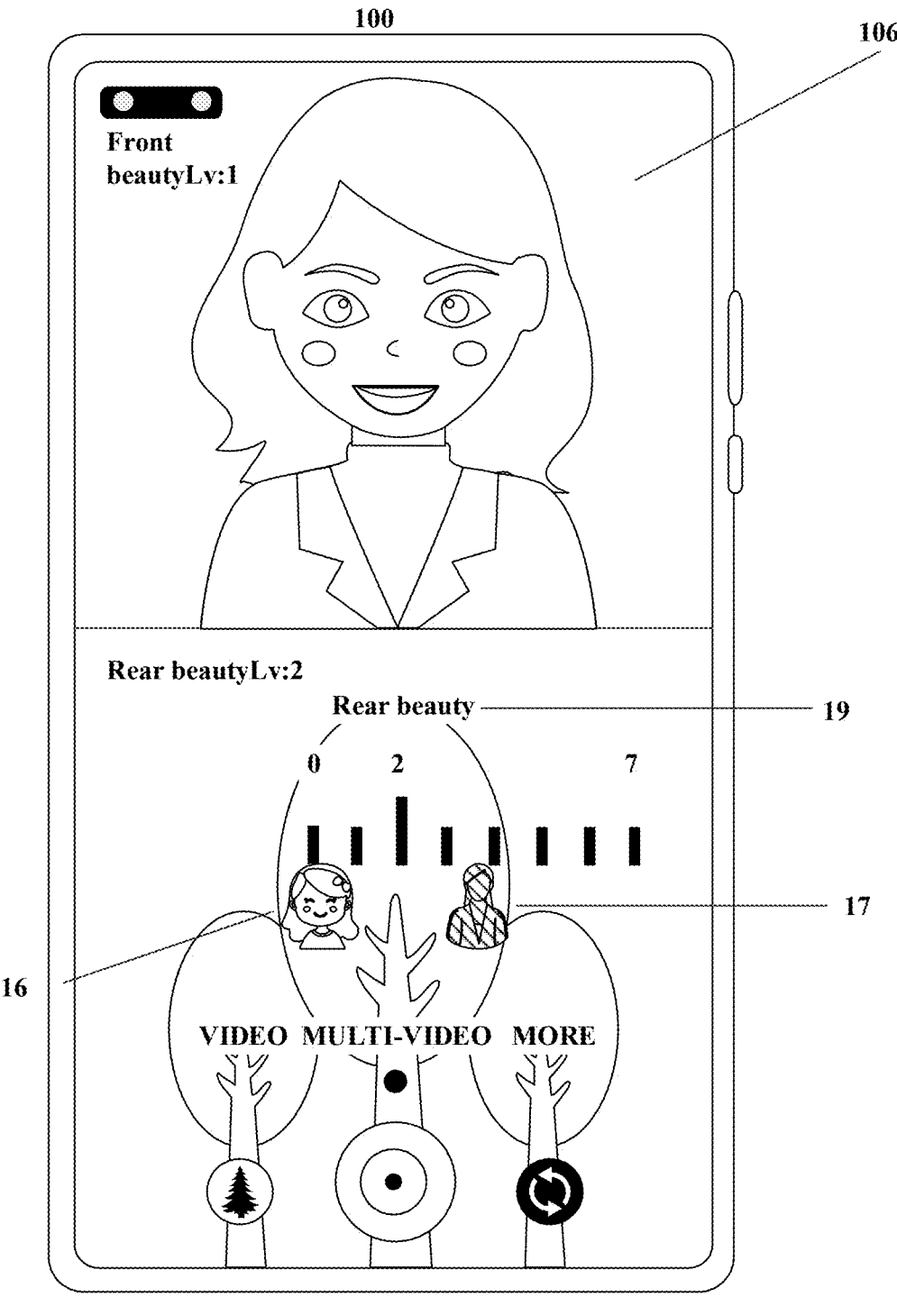
FIG. 1F is a schematic diagram of a multi-lens video recording interface of a mobile phone according to an embodiment of this application.

If the user taps the rear beauty control 17, the mobile phone 100 may display a camera interface 106 shown in FIG. 1F. The camera interface 106 includes a front beauty control 16, a rear beauty control 17, and a configuration control 19 (hereinafter referred to as a rear configuration control) of a rear beauty function. The front beauty control 16 is in an unselected state. The rear beauty control 17 is in a selected state. The user may configure a rear beauty parameter by adjusting the rear configuration control 19. FIG. 1F shows the following example: After the user taps the beauty control 12 in the camera interface 101 to configure the rear beauty parameter value as 2, the rear beauty parameter value displayed in the camera interface 105 is 2, that is, after the user configures the rear beauty parameter, the mobile phone 100 may store the rear beauty parameter value.

Figure 2A:
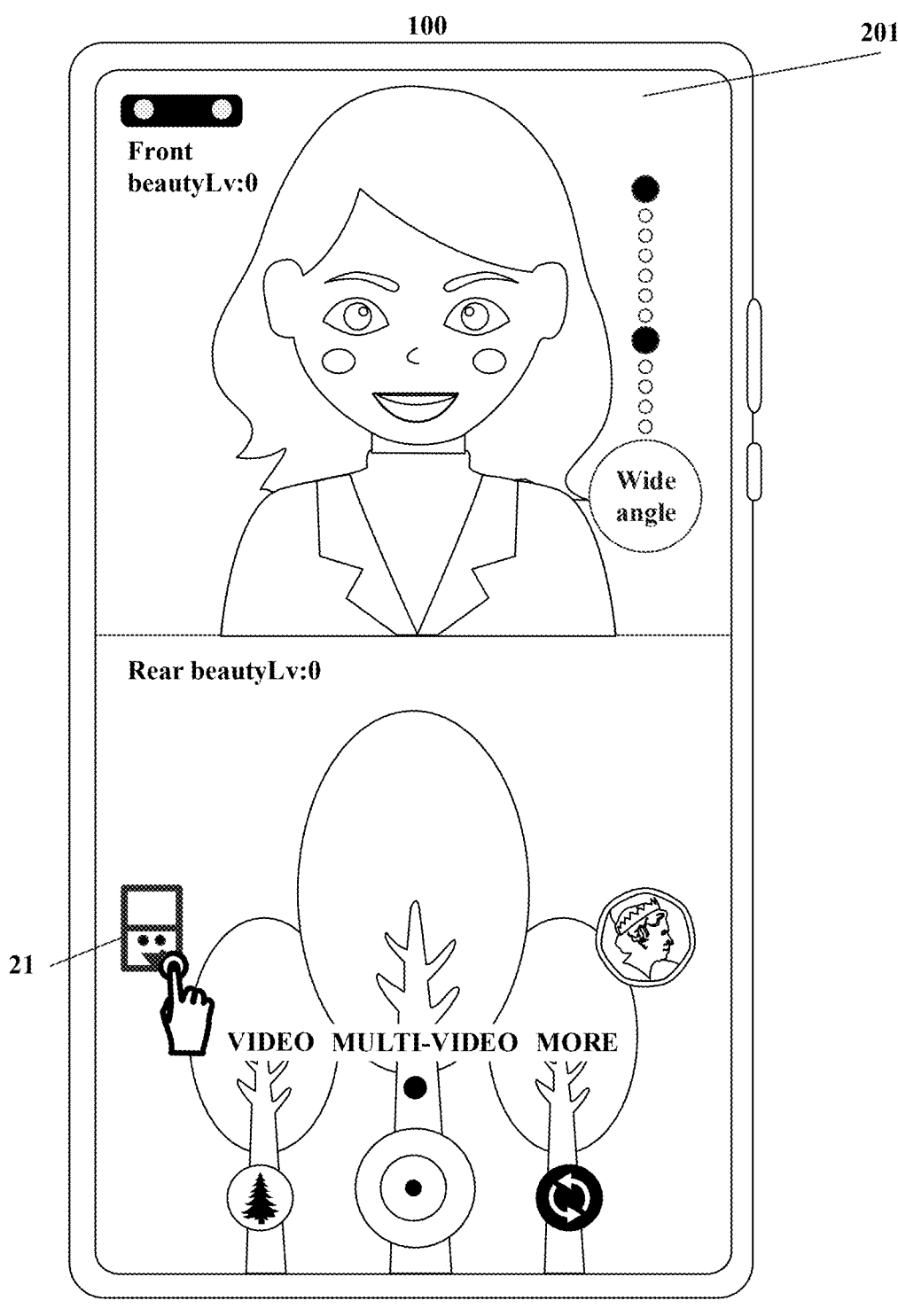
FIG. 2A is a schematic diagram of a multi-lens video recording interface of a mobile phone according to an embodiment of this application.
Figure 2B:
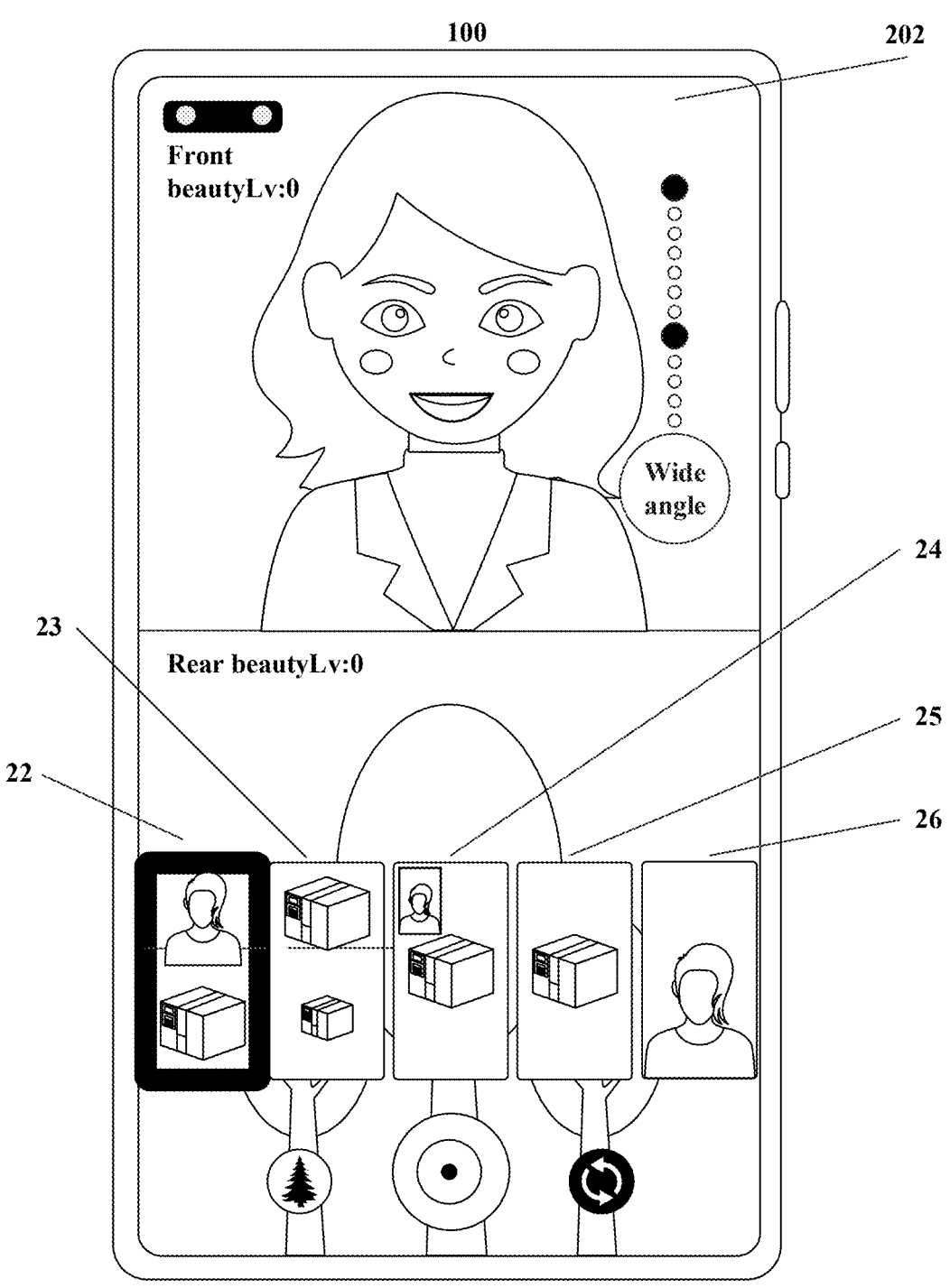
FIG. 2B is a schematic diagram of a multi-lens video recording interface of a mobile phone according to an embodiment of this application.

FIG. 2A and FIG. 2B are schematic diagrams of a multi-lens video recording interface of a mobile phone according to an embodiment of this application. For example, when a user selects a multi-lens video recording function on a camera application running on the mobile phone 100, the mobile phone 100 may display a camera interface 201 shown in FIG. 2A. The camera interface 201 includes a switching control 21 of a multi-lens video recording mode. In response to tapping the switching control 21 by the user, the mobile phone 100 may switch between multi-lens video recording modes. The multi-lens video recording modes include: a front-rear dual-camera mode, a rear-rear dual-camera mode, a picture-in-picture mode, a rear single-camera mode, and a front single-camera mode. As shown in FIG. 2A, if the user taps the switching control 21, the mobile phone 100 may display a camera interface 202 shown in FIG. 2B. The camera interface 202 includes mode controls 22, 23, 24, 25, and 26 of multi-lens video recording. The mode controls 22, 23, 24, 25, and 26 respectively indicate the front-rear dual-camera mode, the rear-rear dual-camera mode, the picture-in-picture mode, the rear single-camera mode, and the front single-camera mode of multi-lens video recording. The user may select different multi-lens video recording modes by tapping different mode controls. A default mode of multi-lens video recording is the front-rear dual-camera mode.

In some other embodiments, the multi-lens video recording mode may alternatively be switched in another manner. For example, in the camera interface 201, in response to a gesture operation (for example, an upward slide operation performed at a preset location in the camera interface 201) of the user, the mobile phone 100 may also display the camera interface 202 shown in FIG. 2B.

It may be understood that, in some embodiments, the front-rear dual-camera mode, the rear-rear dual-camera mode, and the picture-in-picture mode may be referred to as a multi-camera mode, and the rear single-camera mode and the front single-camera mode may be referred to as a single-camera mode. Specifically, in the front-rear dual-camera mode, the mobile phone 100 performs video shooting by using one front-facing camera lens and one rear-facing camera lens. In the rear-rear dual-camera mode, the mobile phone performs video shooting by using two rear-facing camera lenses. In the rear single-camera mode, the mobile phone performs video shooting by using one rear-facing camera lens. In the front single-camera mode, the mobile phone performs video shooting by using one front-facing camera lens. In some embodiments, the picture-in-picture mode may include a front picture-in-picture mode, a rear picture-in-picture mode, and a front-rear picture-in-picture mode. The front-rear picture-in-picture mode is used as an example. The mobile phone 100 may perform video shooting by using one front-facing camera lens and one rear-facing camera lens, and place, in a picture shot by the rear-facing camera lens or the front-facing camera lens, a picture shot by the front-facing camera lens or the rear-facing camera lens. The picture-in-picture mode in this application is specifically the front-rear picture-in-picture mode, and the picture shot by the front-facing camera lens is placed in the picture shot by the rear-facing camera lens.

Figure 3A:
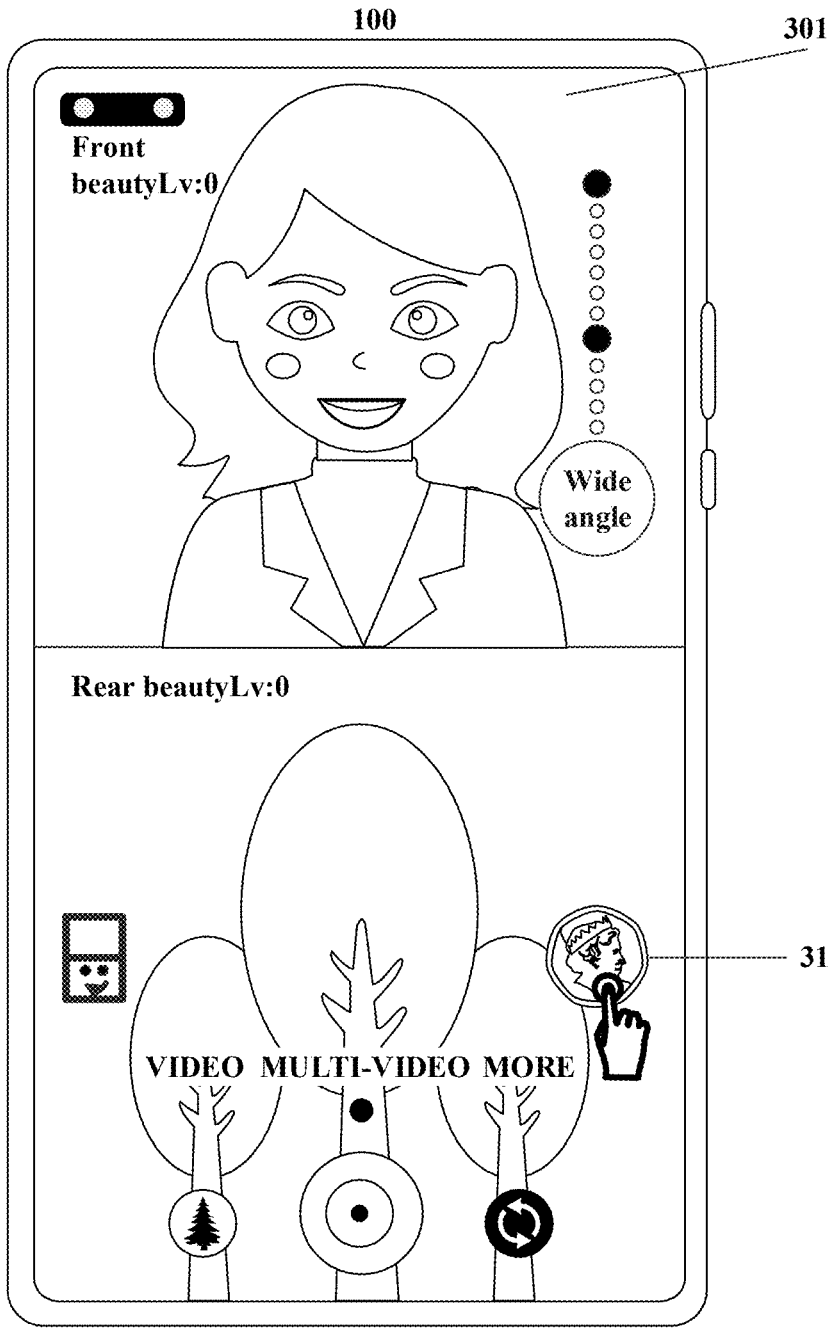
FIG. 3A is a schematic diagram of an interface of a front-rear dual-camera mode of multi-lens video recording on a mobile phone according to an embodiment of this application.
Figure 3B:
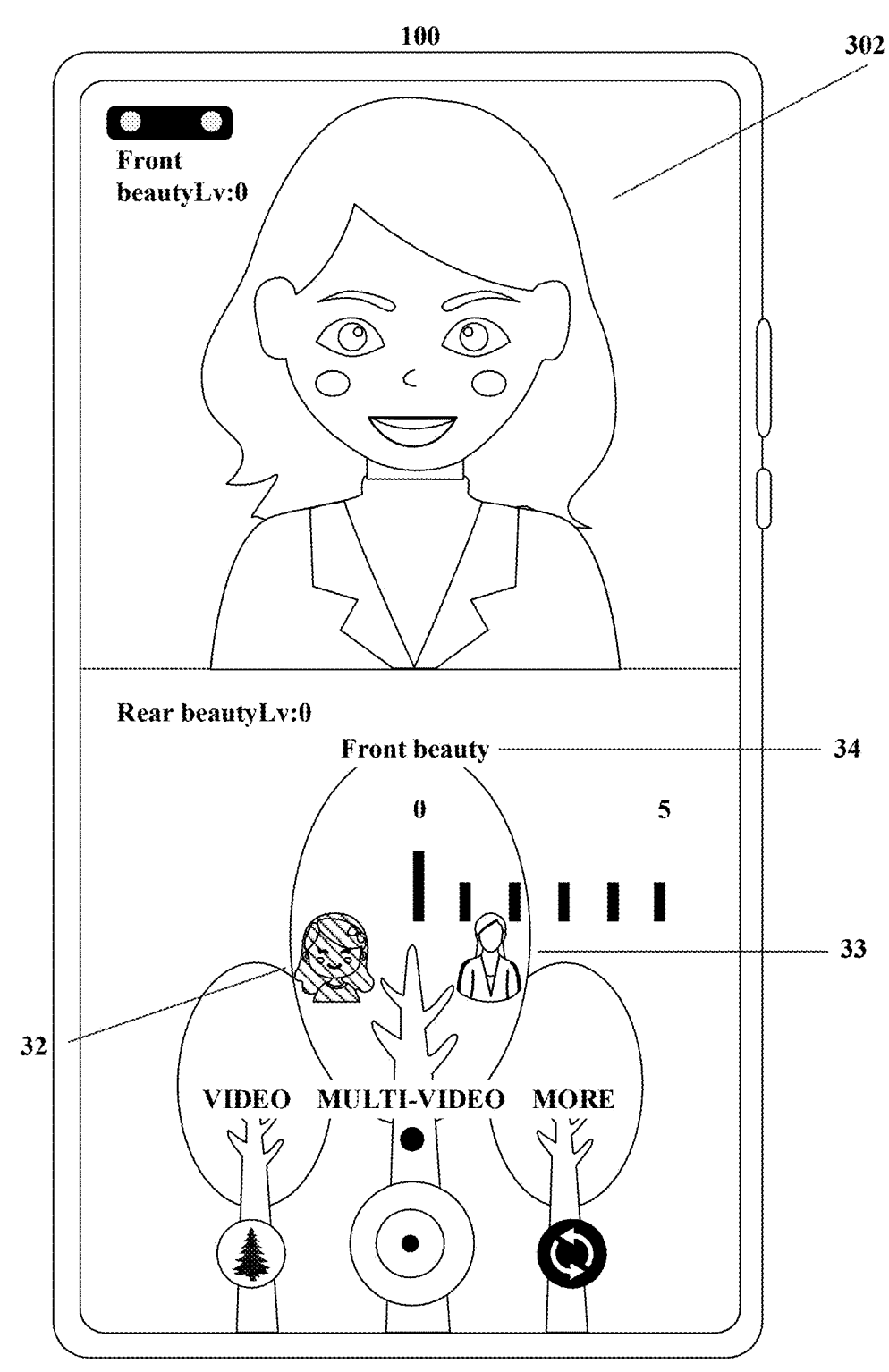
FIG. 3B is a schematic diagram of an interface of a front-rear dual-camera mode of multi-lens video recording on a mobile phone according to an embodiment of this application.

FIG. 3A and FIG. 3B show camera interfaces 301 and 302 in the front-rear dual-camera mode of multi-lens video recording. The camera interface 301 includes a beauty control 31. The beauty control 31 is in a disabled state. If the user taps the beauty control 31, the beauty control 31 expands into a front beauty control 32, a rear beauty control 33, and a front configuration control 34. The front beauty control 32 is in a selected state. The rear beauty control 33 is in an unselected state. A front beauty parameter value is 0. The user may configure a front beauty parameter by adjusting the front configuration control 34.

Figure 4A:
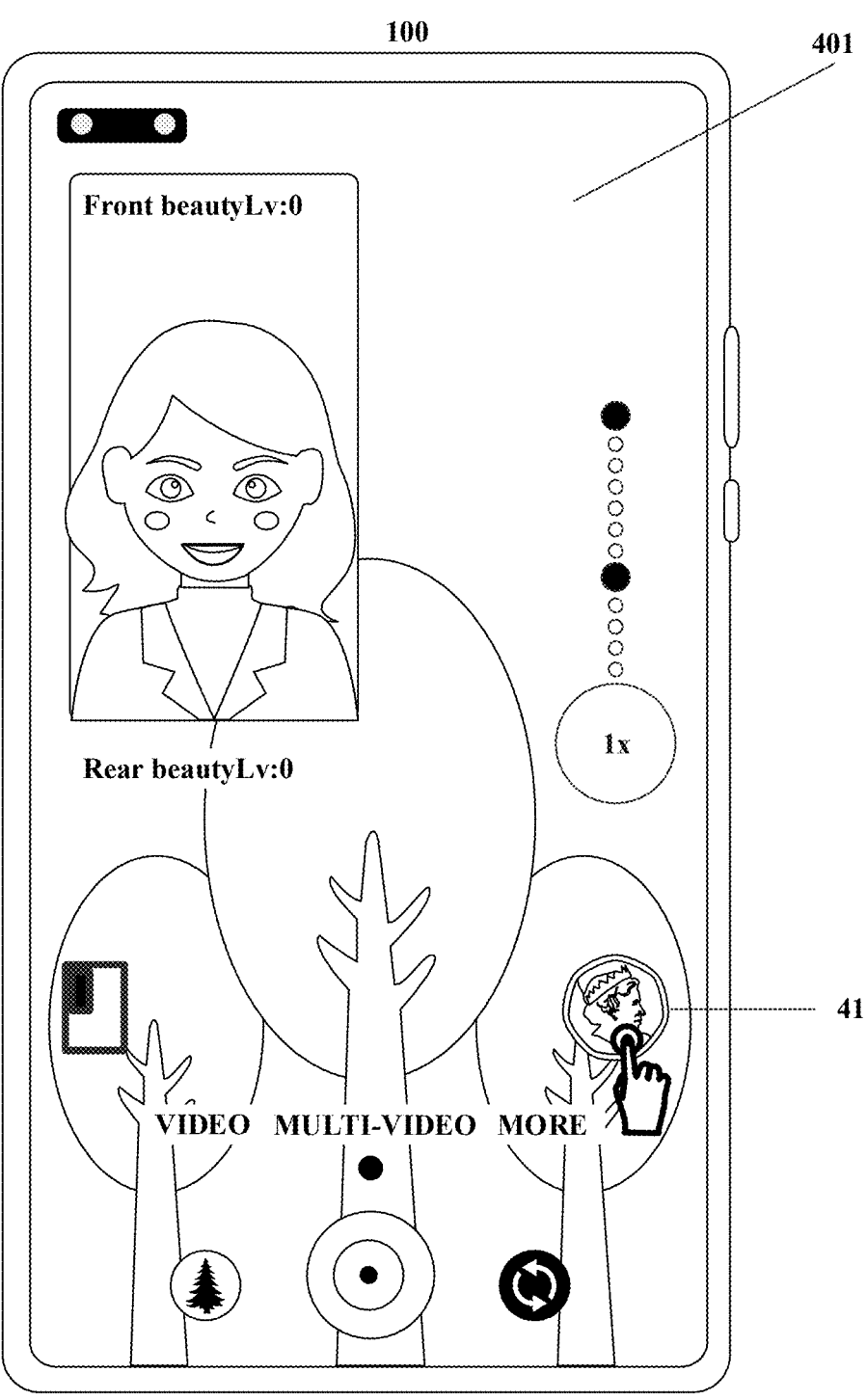
FIG. 4A is a schematic diagram of an interface of a picture-in-picture mode of multi-lens video recording on a mobile phone according to an embodiment of this application.
Figure 4B:
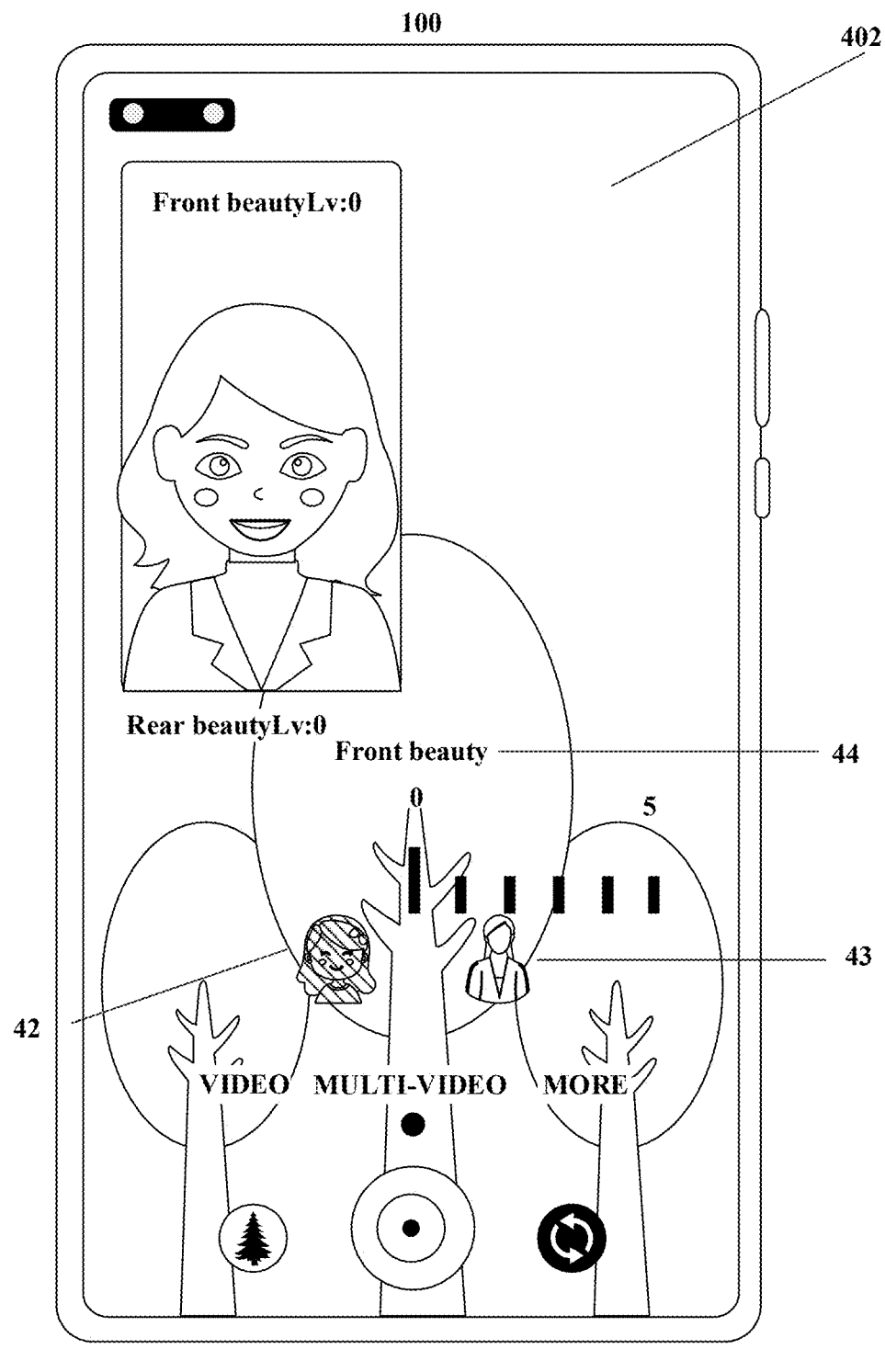
FIG. 4B is a schematic diagram of an interface of a picture-in-picture mode of multi-lens video recording on a mobile phone according to an embodiment of this application.

FIG. 4A and FIG. 4B show camera interfaces 401 and 402 in the picture-in-picture mode of multi-lens video recording. The camera interface 401 includes a beauty control 41. The beauty control 41 is in a disabled state. If the user taps the beauty control 41, the beauty control 41 expands into a front beauty control 42, a rear beauty control 43, and a front configuration control 44. The front beauty control 42 is in a selected state. The rear beauty control 43 is in an unselected state. A front beauty parameter value is 0. The user may configure a front beauty parameter by adjusting the front configuration control 44.

Figure 5A:
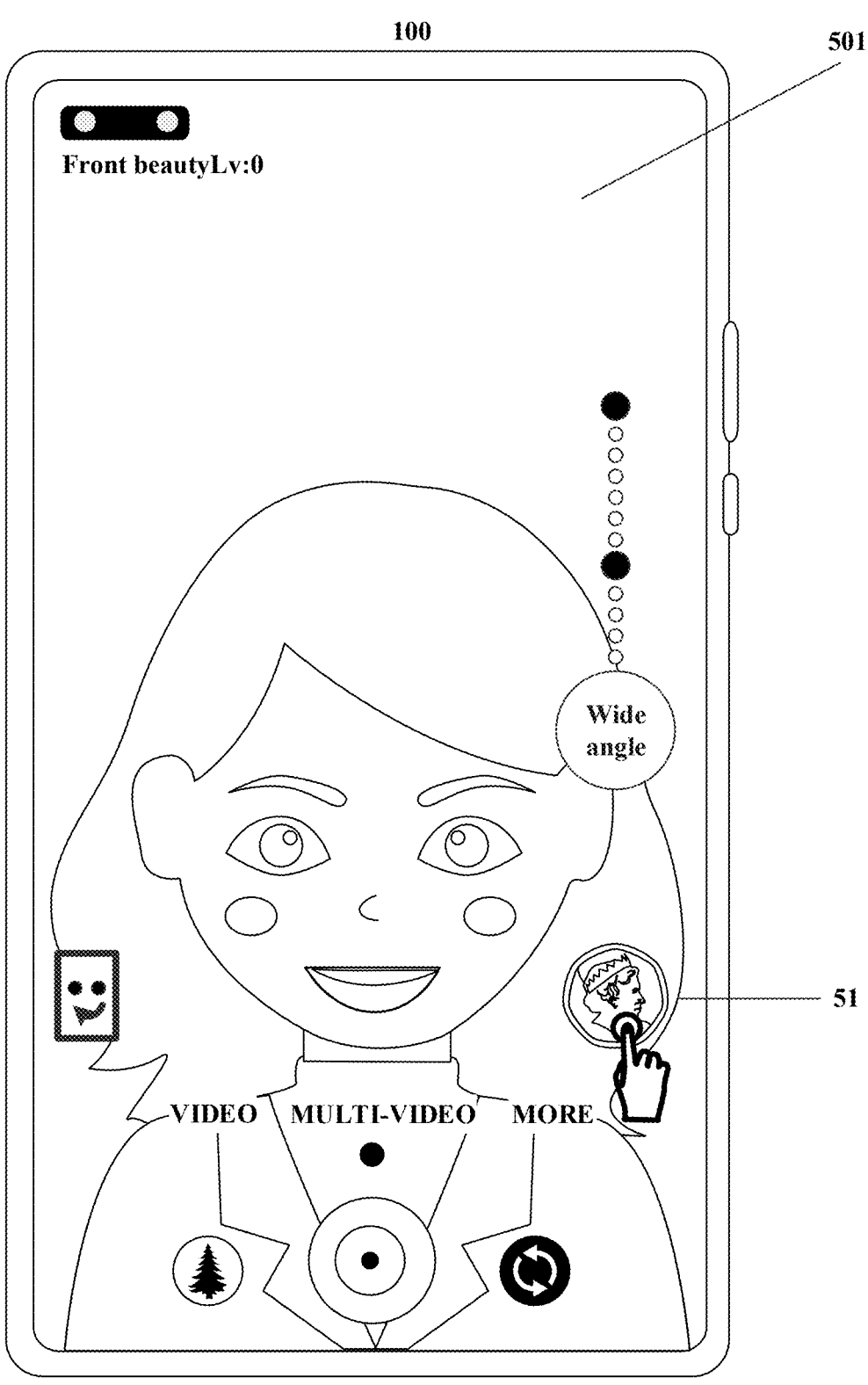
FIG. 5A is a schematic diagram of an interface of a front single-camera mode of multi-lens video recording on a mobile phone according to an embodiment of this application.
Figure 5B:
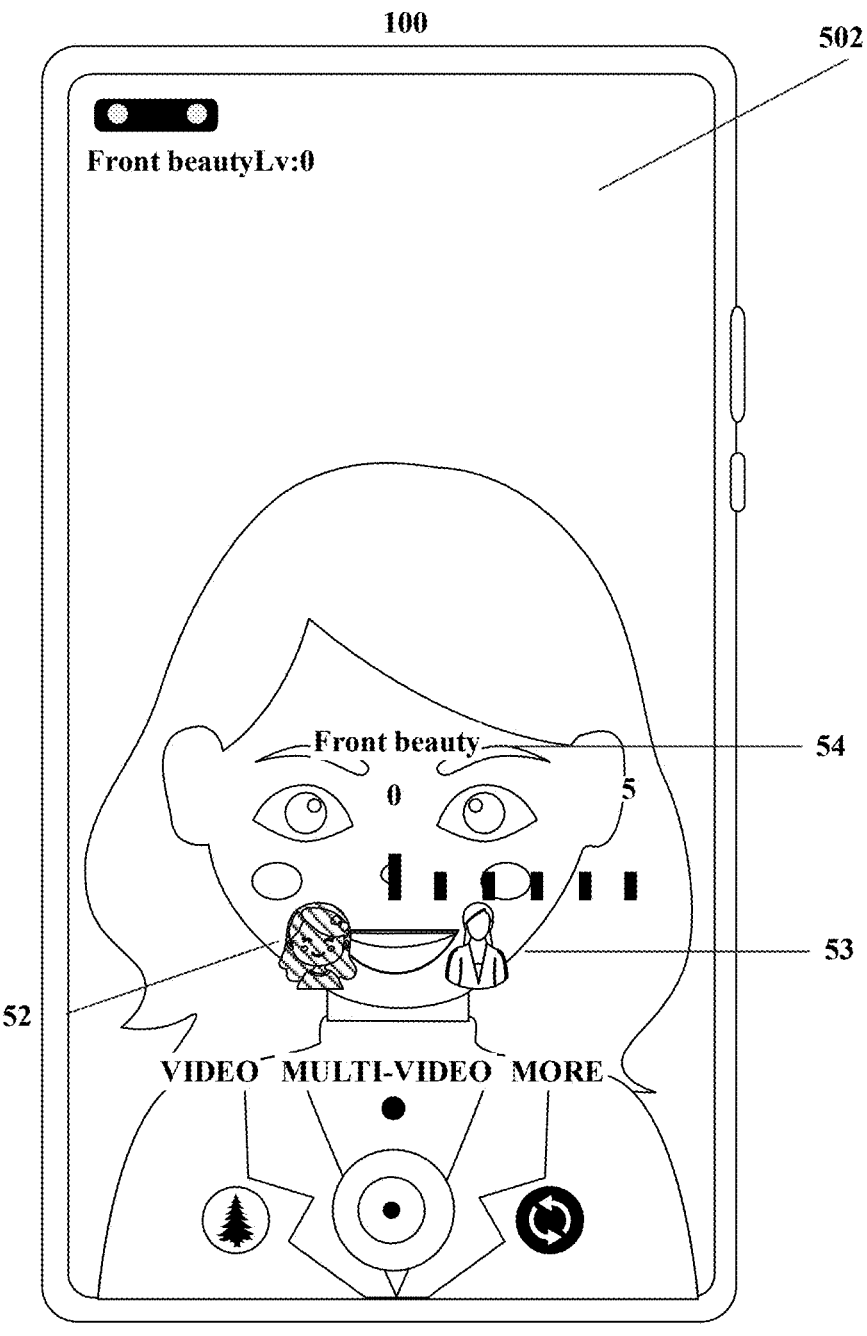
FIG. 5B is a schematic diagram of an interface of a front single-camera mode of multi-lens video recording on a mobile phone according to an embodiment of this application.

FIG. 5A and FIG. 5B show camera interfaces 501 and 502 in the front single-camera mode of multi-lens video recording. The camera interface 501 includes a beauty control 51. The beauty control 51 is in a disabled state. If the user taps the beauty control 51, the beauty control 51 expands into a front beauty control 52, a rear beauty control 53, and a front configuration control 54. The front beauty control 52 is in a selected state. The rear beauty control 53 is in an unselected state. A front beauty parameter value is 0. The user may configure a front beauty parameter by adjusting the front configuration control 54.

It may be understood that, in the front-rear dual-camera mode, the picture-in-picture mode, and the front single-camera mode of multi-lens video recording, if the user taps the beauty control, the mobile phone enters a front beauty parameter adjustment state, to display the front configuration control, so that the user configures a front beauty function. It should be noted that, in the front single-camera mode, although the user can also configure a rear beauty parameter, because a video picture of the rear-facing camera lens does not exist in the front single-camera mode, the mobile phone only stores a configured rear beauty parameter value, and does not execute a rear beauty processing procedure. For example, if the user sets the front beauty parameter value to 2 and the rear beauty parameter value to 5 in the front single-camera mode, the mobile phone may perform beauty processing on a video picture of the front-facing camera lens based on the beauty parameter value 2. Then, if the mobile phone switches to the rear single-camera mode, the front-rear dual-camera mode, or the picture-in-picture mode, the mobile phone may perform beauty processing on a video picture of the rear-facing camera lens based on the beauty parameter value 5.

Figure 6A:
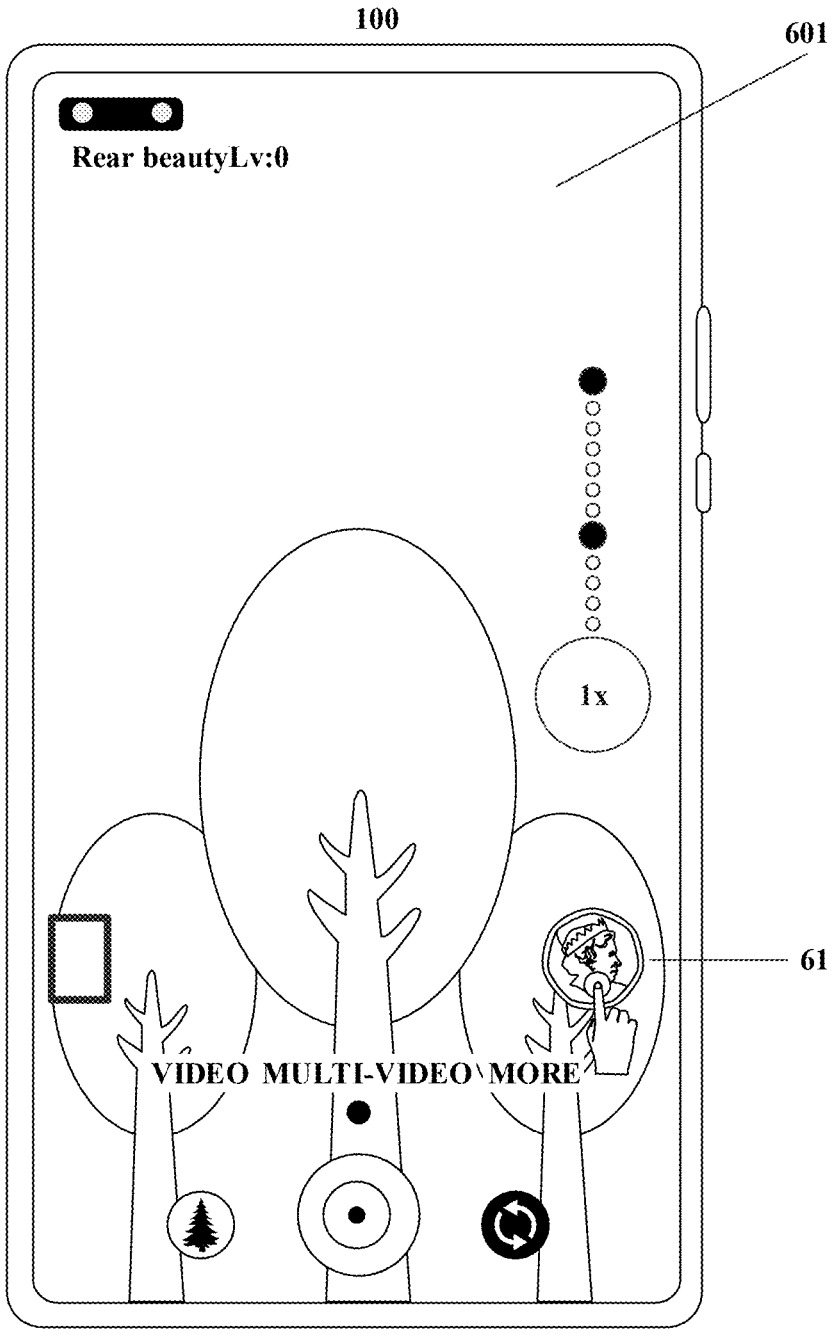
FIG. 6A is a schematic diagram of an interface of a rear single-camera mode of multi-lens video recording on a mobile phone according to an embodiment of this application.
Figure 6B:
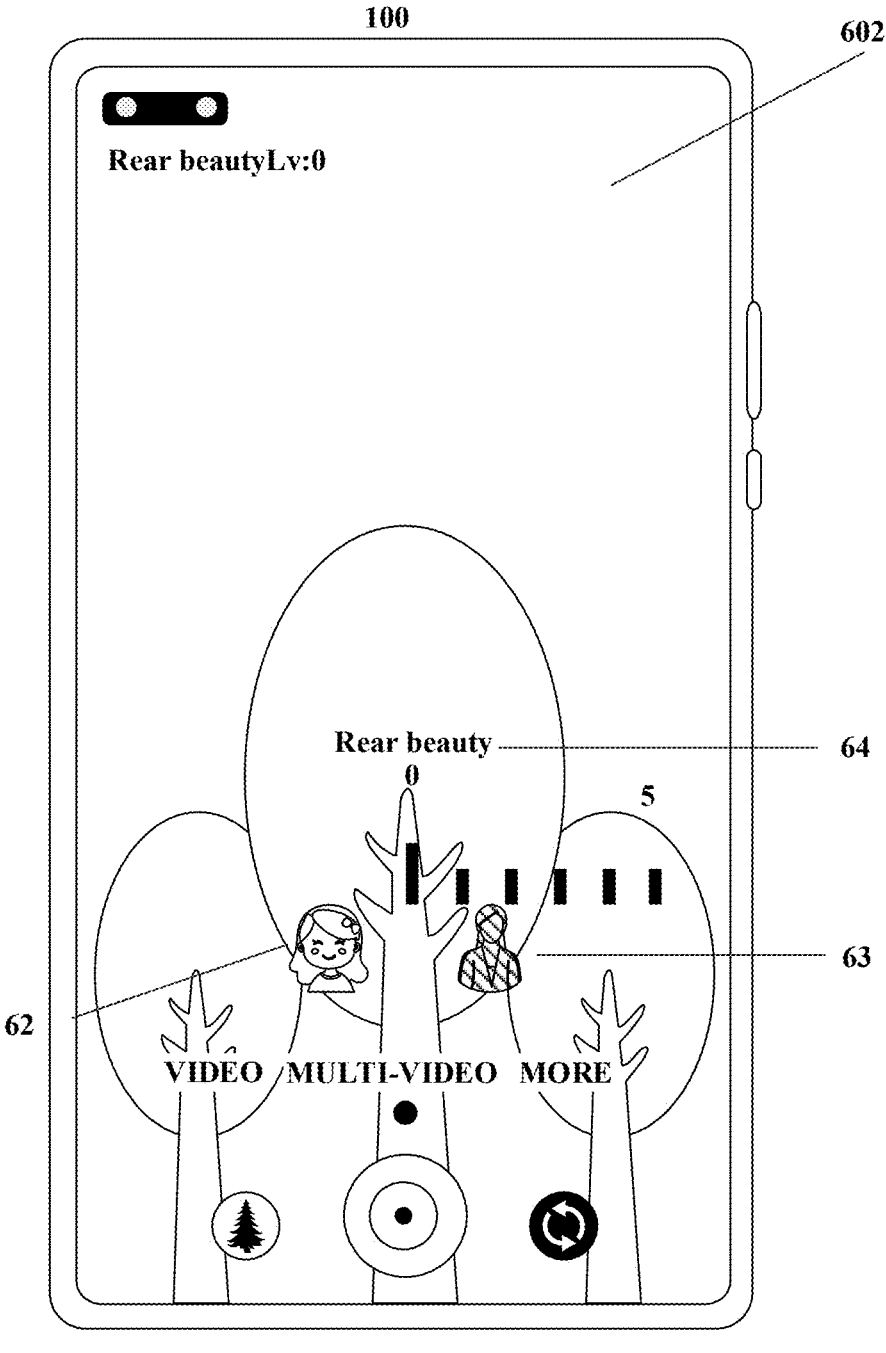
FIG. 6B is a schematic diagram of an interface of a rear single-camera mode of multi-lens video recording on a mobile phone according to an embodiment of this application.

FIG. 6A and FIG. 6B show camera interfaces 601 and 602 in the rear single-camera mode of multi-lens video recording. The camera interface 601 includes a beauty control 61. The beauty control 61 is in a disabled state. If the user taps the beauty control 61, the beauty control 61 expands into a front beauty control 62, a rear beauty control 63, and a rear configuration control 64. The front beauty control 62 is in an unselected state. The rear beauty control 63 is in a selected state. A rear beauty parameter value is 0. The user may configure a rear beauty parameter by adjusting the rear configuration control 64.

Figure 7A:
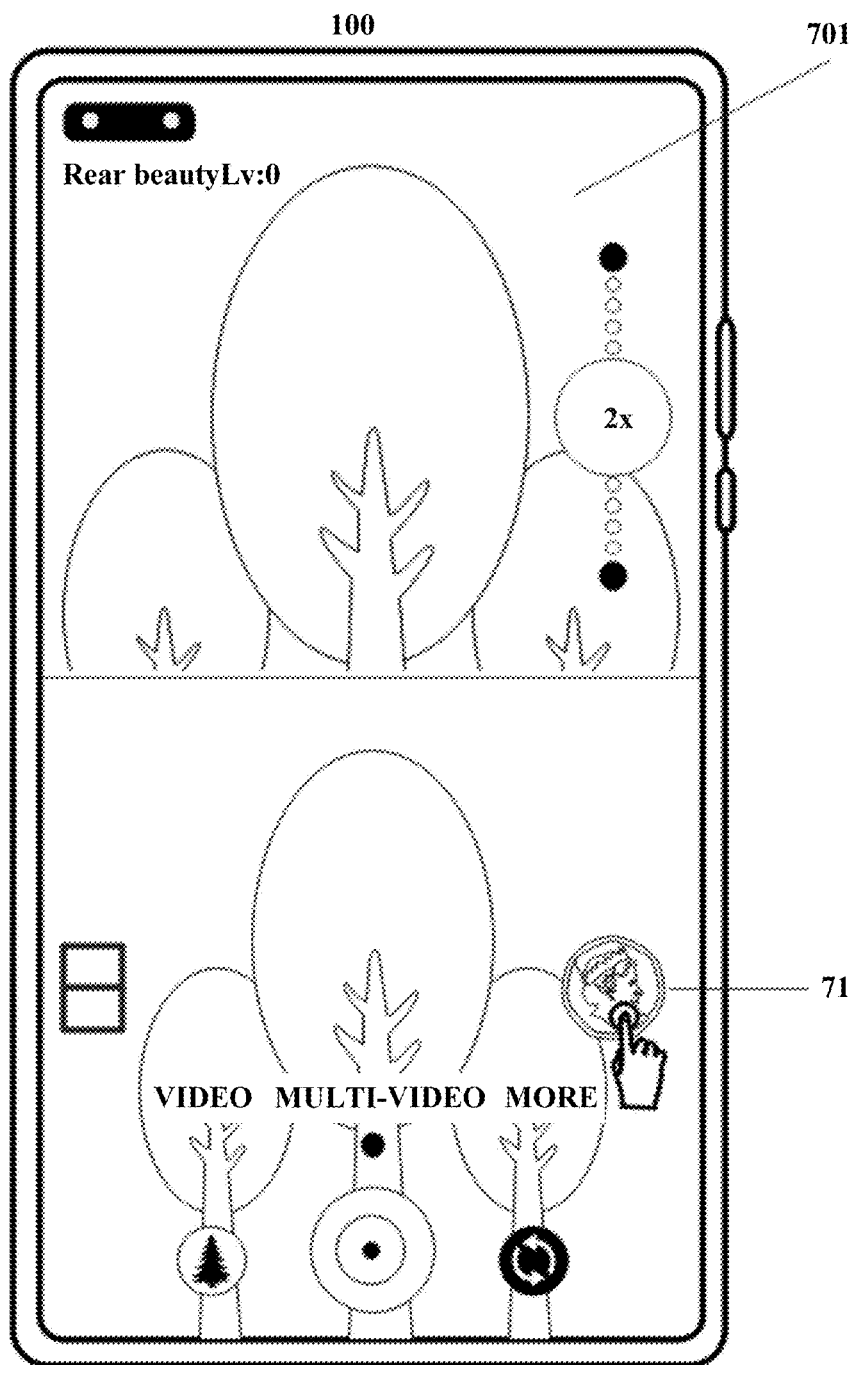
FIG. 7A is a schematic diagram of an interface of a rear-rear dual-camera mode of multi-lens video recording on a mobile phone according to an embodiment of this application.
Figure 7B:
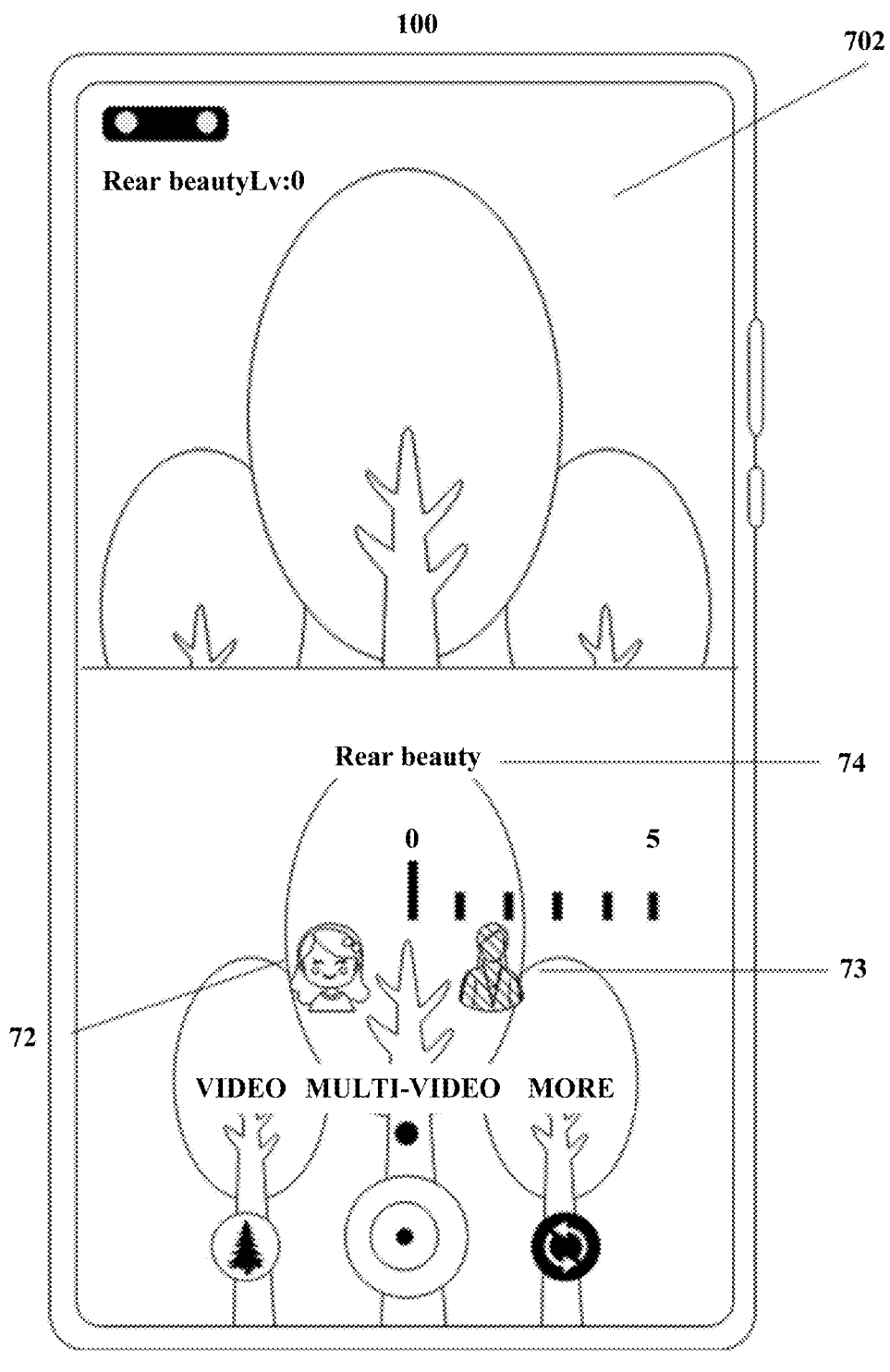
FIG. 7B is a schematic diagram of an interface of a rear-rear dual-camera mode of multi-lens video recording on a mobile phone according to an embodiment of this application.

FIG. 7A and FIG. 7B show camera interfaces 701 and 702 in the rear-rear dual-camera mode of multi-lens video recording. The camera interface 701 includes a beauty control 71. The beauty control 71 is in a disabled state. If the user taps the beauty control 71, the beauty control 71 expands into a front beauty control 72, a rear beauty control 73, and a rear configuration control 74. The front beauty control 72 is in an unselected state. The rear beauty control 73 is in a selected state. A rear beauty parameter value is 0. The user may configure a rear beauty parameter by adjusting the rear configuration control 74.

It may be understood that, in the rear single-camera mode and the rear-rear dual-camera mode of multi-lens video recording, if the user taps the beauty control, the mobile phone enters a rear beauty parameter adjustment state, to display the rear configuration control, so that the user configures a rear beauty function. It should be noted that, in the rear single-camera mode and the rear-rear dual-camera mode, although the user can also configure a front beauty parameter, because a video picture of the front-facing camera lens does not exist in the rear single-camera mode and the rear-rear dual-camera mode, the mobile phone only stores a configured front beauty parameter value, and does not execute a front beauty processing procedure. For example, if the user sets the front beauty parameter value to 2 and the rear beauty parameter value to 5 in the rear single-camera mode, the mobile phone may perform beauty processing on a video picture of the rear-facing camera lens based on the beauty parameter value 5. Then, if the mobile phone switches to the front single-camera mode, the front-rear dual-camera mode, or the picture-in-picture mode, the mobile phone may perform beauty processing on a video picture of the front-facing camera lens based on the beauty parameter value 2.

In addition, the rear-rear dual-camera mode includes video pictures of two channels of rear-facing camera lenses. After a rear beauty parameter is configured, the mobile phone may perform beauty processing on the video pictures of the two channels of rear-facing camera lenses based on the rear beauty parameter.

The video recording setting method provided in the embodiments of this application is separately described below separately for a video recording scenario and a multi-lens video recording scenario.

Scenario 1: a Video Recording Scenario of a Rear-Facing Camera Lens.

Figure 8A:
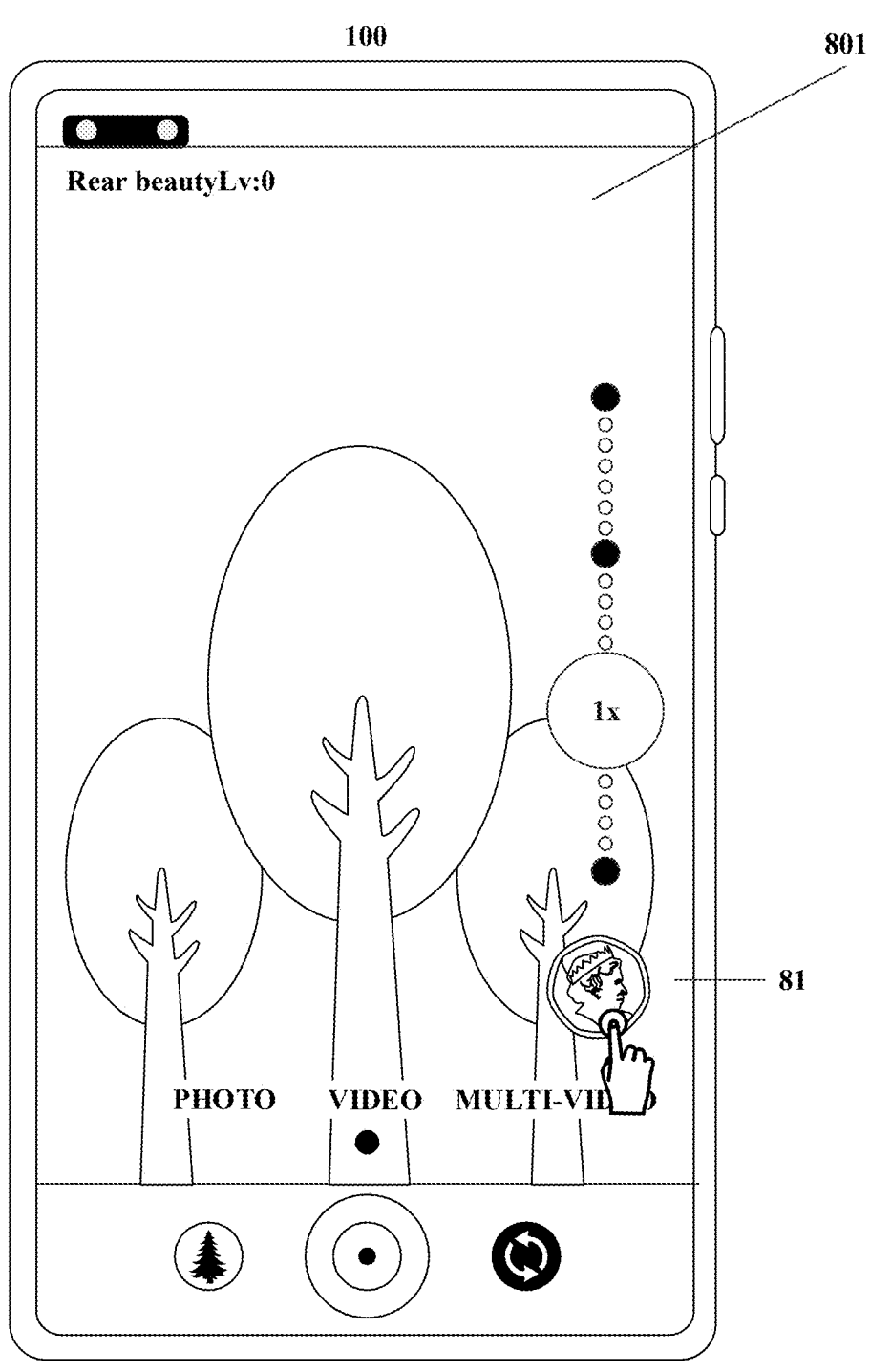
FIG. 8A is a schematic diagram of a video recording interface of a rear-facing camera lens of a mobile phone according to an embodiment of this application.
Figure 8B:
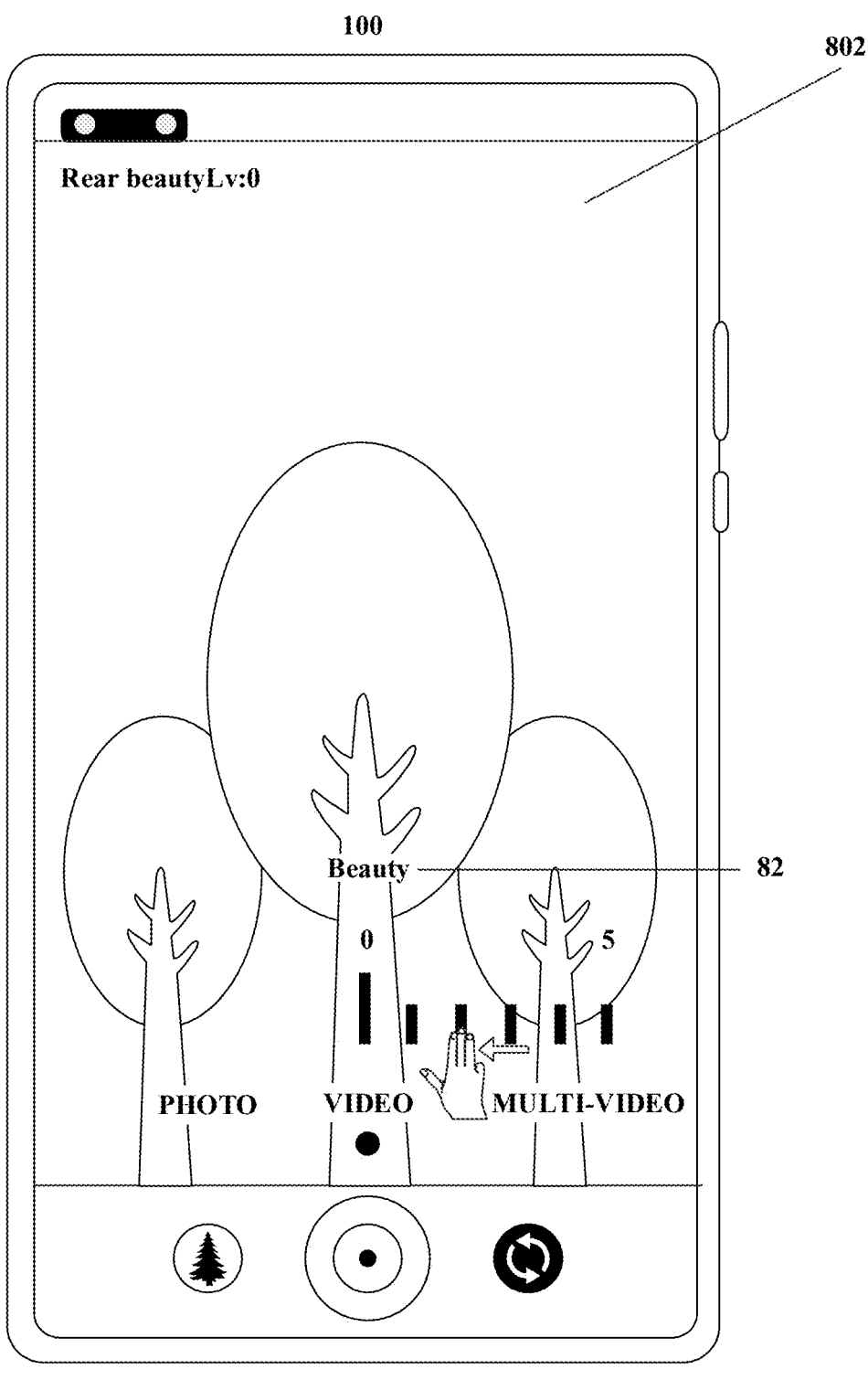
FIG. 8B is a schematic diagram of a video recording interface of a rear-facing camera lens of a mobile phone according to an embodiment of this application.
Figure 8C:
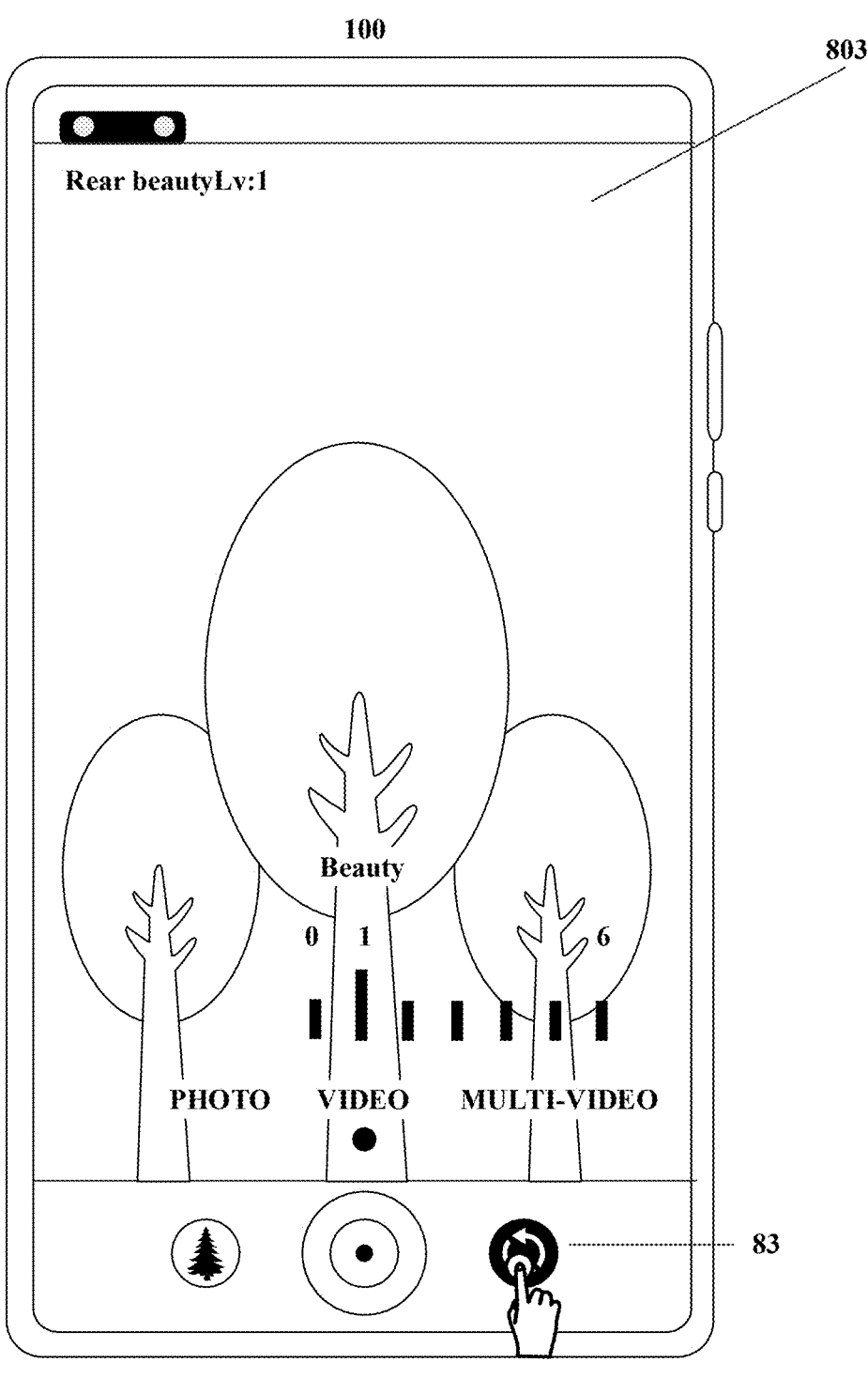
FIG. 8C is a schematic diagram of a video recording interface of a rear-facing camera lens of a mobile phone according to an embodiment of this application.

FIG. 8A-FIG. 8C are schematic diagrams of a video recording interface of a rear-facing camera lens of a mobile phone according to an embodiment of this application. For example, when a user selects a video recording function on a camera application running on the mobile phone 100, the mobile phone 100 may display a camera interface 801 shown in FIG. 8A. A background real-time image collected by the rear-facing camera lens is displayed in the camera interface 801. The camera interface 801 includes a beauty control 81. If the user taps the beauty control 81, the mobile phone 100 may display a camera interface 802 shown in FIG. 8B. The beauty control 81 expands into a configuration control 82. The user may configure a beauty parameter by adjusting the configuration control. If the user configures a beauty parameter value as 1, the mobile phone 100 may display a camera interface 803 shown in FIG. 8C.

Scenario 2: a Video Recording Scenario of a Front-Facing Camera Lens.

Figure 9A:
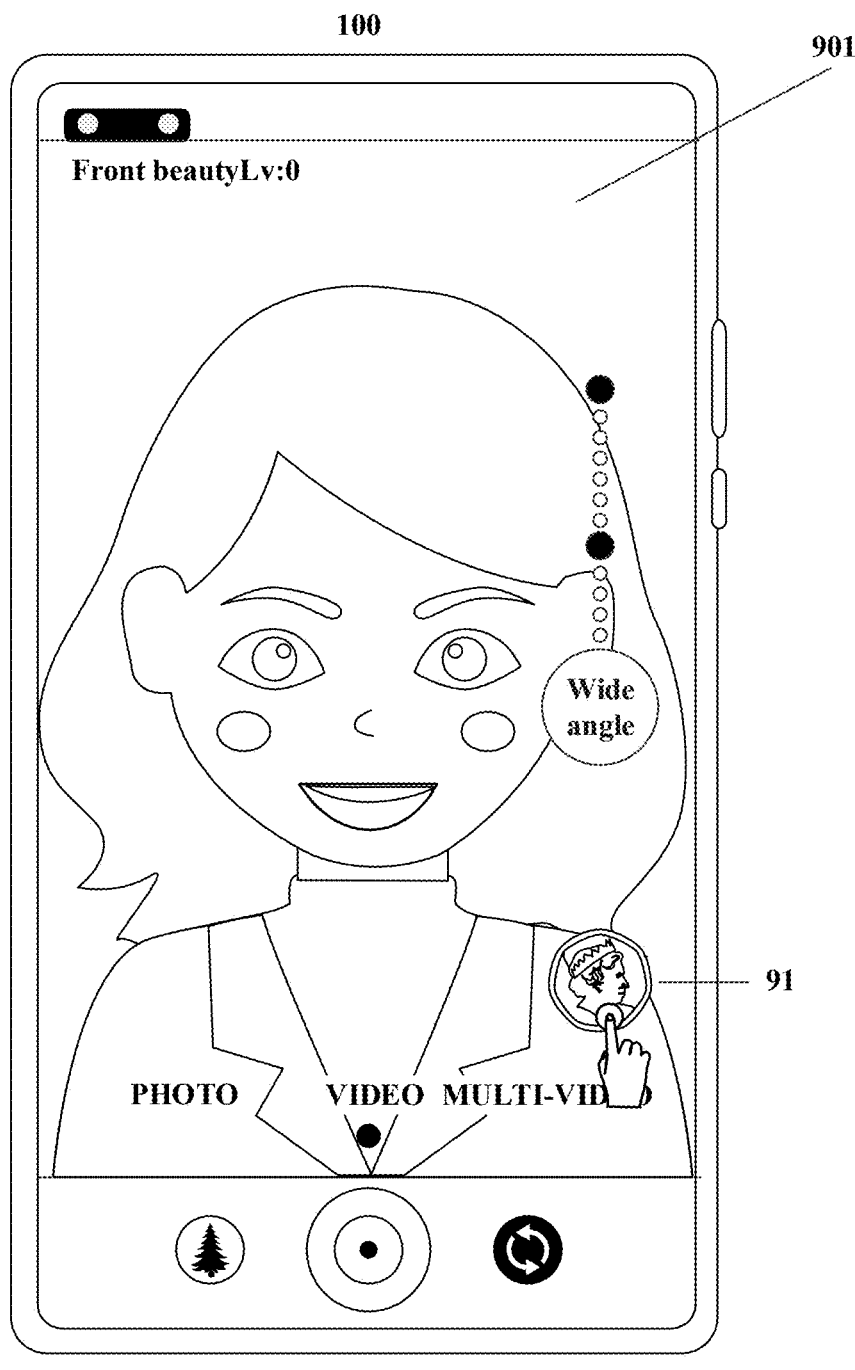
FIG. 9A is a schematic diagram of a video recording interface of a front-facing camera lens of a mobile phone according to an embodiment of this application.
Figure 9B:
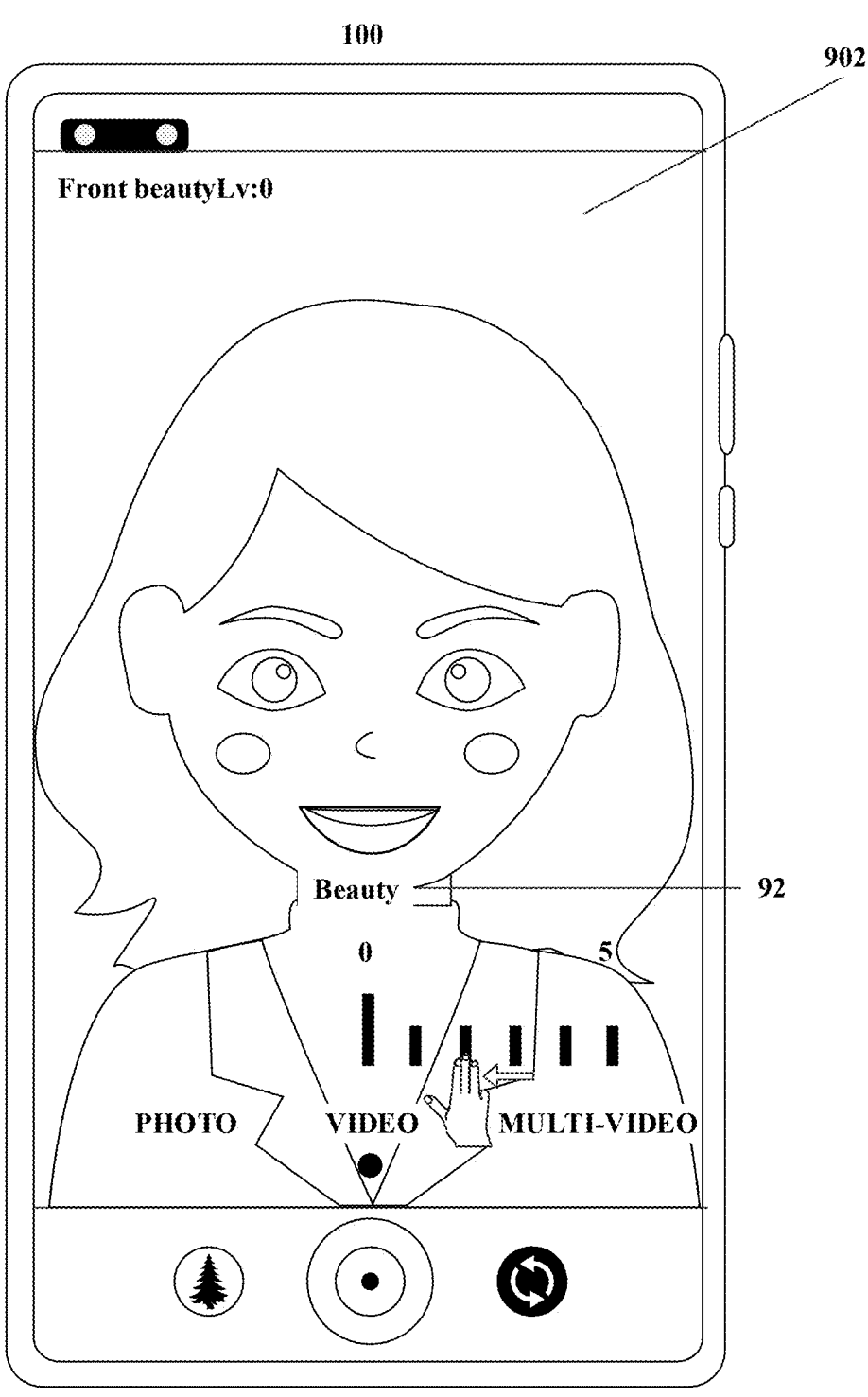
FIG. 9B is a schematic diagram of a video recording interface of a front-facing camera lens of a mobile phone according to an embodiment of this application.
Figure 9C:
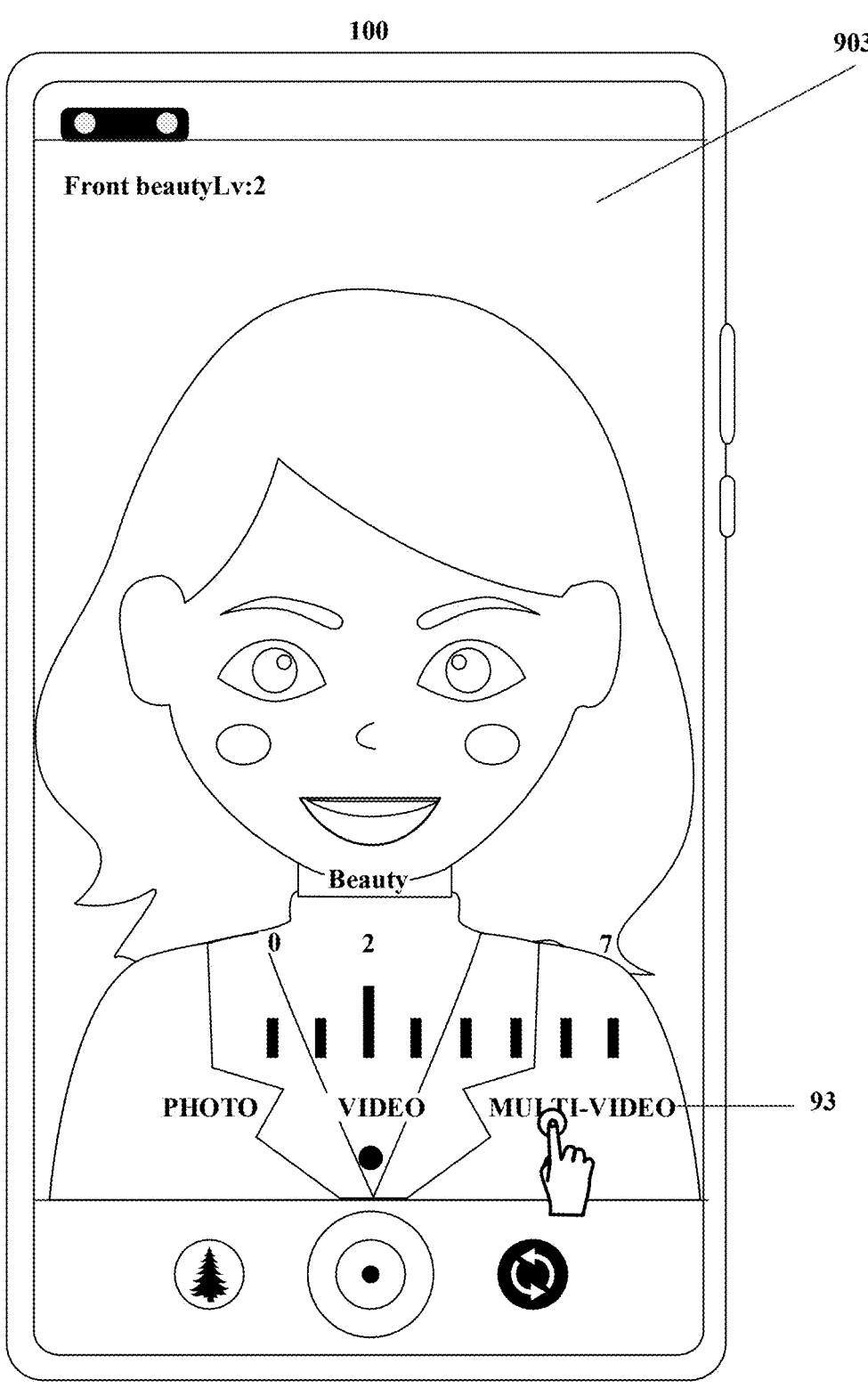
FIG. 9C is a schematic diagram of a video recording interface of a front-facing camera lens of a mobile phone according to an embodiment of this application.

FIG. 9A-FIG. 9C are schematic diagrams of a video recording interface of a front-facing camera lens of a mobile phone according to an embodiment of this application. For example, when the user taps a video recording mode switching control 83 in the camera interface 803, the mobile phone 100 may display a camera interface 901 shown in FIG. 9A. A foreground real-time image collected by the front-facing camera lens is displayed in the camera interface 901. The camera interface 901 includes a beauty control 91. If the user taps the beauty control 91, the mobile phone 100 may display a camera interface 902 shown in FIG. 9B. The beauty control 91 expands into a configuration control 92. The user may configure a beauty parameter by adjusting the configuration control. If the user configures a beauty parameter value as 2, the mobile phone 100 may display a camera interface 903 shown in FIG. 9C.

Scenario 3: a Scenario of a Front-Rear Dual-Camera Mode of Multi-Lens Video Recording.

FIG. 10A-FIG. 10F are schematic diagrams of an interface of a front-rear dual-camera mode of multi-lens video recording on a mobile phone according to an embodiment of this application. For example, when the user selects a multi-lens video recording function 93 in the camera interface 903, the mobile phone 100 may display a camera interface 1001 shown in FIG. 10A. The camera interface 1001 includes a beauty control 10-1. The beauty control 10-1 is in an enabled state. Because the user previously configures the rear beauty parameter value as 1 in the camera interface 803 and configures the front beauty parameter value as 2 in the camera interface 903, the camera interface 903 inherits the previously configured beauty parameters, and the mobile phone performs beauty processing on a video picture of the front-facing camera lens based on the beauty parameter value 2, and performs beauty processing on a video picture of the rear-facing camera lens based on the beauty parameter value 1. If the user taps the beauty control 10-1, the mobile phone 100 may display a camera interface 1002 shown in FIG. 10B. The beauty control 10-1 expands into a front beauty control 10-2, a rear beauty control 10-3, and a front configuration control 10-4. The front beauty control 10-2 is in a selected state. The rear beauty control 10-3 is in an unselected state. The front beauty parameter value is 2. The user may configure the front beauty parameter by adjusting the front configuration control 10-4. If the user configures the front beauty parameter value as 4, the mobile phone 100 may display a camera interface 1003 shown in FIG. 10C. Further, if the user taps the rear beauty control 10-3, the mobile phone 100 may display a camera interface 1004 shown in FIG. 10D. The camera interface 1004 shown in FIG. 10D includes the front beauty control 10-2, the rear beauty control 10-3, and a rear configuration control 10-5. The front beauty control 10-2 is in an unselected state. The rear beauty control 10-3 is in a selected state. The rear beauty parameter value is 1. The user may configure the rear beauty parameter by adjusting the rear configuration control 10-5. If the user configures the rear beauty parameter value as 3, the mobile phone 100 may display a camera interface 1005 shown in FIG. 10E.

Figure 10A:
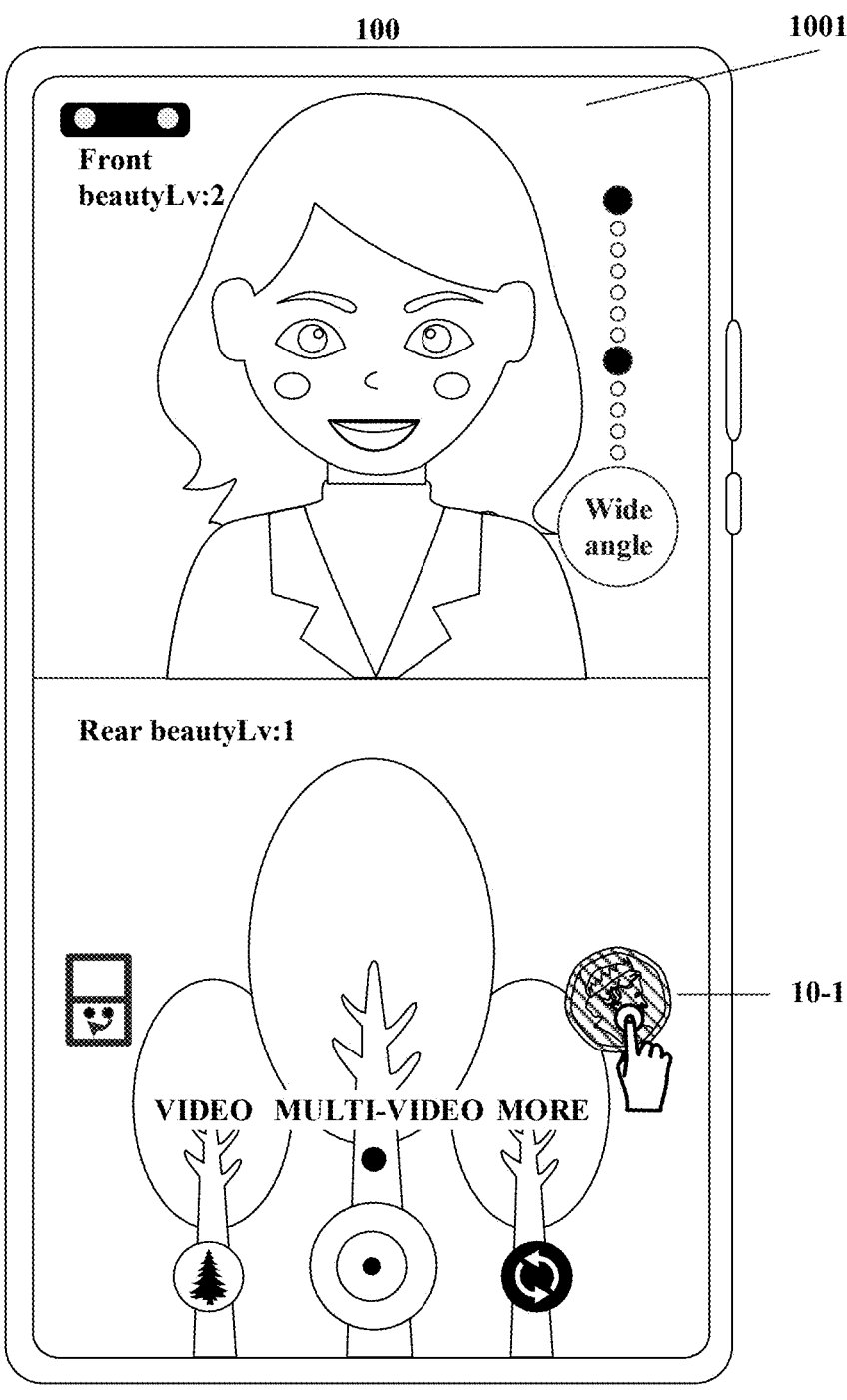
FIG. 10A is a schematic diagram of an interface of a front-rear dual-camera mode of multi-lens video recording on a mobile phone according to an embodiment of this application.
Figure 10B:
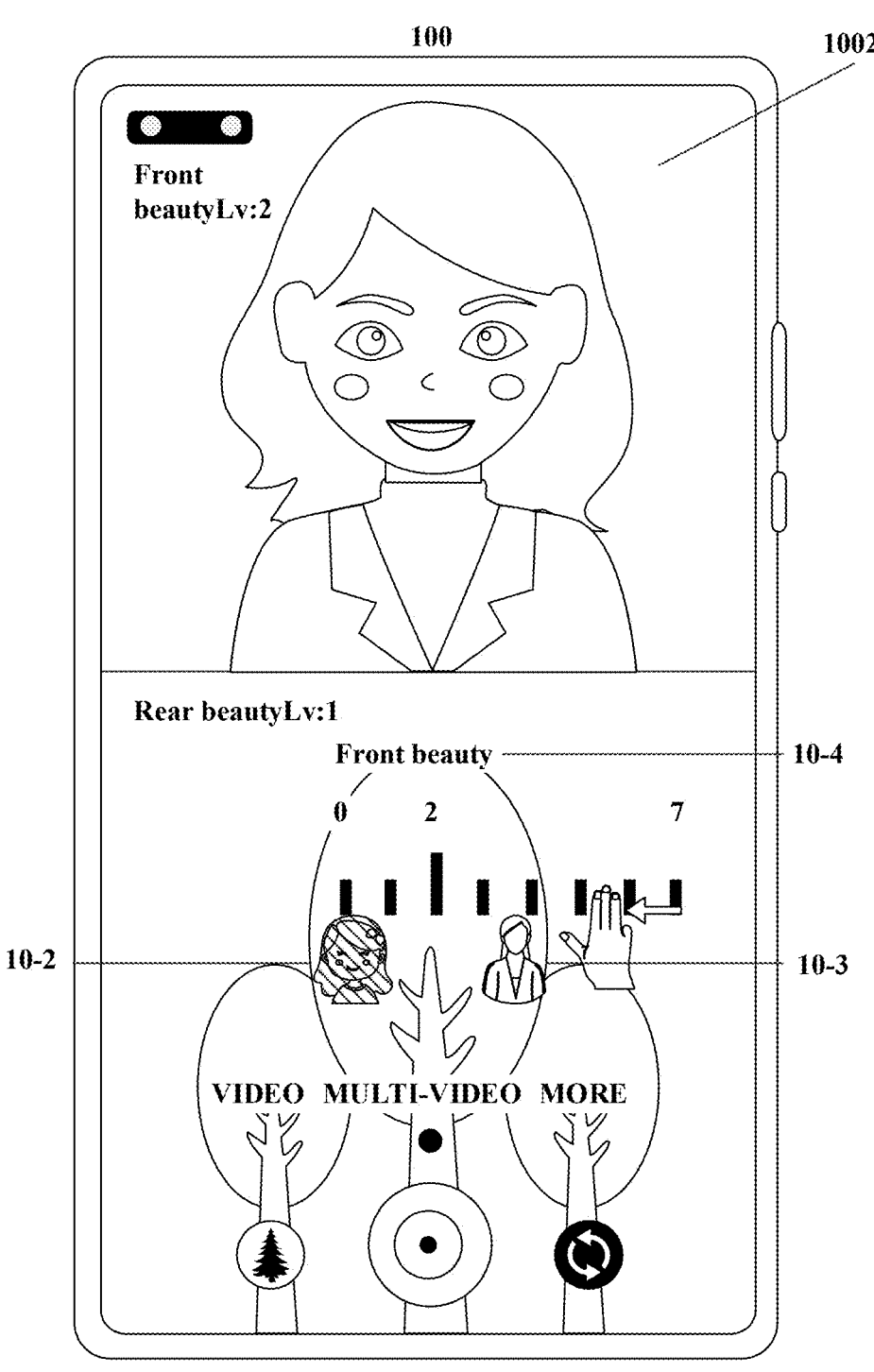
FIG. 10B is a schematic diagram of an interface of a front-rear dual-camera mode of multi-lens video recording on a mobile phone according to an embodiment of this application.
Figure 10C:
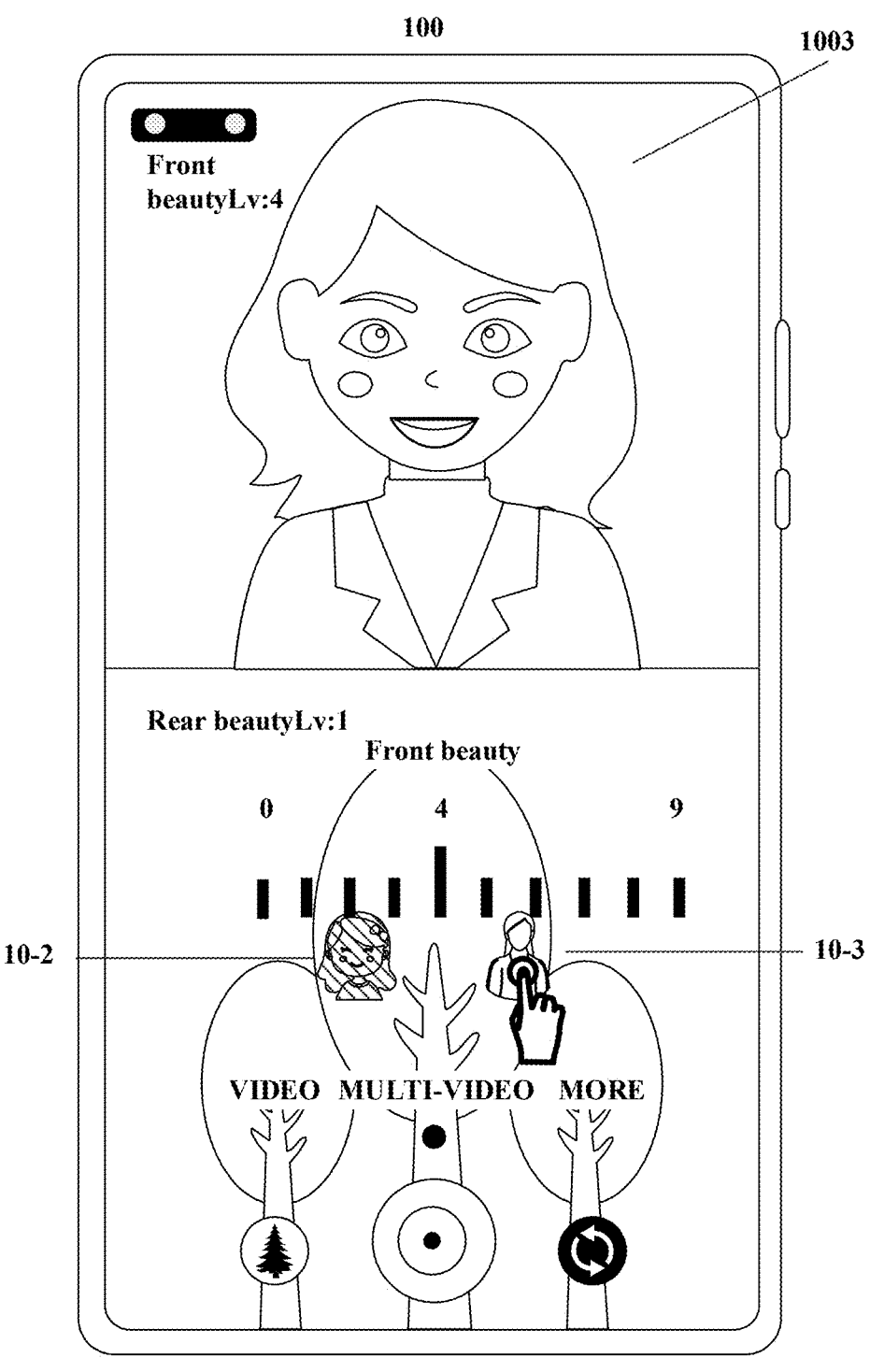
FIG. 10C is a schematic diagram of an interface of a front-rear dual-camera mode of multi-lens video recording on a mobile phone according to an embodiment of this application.
Figure 10D:
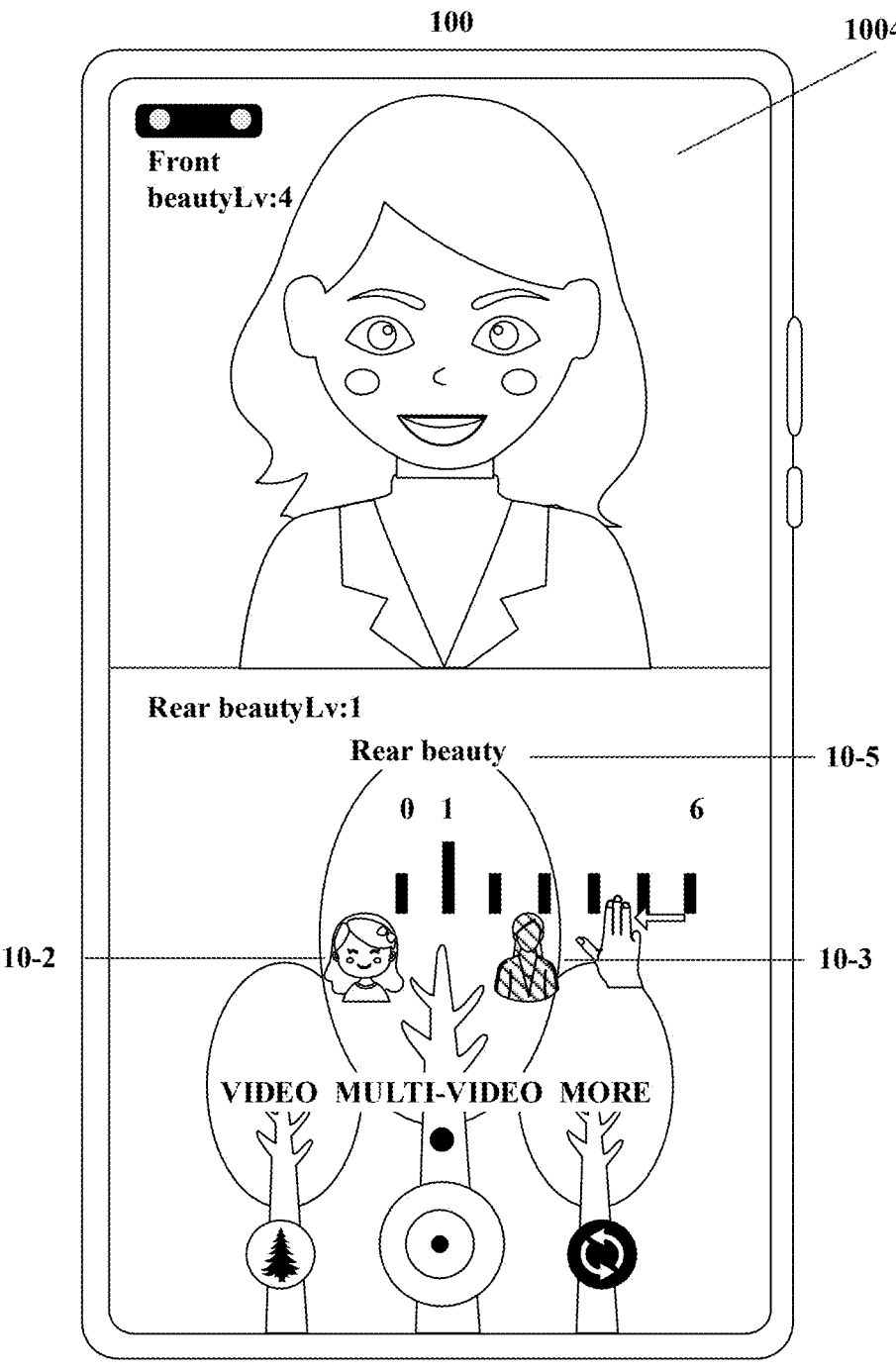
FIG. 10D is a schematic diagram of an interface of a front-rear dual-camera mode of multi-lens video recording on a mobile phone according to an embodiment of this application.
Figure 10E:
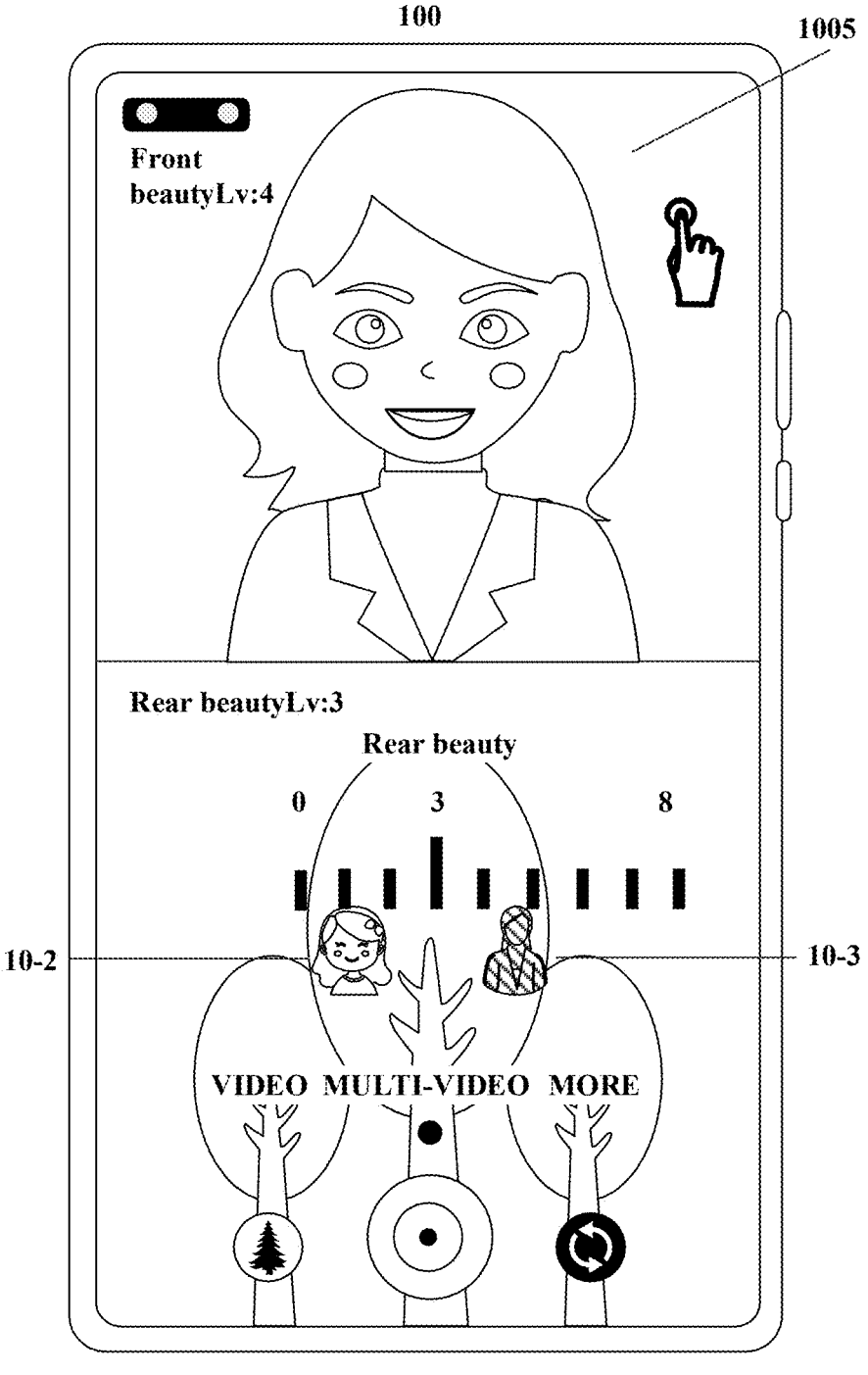
FIG. 10E is a schematic diagram of an interface of a front-rear dual-camera mode of multi-lens video recording on a mobile phone according to an embodiment of this application.
Figure 10F:
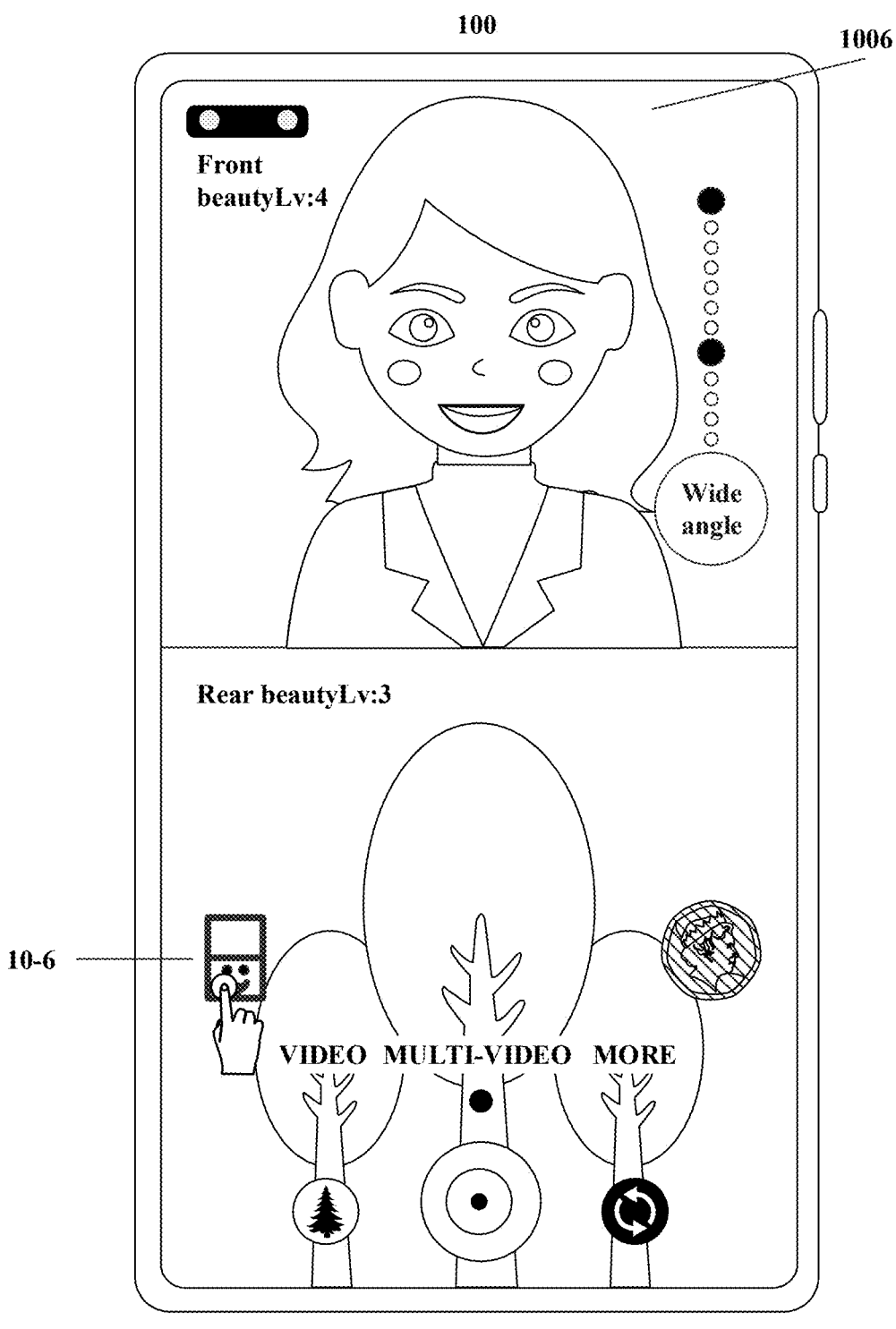
FIG. 10F is a schematic diagram of an interface of a front-rear dual-camera mode of multi-lens video recording on a mobile phone according to an embodiment of this application.

Still further, if the user taps a blank location in the camera interface 1005 or waits for preset time, the mobile phone 100 may display a camera interface 1006 shown in FIG. 10F. The preset time may be set based on an actual requirement. The camera interface 1006 includes a switching control 10-6. In this case, the mobile phone performs beauty processing on the video picture of the front-facing camera lens based on the beauty parameter value 4, and performs beauty processing on the video picture of the rear-facing camera lens based on the beauty parameter value 3.

Scenario 4: a Scenario of a Picture-In-Picture Mode of Multi-Lens Video Recording.

Figure 11A:
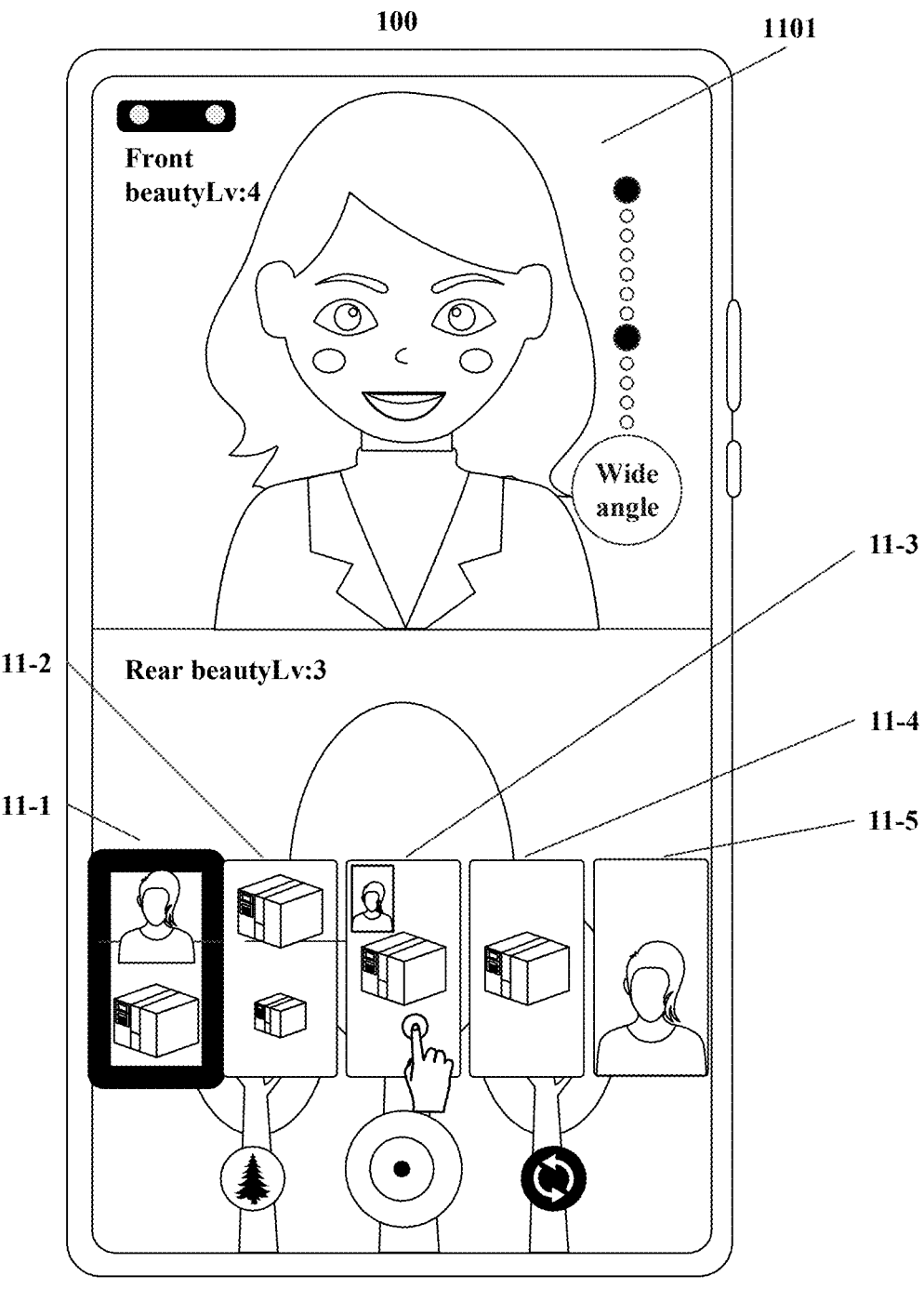
FIG. 11A is a schematic diagram of an interface for switching a multi-lens video recording mode of a mobile phone according to an embodiment of this application.
Figure 11B:
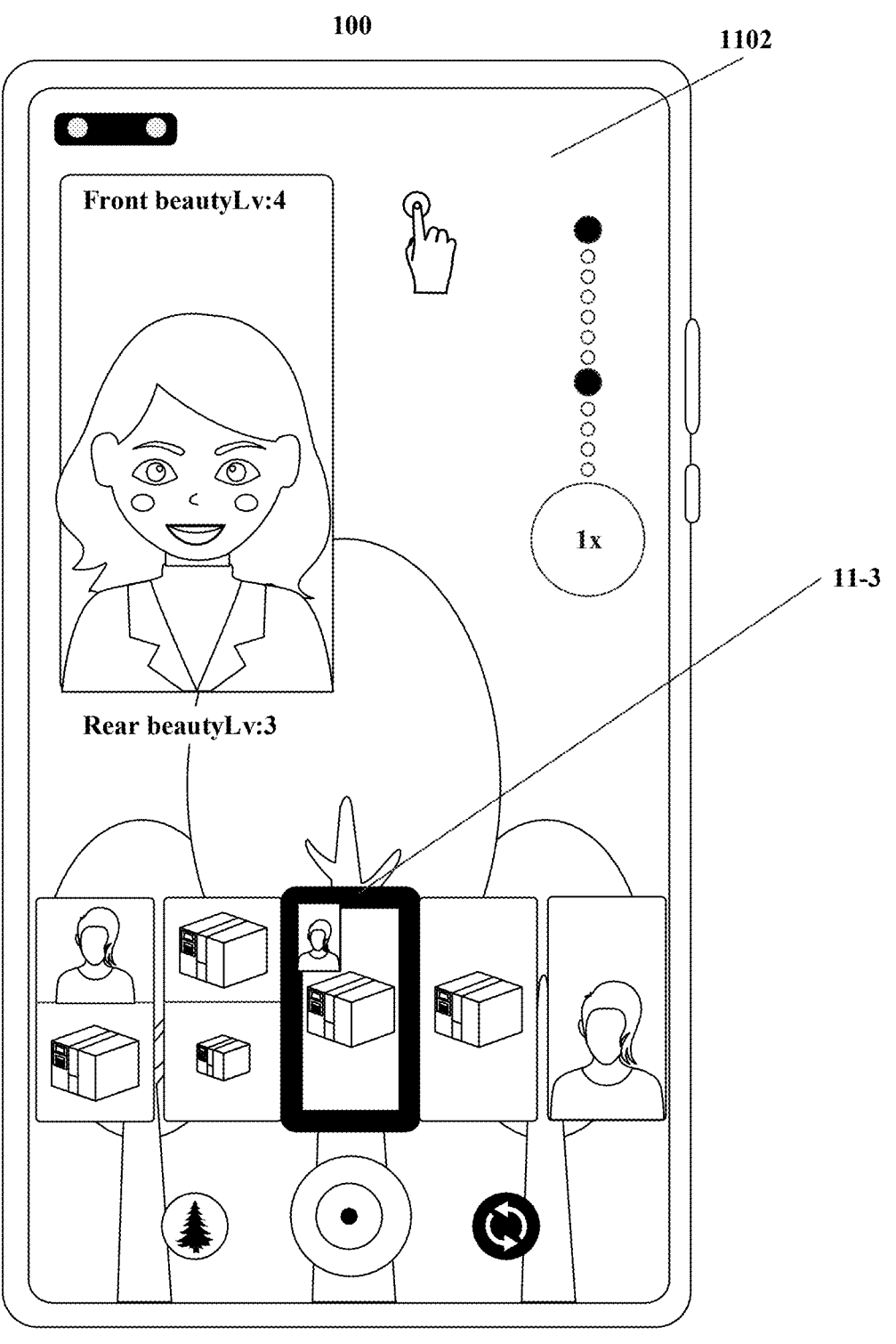
FIG. 11B is a schematic diagram of an interface for switching a multi-lens video recording mode of a mobile phone according to an embodiment of this application.

FIG. 11A-FIG. 11B are schematic diagrams of an interface for switching a multi-lens video recording mode of a mobile phone according to an embodiment of this application. For example, when the user taps the switching control 10-6 in the camera interface 1006, the mobile phone 100 may display a camera interface 1101 shown in FIG. 11A. The camera interface 1101 includes mode controls 11-1, 11-2, 11-3, 11-4, and 11-5. The mode control 11-1 is in a selected state, to indicate that the mobile phone is currently in the front-rear dual-camera mode of multi-lens video recording. An example of the selected state is that the control is in an edge-bolded state or a highlighted state. If the user taps the mode control 11-3, the mobile phone 100 may display a camera interface 1102 shown in FIG. 11B. The mode control 11-3 in the camera interface 1102 is in a selected state, to indicate that the mobile phone is currently in the picture-in-picture mode of multi-lens video recording. Because the user previously configures the front beauty parameter value as 4 in the camera interface 1003 and configures the rear beauty parameter value as 3 in the camera interface 1005, the camera interface 1102 inherits the previously configured beauty parameters, and the mobile phone performs beauty processing on the video picture of the front-facing camera lens based on the beauty parameter value 4, and performs beauty processing on the video picture of the rear-facing camera lens based on the beauty parameter value 3.

In some other embodiments, the camera interface 1101 may alternatively be displayed in another manner. For example, in the camera interface 1005, in response to a gesture operation (for example, an upward slide operation performed at a preset location in the camera interface 1005) of the user, the mobile phone 100 may also display the camera interface 1101 shown in FIG. 11A.

Figure 11C:
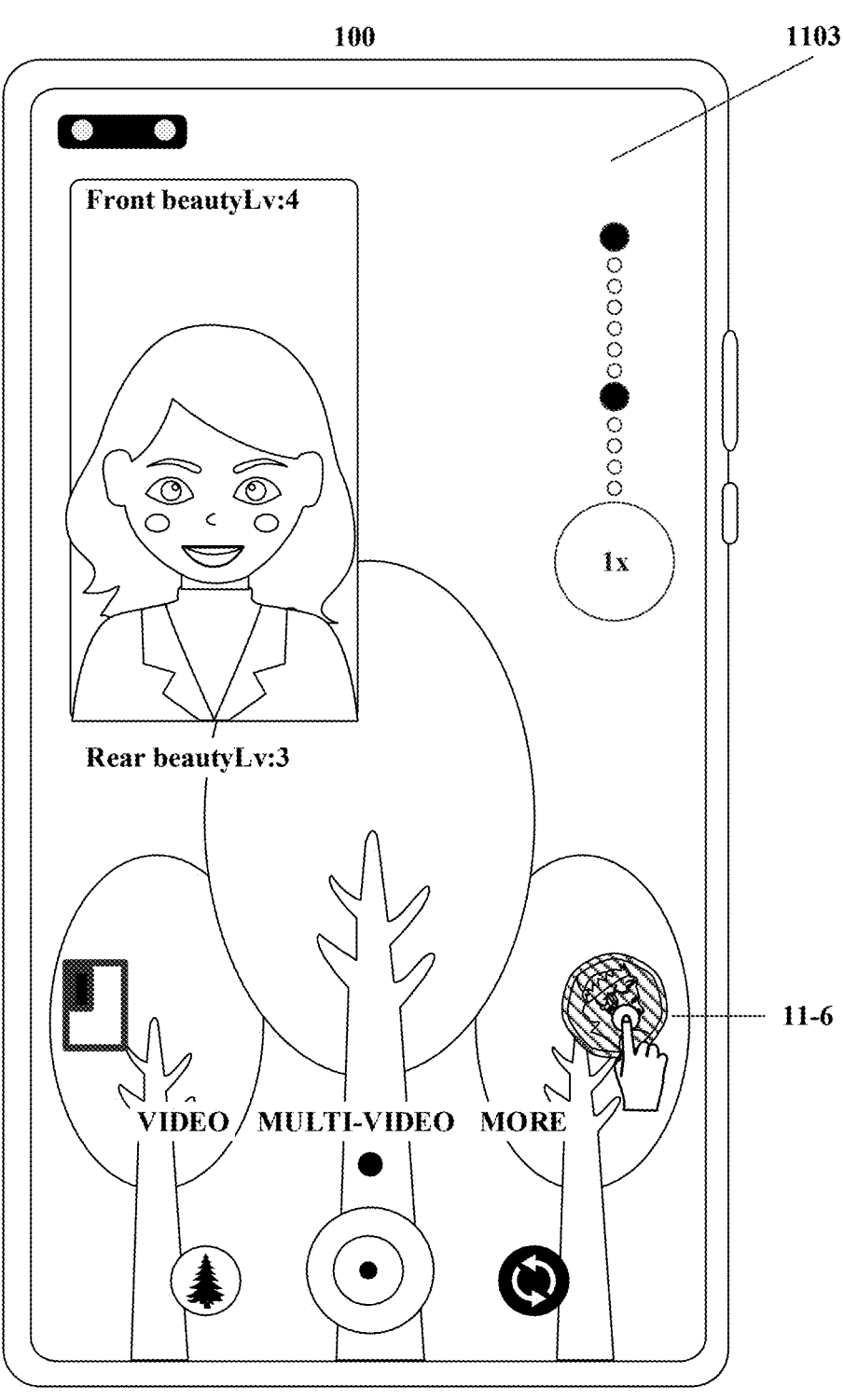
FIG. 11C is a schematic diagram of an interface of a picture-in-picture mode of multi-lens video recording on a mobile phone according to an embodiment of this application.
Figure 11D:
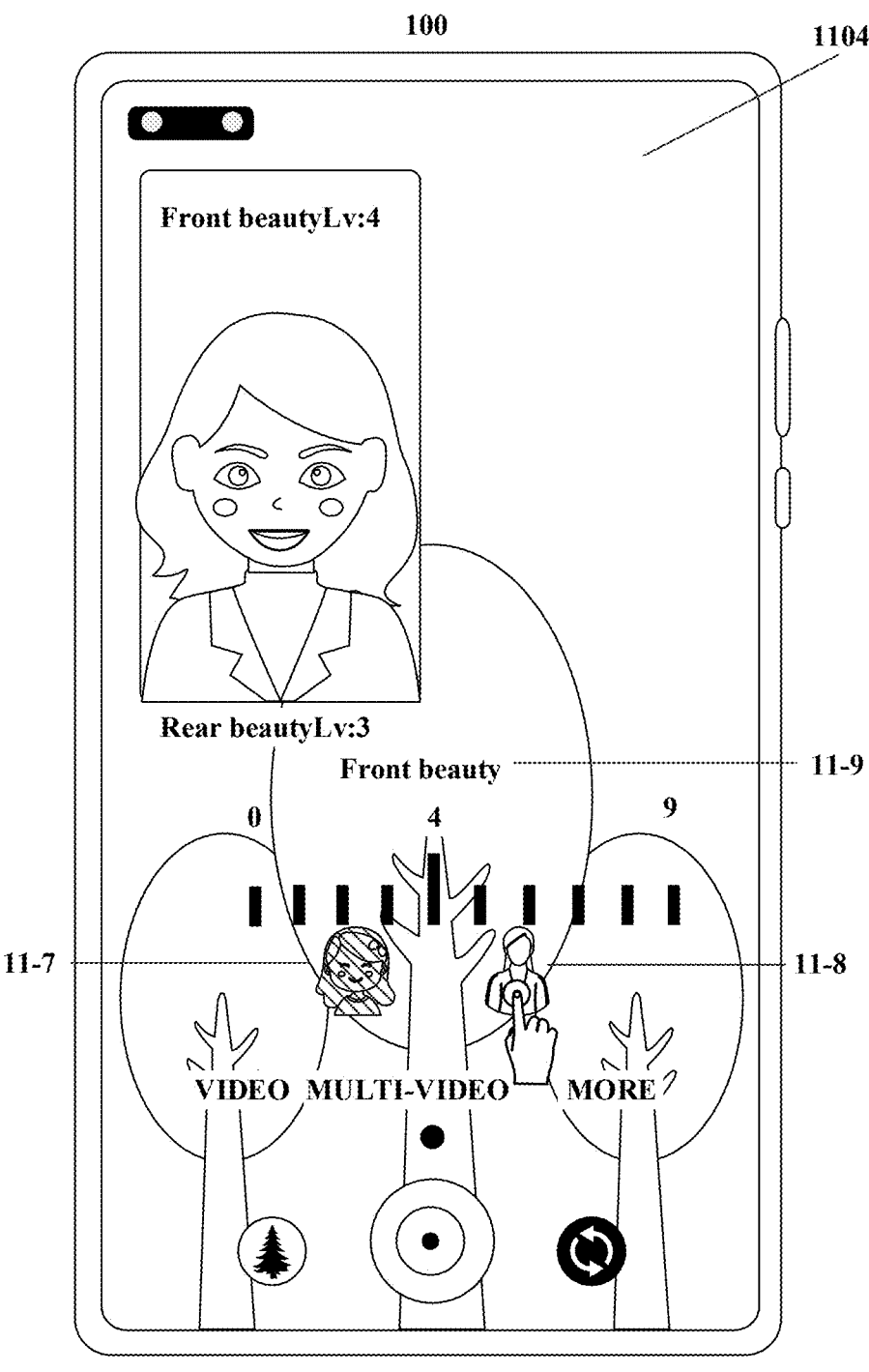
FIG. 11D is a schematic diagram of an interface of a picture-in-picture mode of multi-lens video recording on a mobile phone according to an embodiment of this application.
Figure 11E:
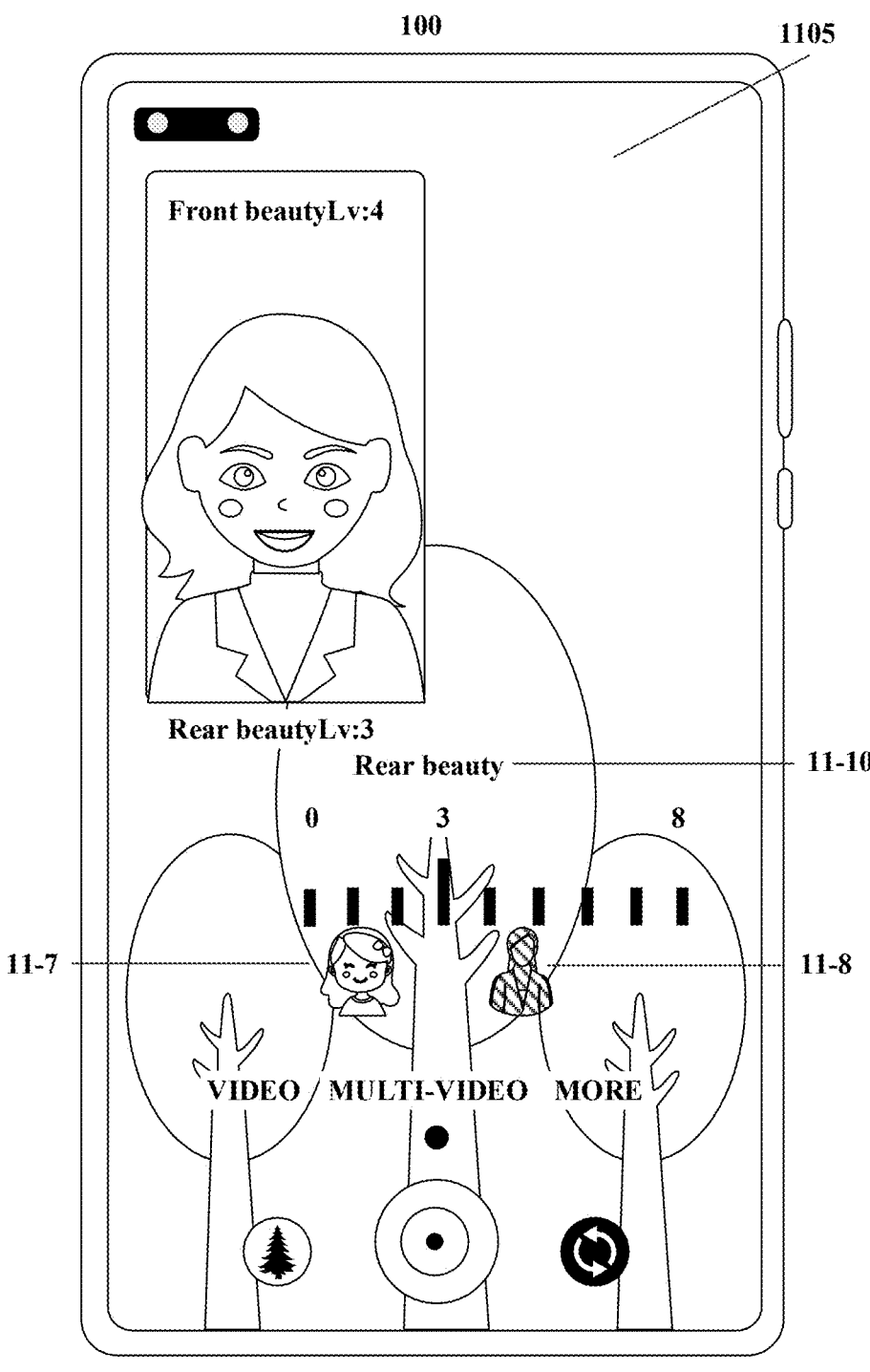
FIG. 11E is a schematic diagram of an interface of a picture-in-picture mode of multi-lens video recording on a mobile phone according to an embodiment of this application.

FIG. 11C-FIG. 11E are schematic diagrams of an interface of a picture-in-picture mode of a multi-lens video recording on a mobile phone according to an embodiment of this application. For example, after the user taps a blank location in the camera interface 1102 or waits for preset time, the mobile phone 100 may display a camera interface 1103 shown in FIG. 11C. The preset time may be set based on an actual requirement. The camera interface 1103 includes a beauty control 11-6. The beauty control 11-6 is in an enabled state.

If the user taps the beauty control 11-6, the mobile phone 100 may display a camera interface 1104 shown in FIG. 11D. The beauty control 11-6 expands into a front beauty control 11-7, a rear beauty control 11-8, and a front configuration control 11-9. The front beauty control 11-7 is in a selected state. The rear beauty control 11-8 is in an unselected state. The front beauty parameter value is 4. The user may configure the front beauty parameter by adjusting the front configuration control 11-9. If the user taps the rear beauty control 11-8, the mobile phone 100 may display a camera interface 1105 shown in FIG. 11E. The camera interface 1105 includes the front beauty control 11-7, the rear beauty control 11-8, and a rear configuration control 11-10. The front beauty control 11-7 is in an unselected state. The rear beauty control 11-8 is in a selected state. The rear beauty parameter value is 3. The user may configure the rear beauty parameter by adjusting the rear configuration control 11-10. In this case, the mobile phone performs beauty processing on the video picture of the front-facing camera lens based on the beauty parameter value 4, and performs beauty processing on the video picture of the rear-facing camera lens based on the beauty parameter value 3.

Scenario 5: a Scenario of a Front Single-Camera Mode of Multi-Lens Video Recording.

Figure 12A:
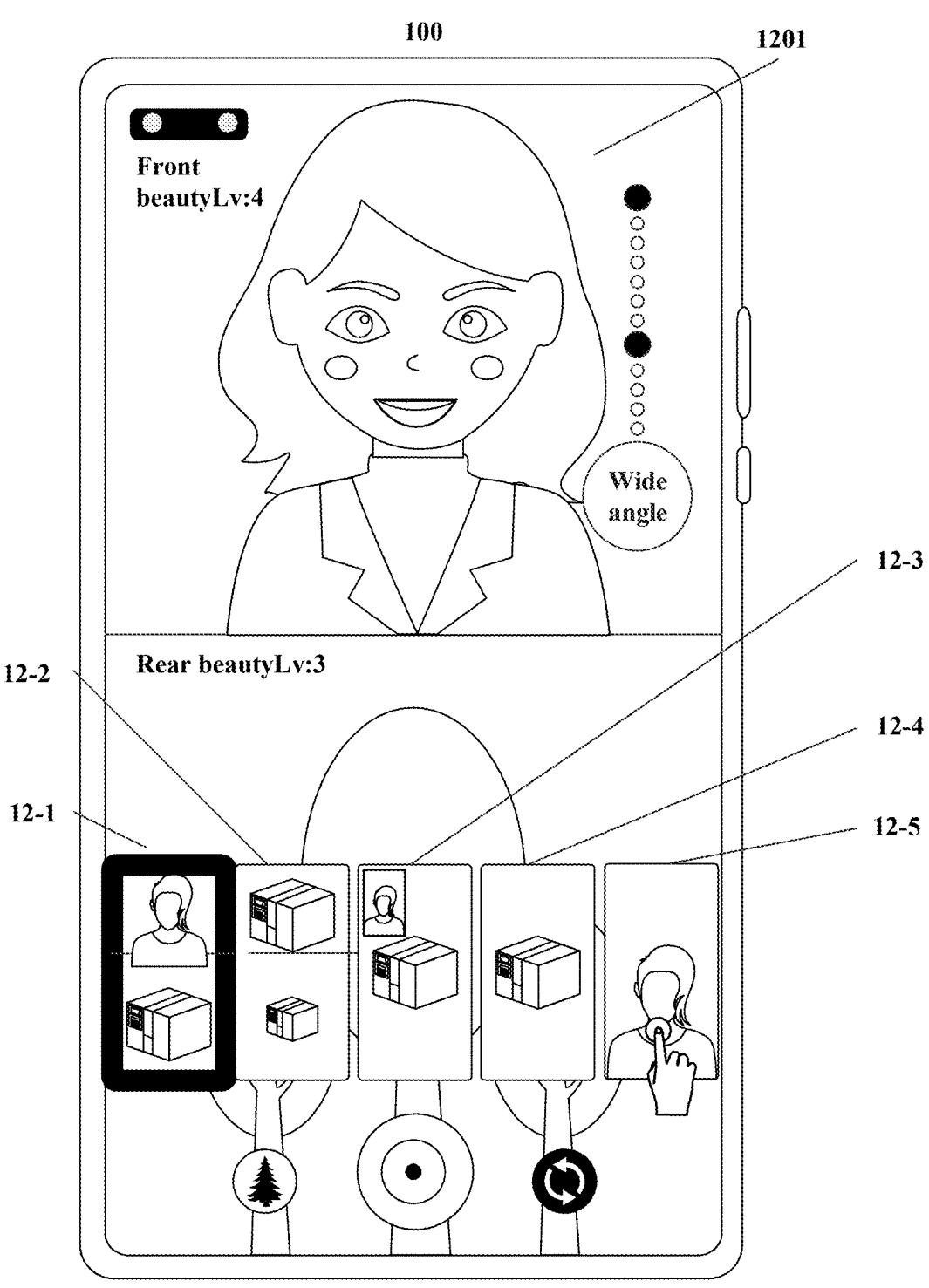
FIG. 12A is a schematic diagram of an interface for switching a multi-lens video recording mode of a mobile phone according to an embodiment of this application.
Figure 12B:
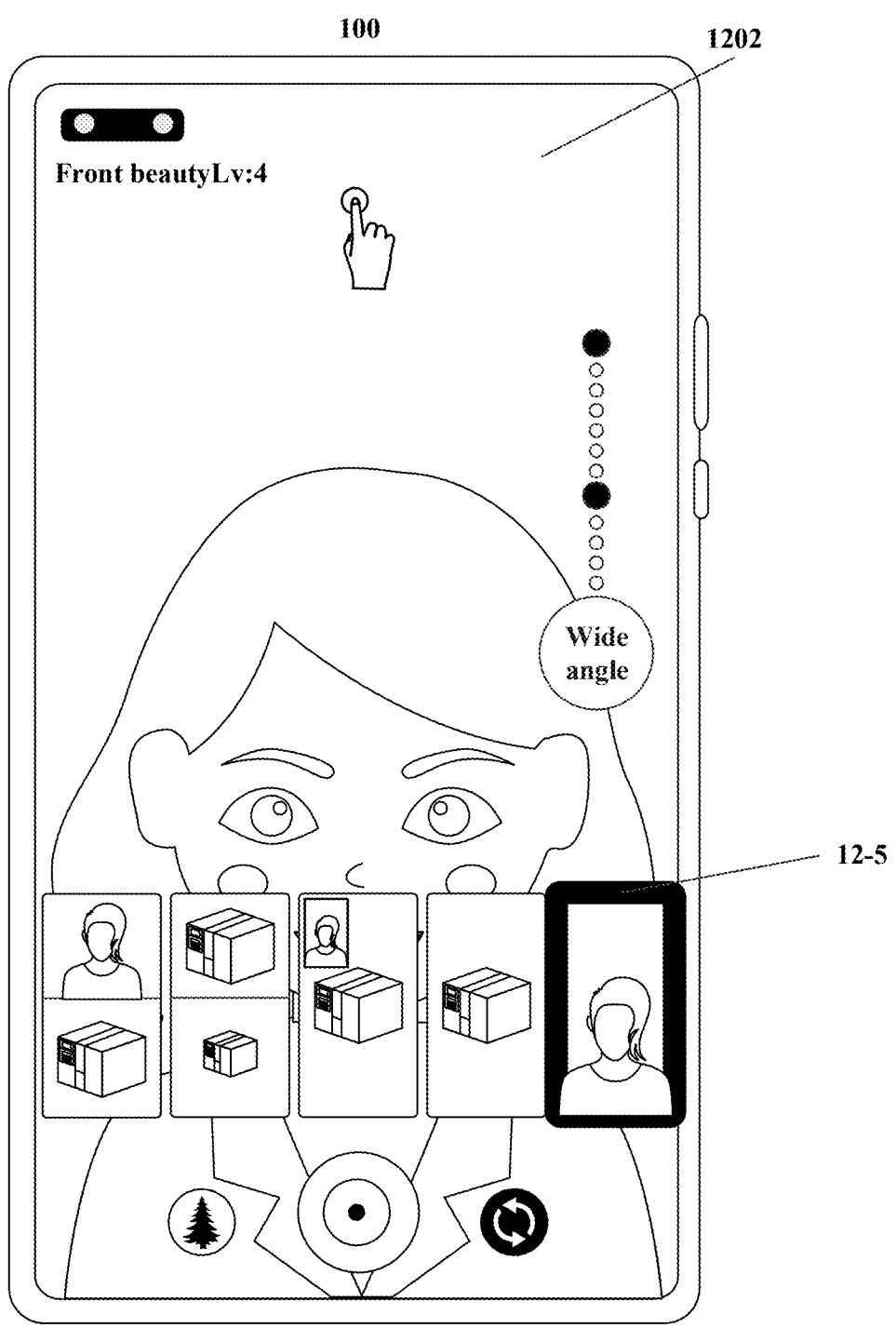
FIG. 12B is a schematic diagram of an interface for switching a multi-lens video recording mode of a mobile phone according to an embodiment of this application.

FIG. 12A-FIG. 12B are schematic diagrams of an interface for switching a multi-lens video recording mode of a mobile phone according to an embodiment of this application. For example, when the user taps the switching control 10-6 in the camera interface 1006, the mobile phone 100 may display a camera interface 1201 shown in FIG. 12A. The camera interface 1201 includes mode controls 12-1, 12-2, 12-3, 12-4, and 12-5. The mode control 12-1 is in a selected state, to indicate that the mobile phone is currently in the front-rear dual-camera mode of multi-lens video recording. If the user taps the mode control 12-5, the mobile phone 100 may display a camera interface 1202 shown in FIG. 12B. The mode control 12-5 in the camera interface 1202 is in a selected state, to indicate that the mobile phone is currently in the front single-camera mode of multi-lens video recording.

Figure 12C:
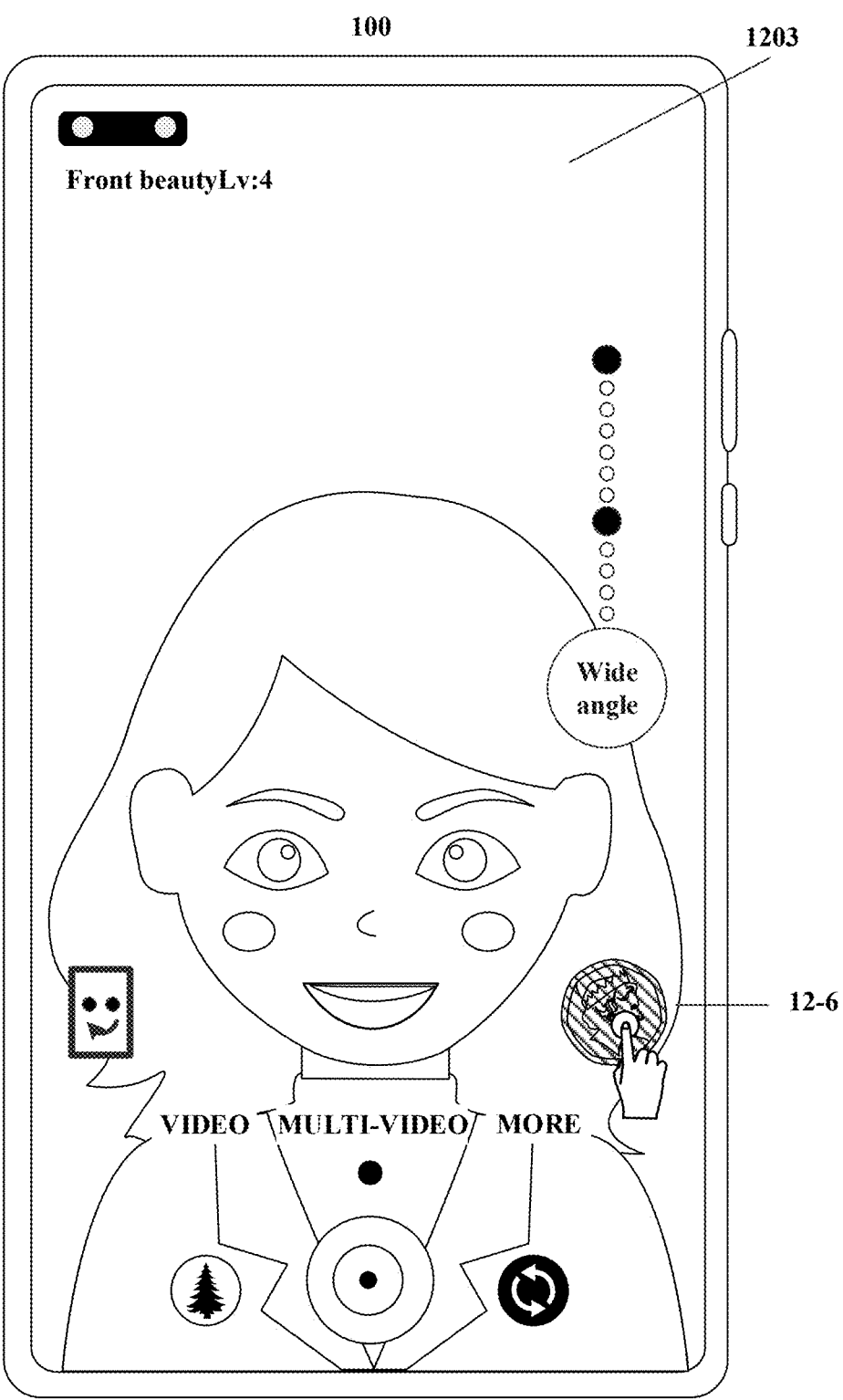
FIG. 12C is a schematic diagram of an interface of a front single-camera mode of multi-lens video recording on a mobile phone according to an embodiment of this application.
Figure 12D:
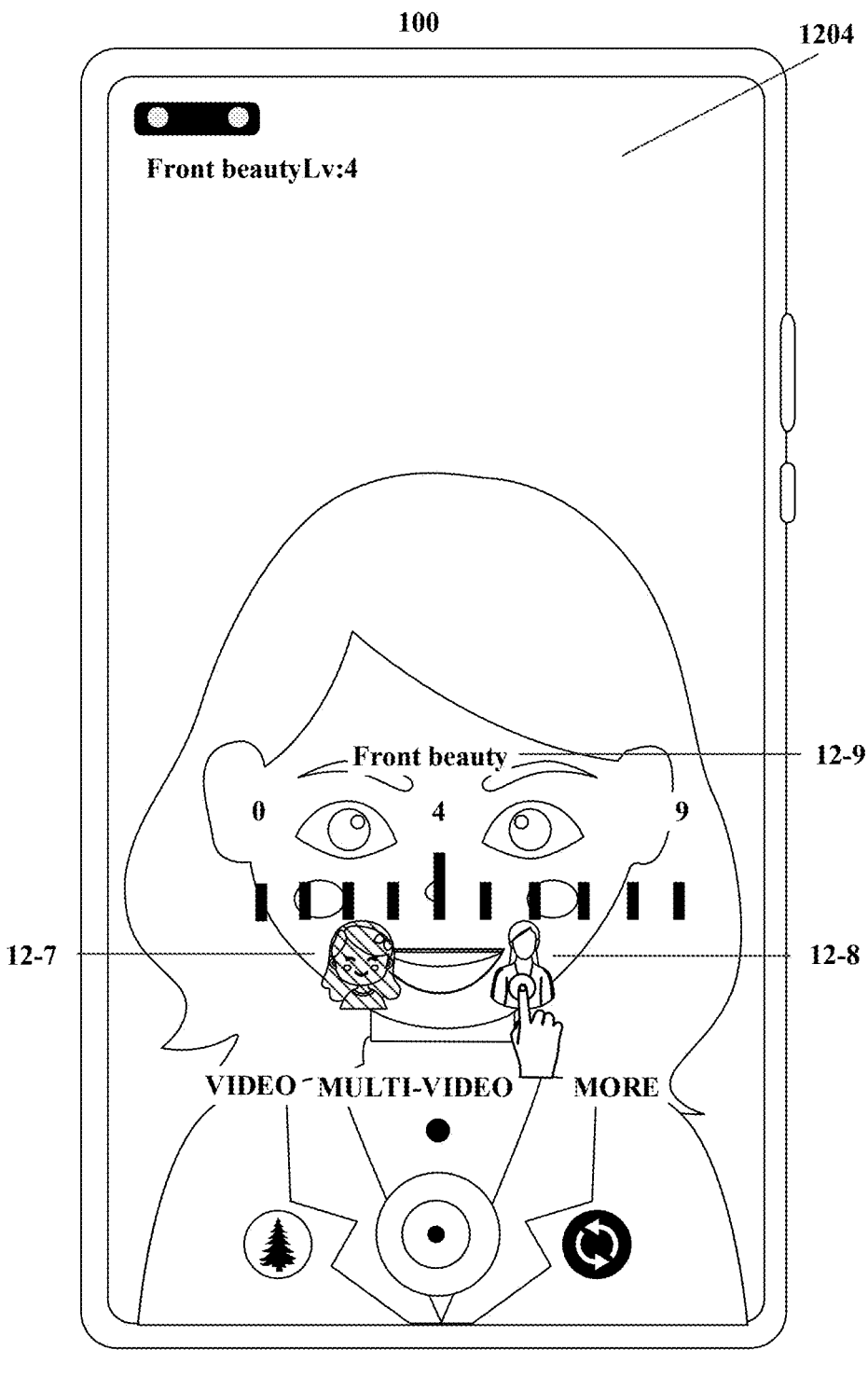
FIG. 12D is a schematic diagram of an interface of a front single-camera mode of multi-lens video recording on a mobile phone according to an embodiment of this application.
Figure 12E:
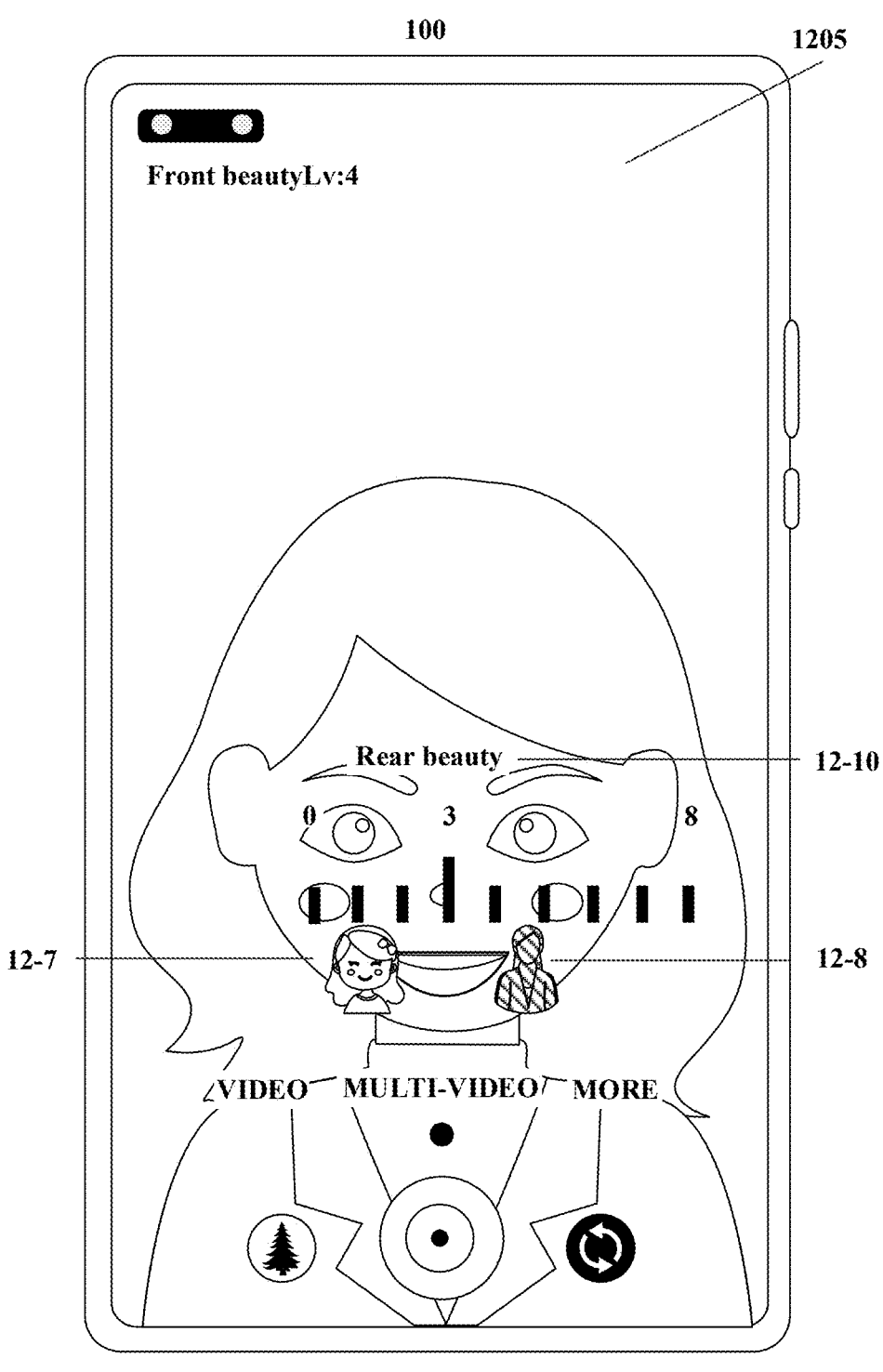
FIG. 12E is a schematic diagram of an interface of a front single-camera mode of multi-lens video recording on a mobile phone according to an embodiment of this application.

FIG. 12C-FIG. 12E are schematic diagrams of an interface of a front single-camera mode according to an embodiment of this application. For example, after the user taps a blank location in the camera interface 1202 or waits for preset time, the mobile phone 100 may display a camera interface 1203 shown in FIG. 12C. The preset time may be set based on an actual requirement. The camera interface 1203 includes a beauty control 12-6. The beauty control 12-6 is in an enabled state. If the user taps the beauty control 12-6, the mobile phone 100 may display a camera interface 1204 shown in FIG. 12D. The beauty control 12-6 expands into a front beauty control 12-7, a rear beauty control 12-8, and a front configuration control 12-9. The front beauty control 12-7 is in a selected state. The rear beauty control 12-8 is in an unselected state. The front beauty parameter value is 4. The user may configure the front beauty parameter by adjusting the front configuration control 12-9. If the user taps the rear beauty control 12-8, the mobile phone 100 may display a camera interface 1205 shown in FIG. 12E. The camera interface 1205 includes the front beauty control 12-7, the rear beauty control 12-8, and a rear configuration control 12-10. The front beauty control 12-7 is in an unselected state. The rear beauty control 12-8 is in a selected state. The rear beauty parameter value is 3. The user may configure the rear beauty parameter by adjusting the rear configuration control 12-10. In this case, the mobile phone may perform beauty processing on the video picture of the front-facing camera lens based on the beauty parameter value 4.

Scenario 6: a Scenario of a Rear Single-Camera Mode of Multi-Lens Video Recording.

Figure 13A:
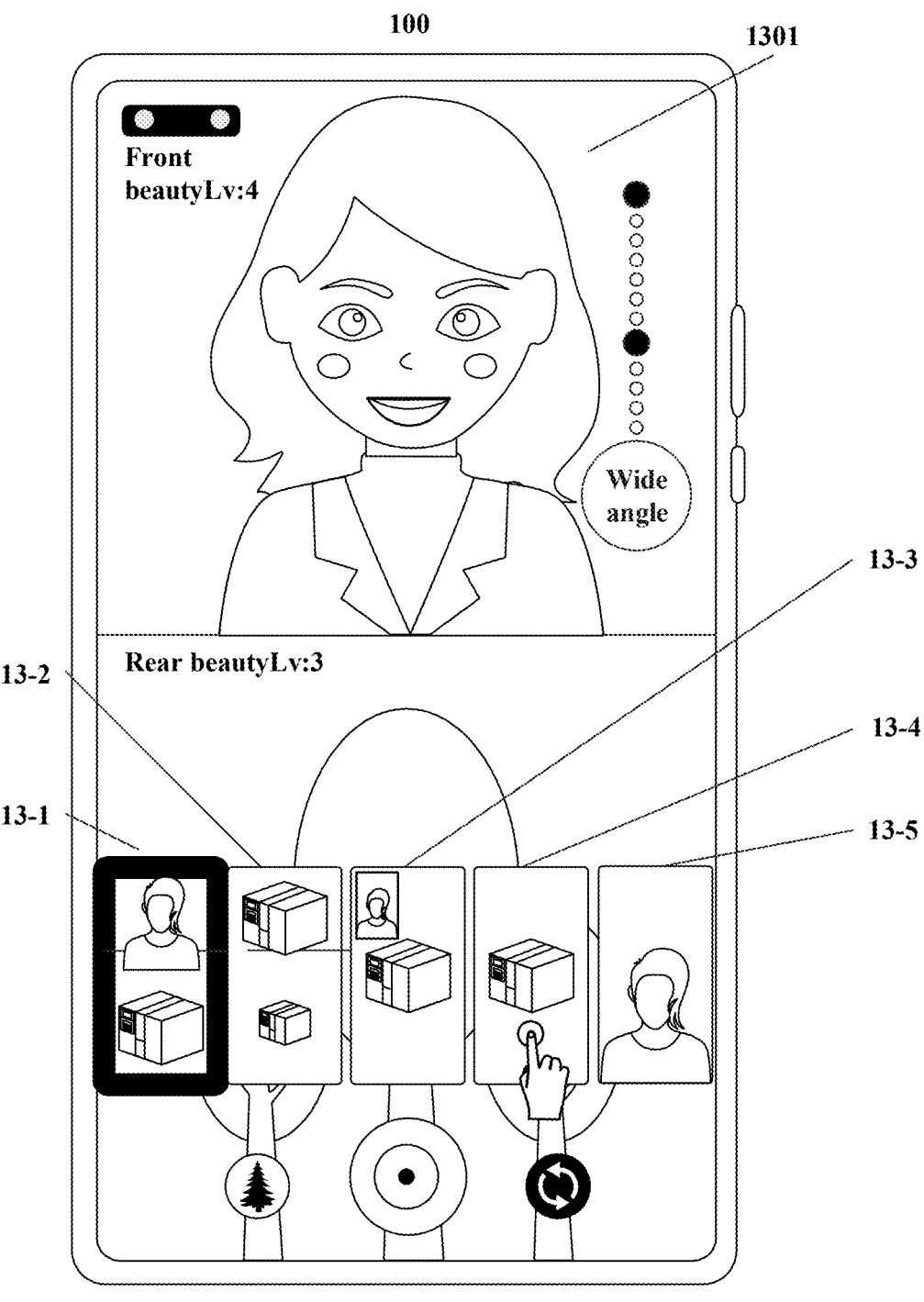
FIG. 13A is a schematic diagram of an interface for switching a multi-lens video recording mode of a mobile phone according to an embodiment of this application.
Figure 13B:
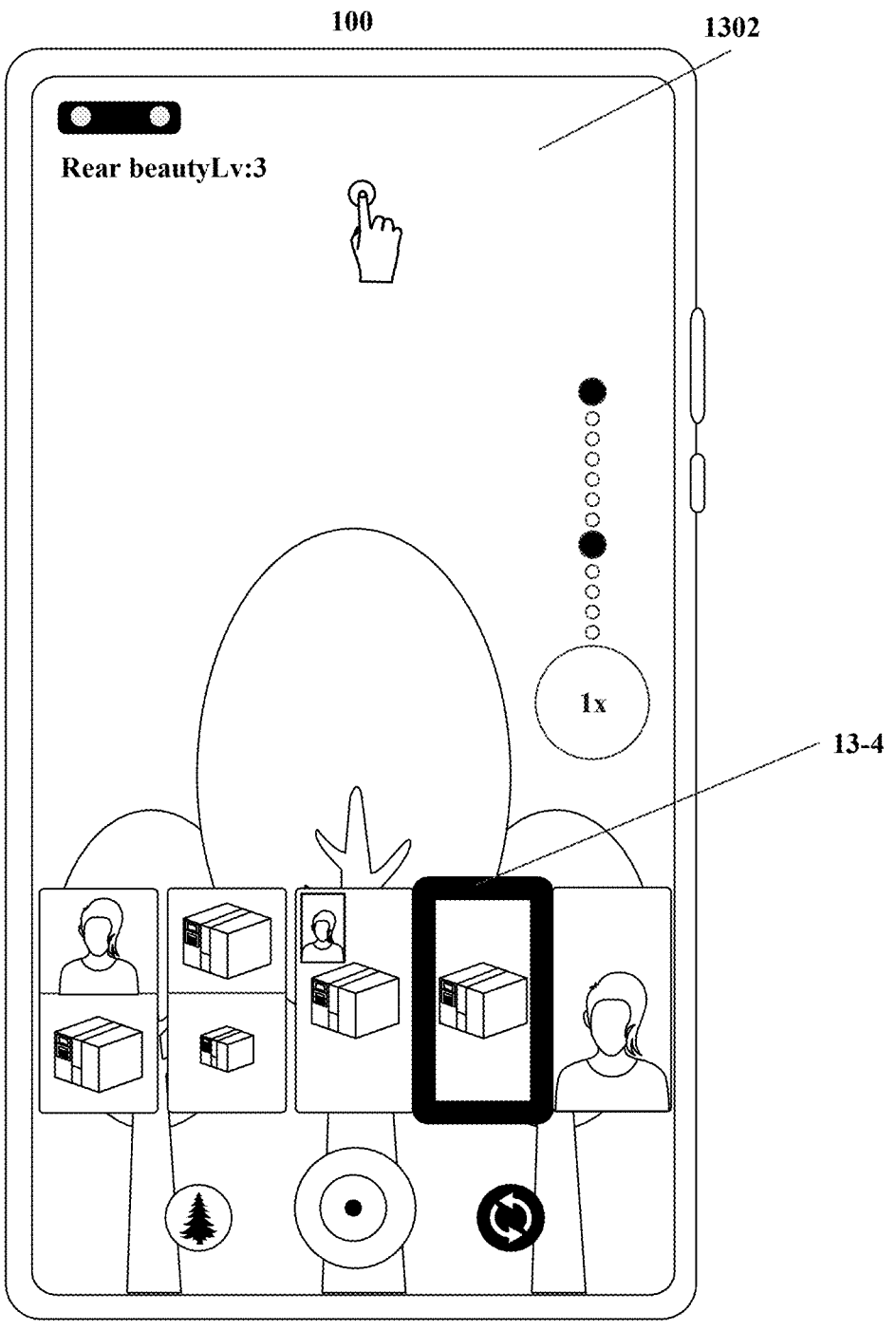
FIG. 13B is a schematic diagram of an interface for switching a multi-lens video recording mode of a mobile phone according to an embodiment of this application.
Figure 13C:
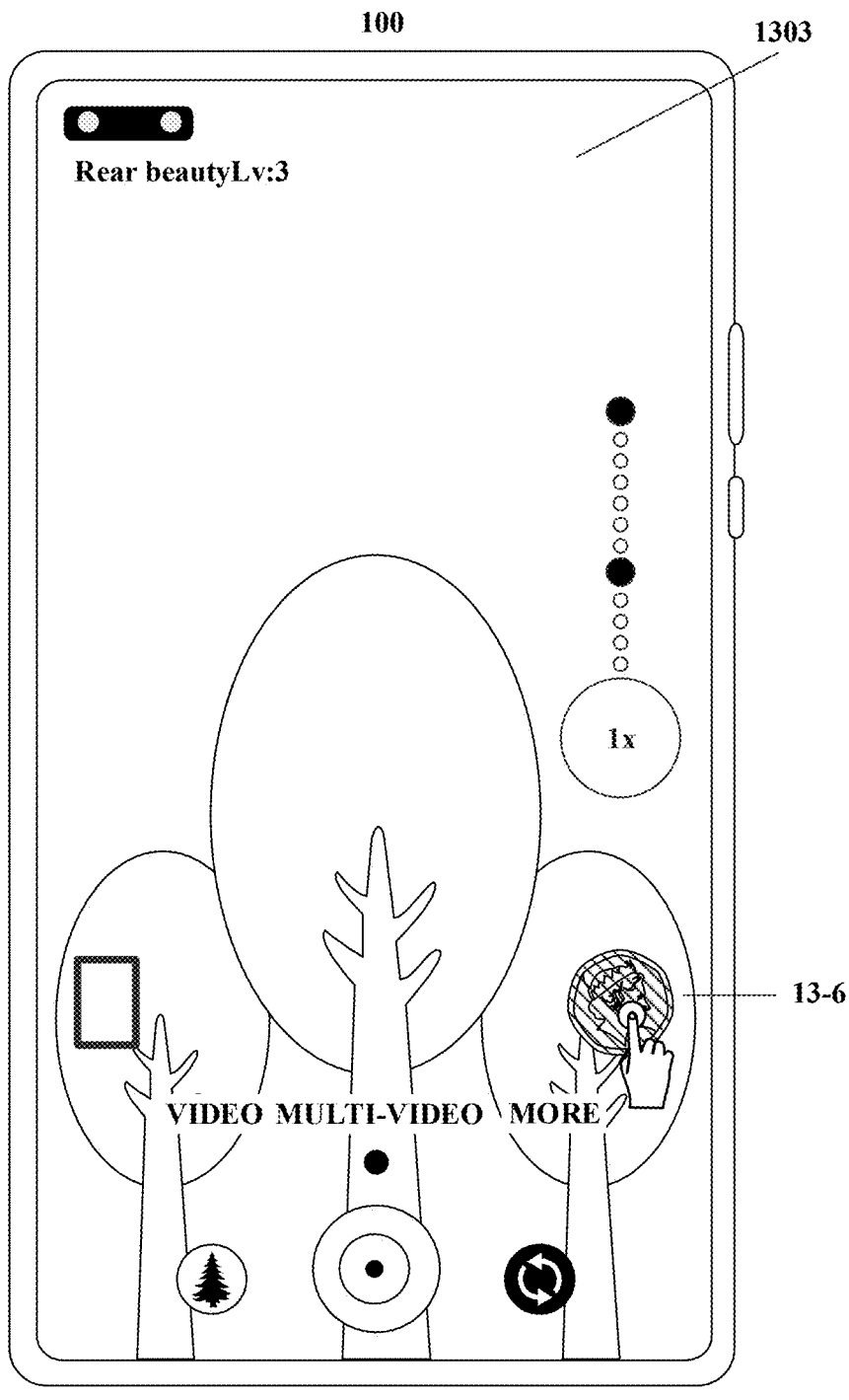
FIG. 13C is a schematic diagram of an interface of a rear single-camera mode of multi-lens video recording on a mobile phone according to an embodiment of this application.
Figure 13D:
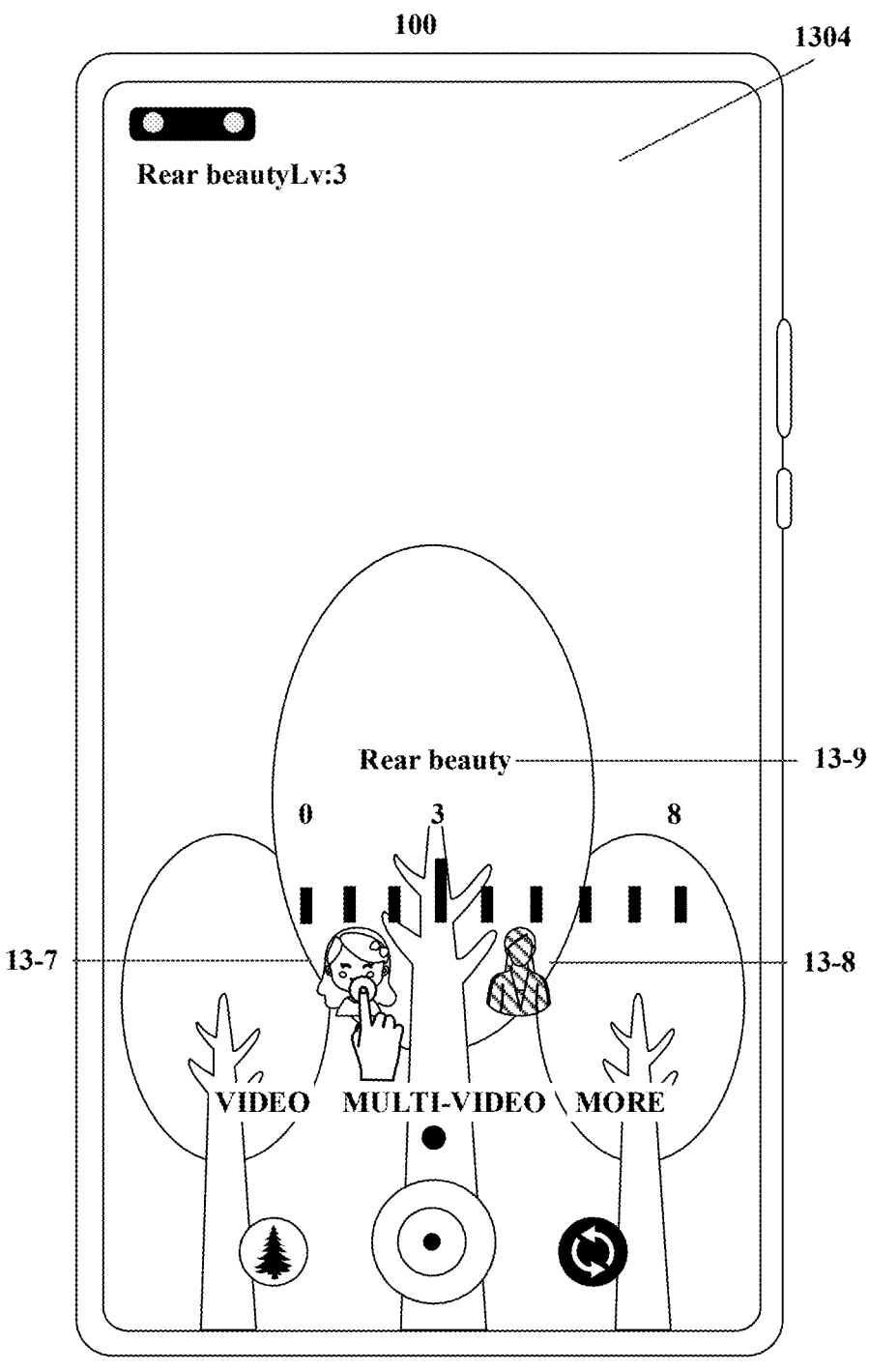
FIG. 13D is a schematic diagram of an interface of a rear single-camera mode of multi-lens video recording on a mobile phone according to an embodiment of this application.
Figure 13E:
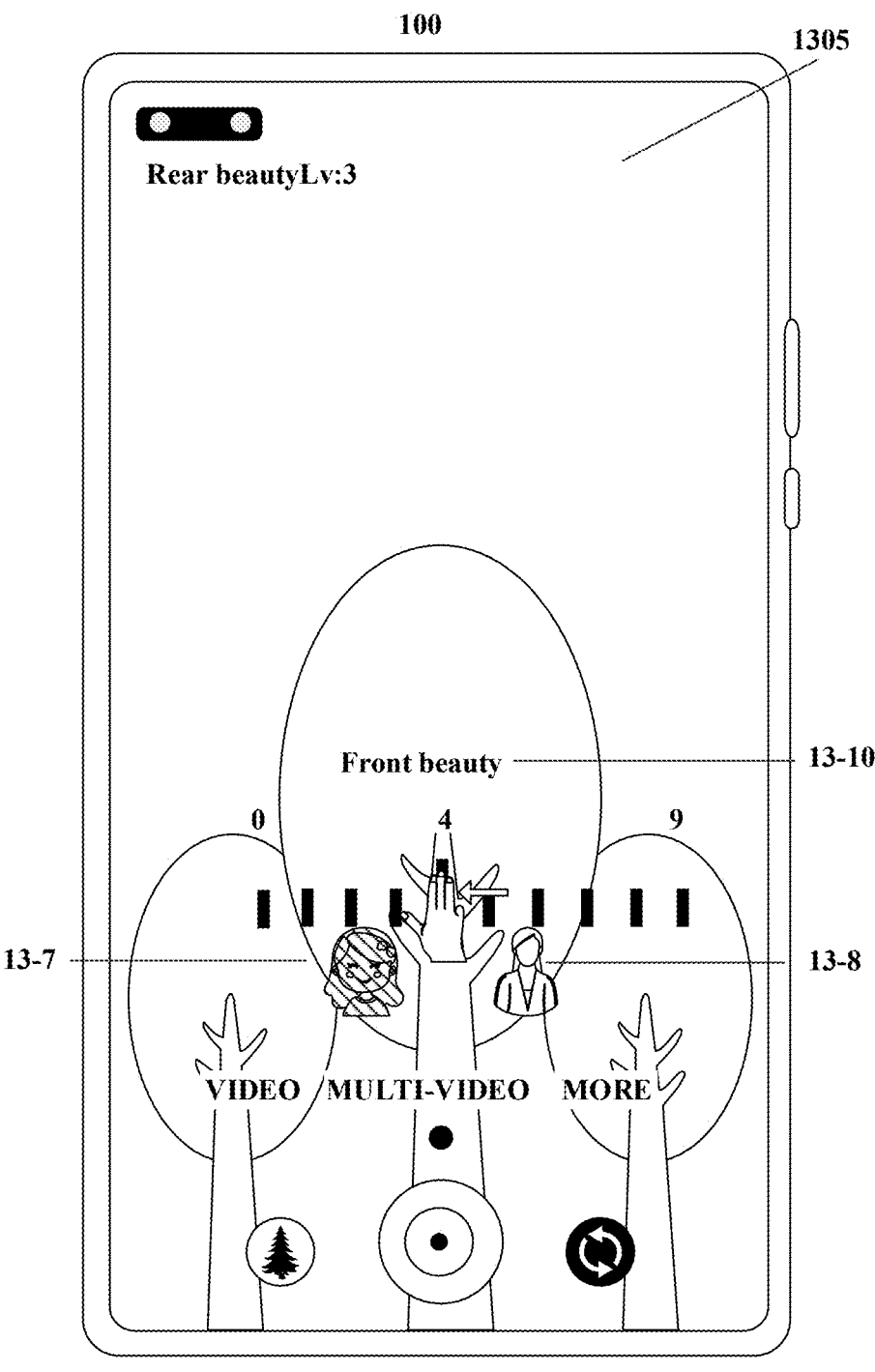
FIG. 13E is a schematic diagram of an interface of a rear single-camera mode of multi-lens video recording on a mobile phone according to an embodiment of this application.
Figure 13F:
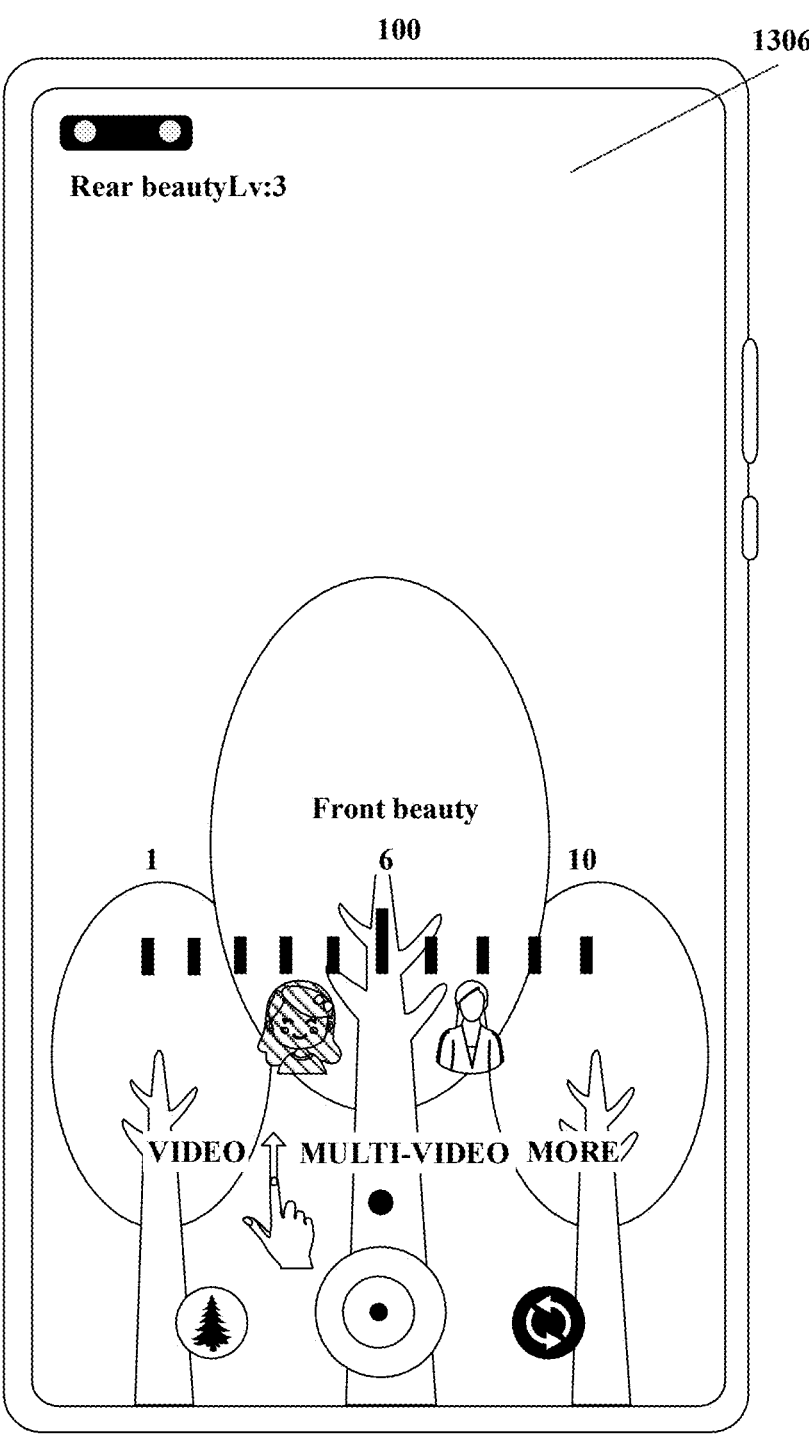
FIG. 13F is a schematic diagram of an interface of a rear single-camera mode of multi-lens video recording on a mobile phone according to an embodiment of this application.

FIG. 13A-FIG. 13B are schematic diagrams of an interface for switching a multi-lens video recording mode of a mobile phone according to an embodiment of this application. For example, when the user taps the switching control 10-6 in the camera interface 1006, the mobile phone 100 may display a camera interface 1301 shown in FIG. 13A. The camera interface 1301 includes multi-lens video recording mode controls 13-1, 13-2, 13-3, 13-4, and 13-5. The mode control 13-1 is in a selected state, to indicate that the mobile phone is currently in the front-rear dual-camera mode of multi-lens video recording. If the user taps the mode control 13-4, the mobile phone 100 may display a camera interface 1302 shown in FIG. 13B. The mode control 13-4 in the camera interface 1302 is in a selected state, to indicate that the mobile phone is currently in the rear single-camera mode of multi-lens video recording.

FIG. 13C-FIG. 13F are schematic diagrams of an interface of a rear single-camera mode according to an embodiment of this application. For example, after the user taps a blank location in the camera interface 1302 or waits for preset time, the mobile phone 100 may display a camera interface 1303 shown in FIG. 13C. The preset time may be set based on an actual requirement. The camera interface 1303 includes a beauty control 13-6. The beauty control 13-6 is in an enabled state. If the user taps the beauty control 13-6, the mobile phone 100 may display a camera interface 1304 shown in FIG. 13D. The beauty control 13-6 expands into a front beauty control 13-7, a rear beauty control 13-8, and a rear configuration control 13-9. The front beauty control 13-7 is in an unselected state. The rear beauty control 13-8 is in a selected state. The rear beauty parameter value is 3. The user may configure the rear beauty parameter by adjusting the rear configuration control 13-9. If the user taps the front beauty control 13-7, the mobile phone 100 may display a camera interface 1305 shown in FIG. 13E. The camera interface 1305 includes the front beauty control 13-7, the rear beauty control 13-8, and a front configuration control 13-10. The front beauty control 13-7 is in a selected state. The rear beauty control 13-8 is in an unselected state. The front beauty parameter value is 4. The user may configure the front beauty parameter by adjusting the front configuration control 13-10. In this case, the mobile phone may perform beauty processing on the video picture of the rear-facing camera lens based on the beauty parameter value 3. Further, if the user configures the front beauty parameter value as 6, the mobile phone 100 may display a camera interface 1306 shown in FIG. 13F.

Figure 13G:
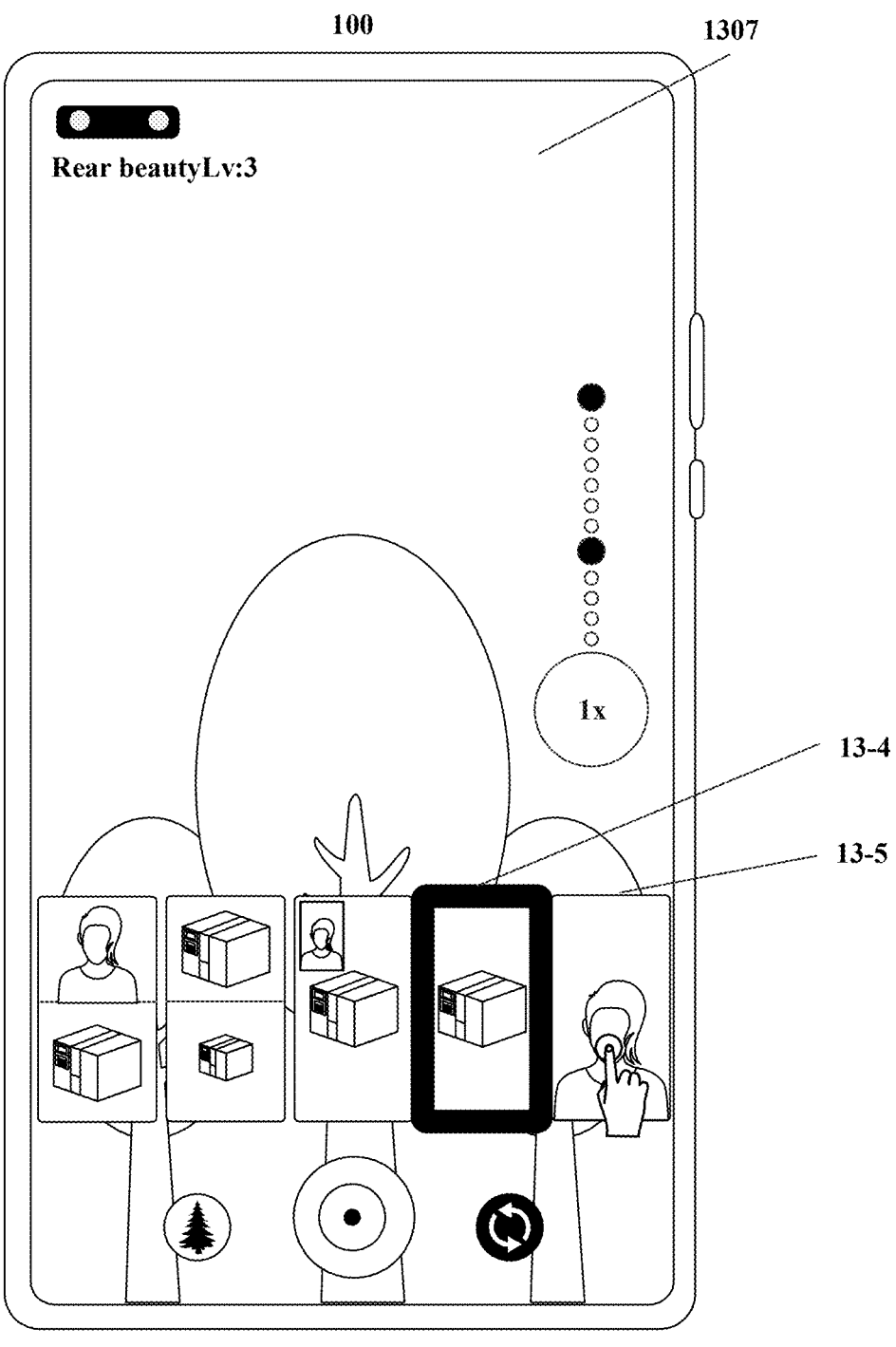
FIG. 13G is a schematic diagram of an interface for switching a multi-lens video recording mode of a mobile phone according to an embodiment of this application.
Figure 13H:
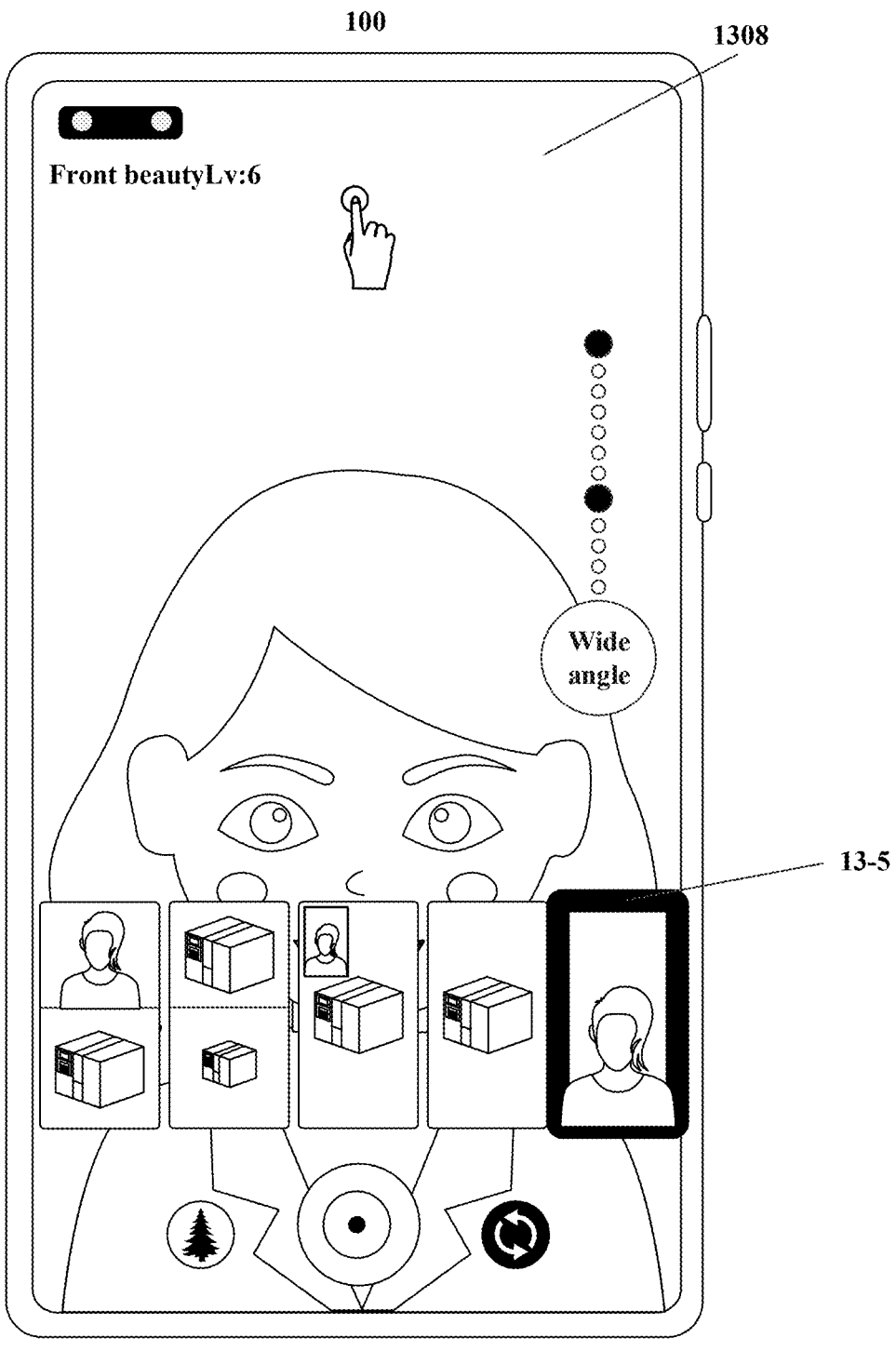
FIG. 13H is a schematic diagram of an interface for switching a multi-lens video recording mode of a mobile phone according to an embodiment of this application.

FIG. 13G-FIG. 13H are schematic diagrams of an interface for switching a multi-lens video recording mode of a mobile phone according to an embodiment of this application. For example, if the user performs an upward slide operation at a preset location in the camera interface 1306, the mobile phone 100 may display a camera interface 1307 shown in FIG. 13G. The camera interface 1307 includes the multi-lens video recording mode controls 13-4 and 13-5. The mode control 13-4 is in a selected state, to indicate that the mobile phone is currently in the rear single-camera mode of multi-lens video recording. If the user taps the mode control 13-5, the mobile phone 100 may display a camera interface 1308 shown in FIG. 13H. The mode control 13-5 in the camera interface 1308 is in a selected state, to indicate that the mobile phone is currently in the front single-camera mode of multi-lens video recording.

Figure 13I:
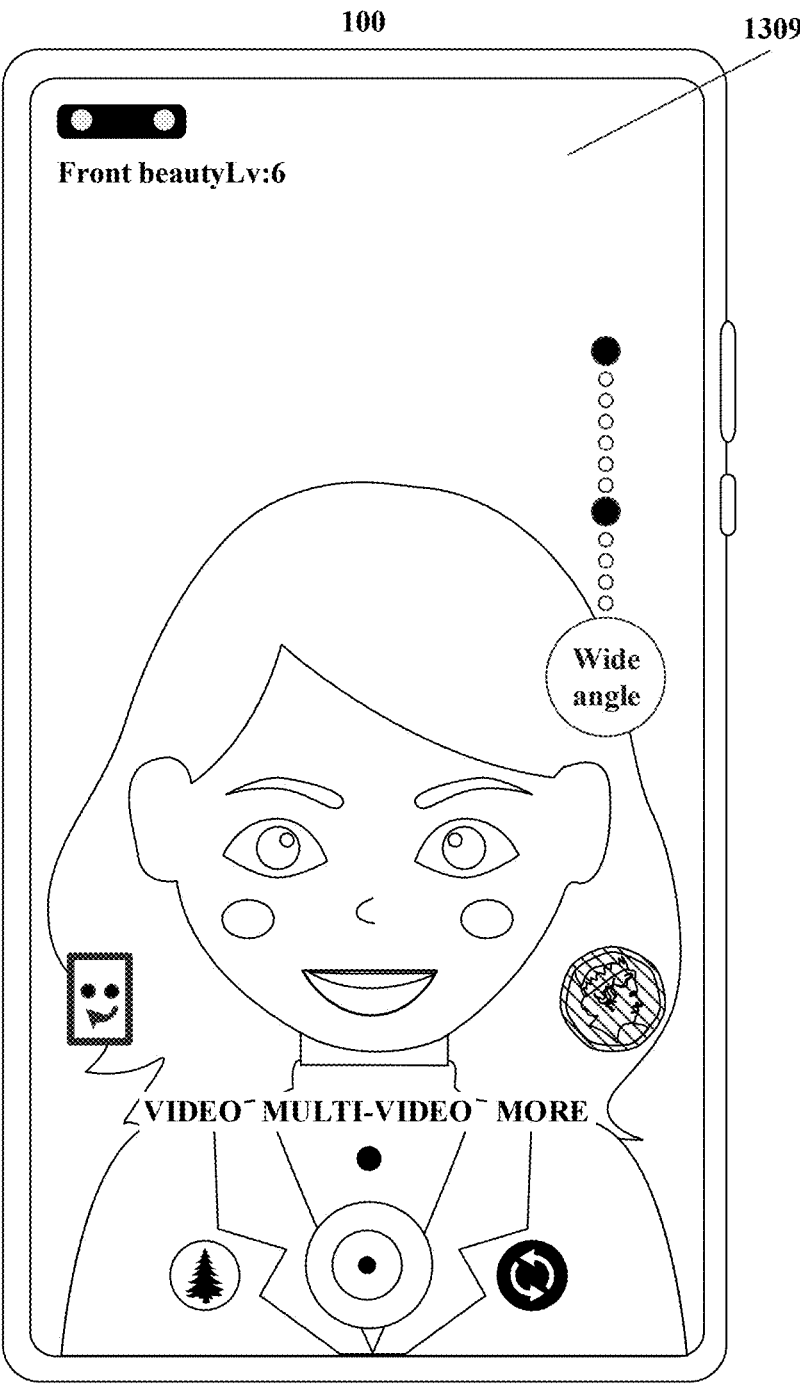
FIG. 13I is a schematic diagram of an interface of a front single-camera mode of multi-lens video recording on a mobile phone according to an embodiment of this application.

FIG. 13I is a schematic diagram of an interface of a front single-camera mode according to an embodiment of this application. For example, after the user taps a blank location in the camera interface 1308 or waits for preset time, the mobile phone 100 may display a camera interface 1309 shown in FIG. 13I. The preset time may be set based on an actual requirement. In this case, the mobile phone may perform beauty processing on the video picture of the front-facing camera lens based on the beauty parameter value 6.

Scenario 7: a Scenario of a Rear-Rear Dual-Camera Mode of Multi-Lens Video Recording.

Figure 14A:
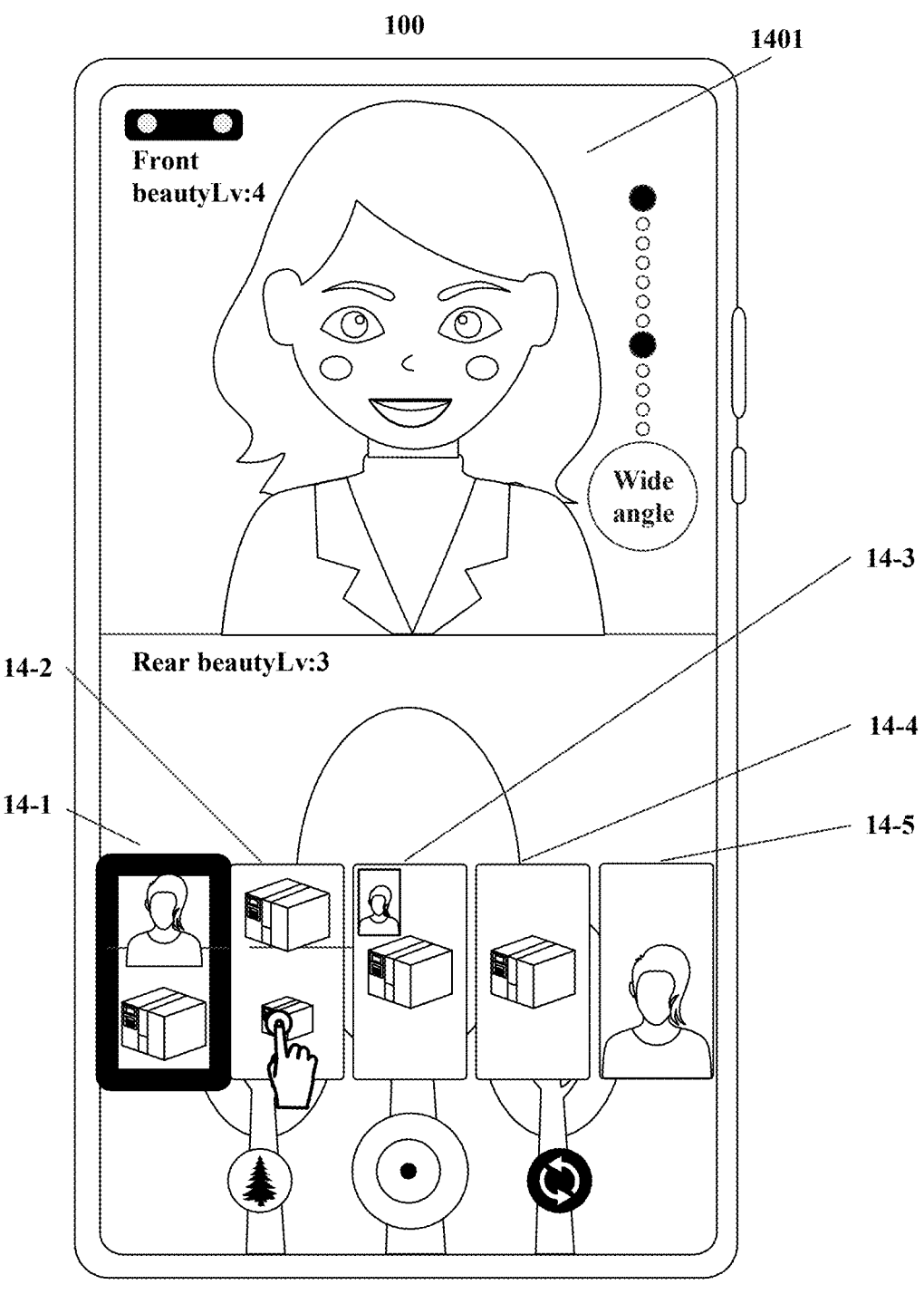
FIG. 14A is a schematic diagram of an interface for switching a multi-lens video recording mode of a mobile phone according to an embodiment of this application.
Figure 14B:
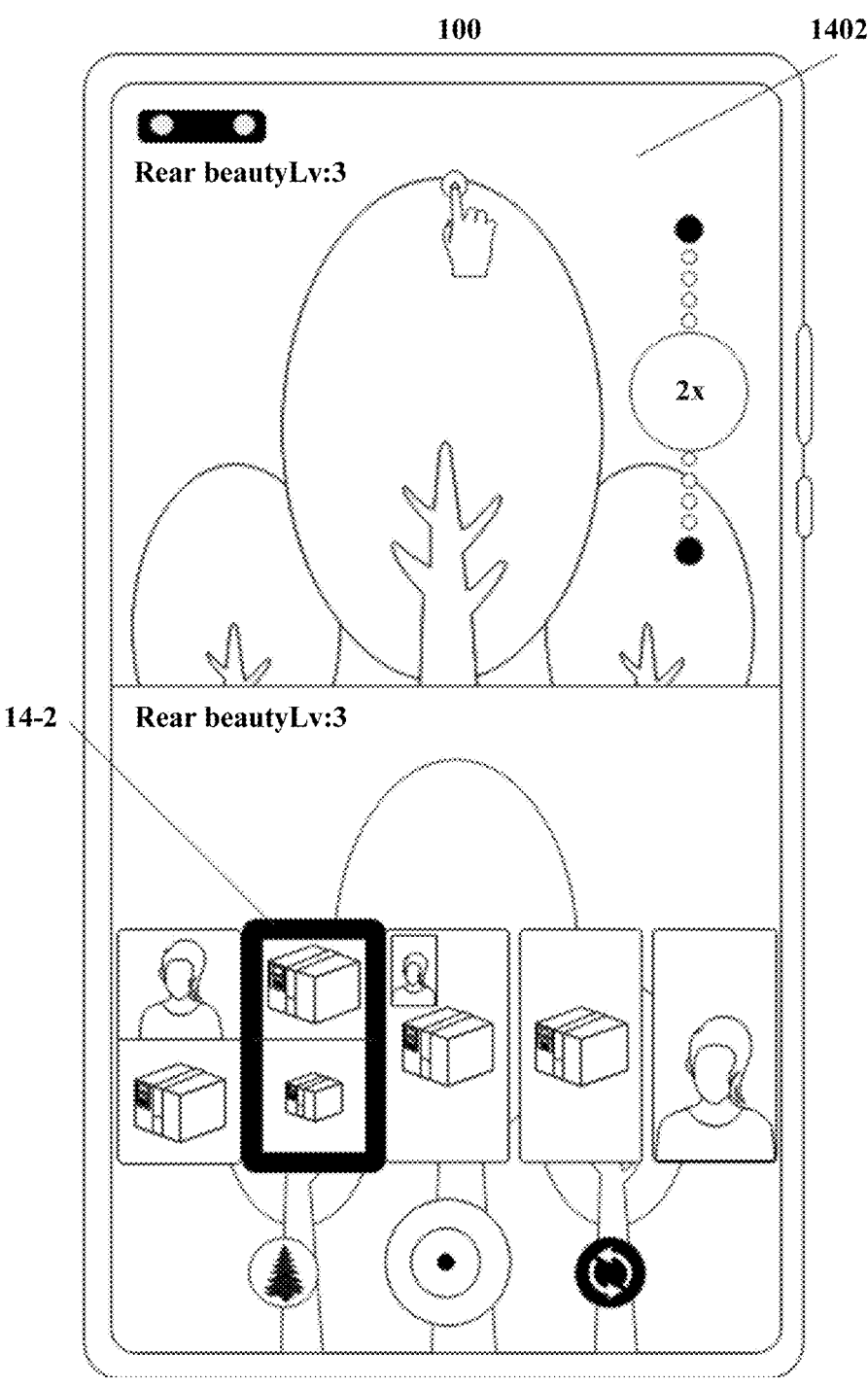
FIG. 14B is a schematic diagram of an interface for switching a multi-lens video recording mode of a mobile phone according to an embodiment of this application.

FIG. 14A-FIG. 14B are schematic diagrams of an interface for switching a multi-lens video recording mode of a mobile phone according to an embodiment of this application. For example, when the user taps the switching control 10-6 in the camera interface 1006, the mobile phone 100 may display a camera interface 1401 shown in FIG. 14A.

The camera interface 1401 includes multi-lens video recording mode controls 14-1, 14-2, 14-3, 14-4, and 14-5. The mode control 14-1 is in a selected state, to indicate that the mobile phone is currently in the front-rear dual-camera mode of multi-lens video recording. If the user taps the mode control 14-2, the mobile phone 100 may display a camera interface 1402 shown in FIG. 14B. The mode control 14-2 in the camera interface 1402 is in a selected state, to indicate that the mobile phone is currently in the rear-rear dual-camera mode of multi-lens video recording.

Figure 14C:
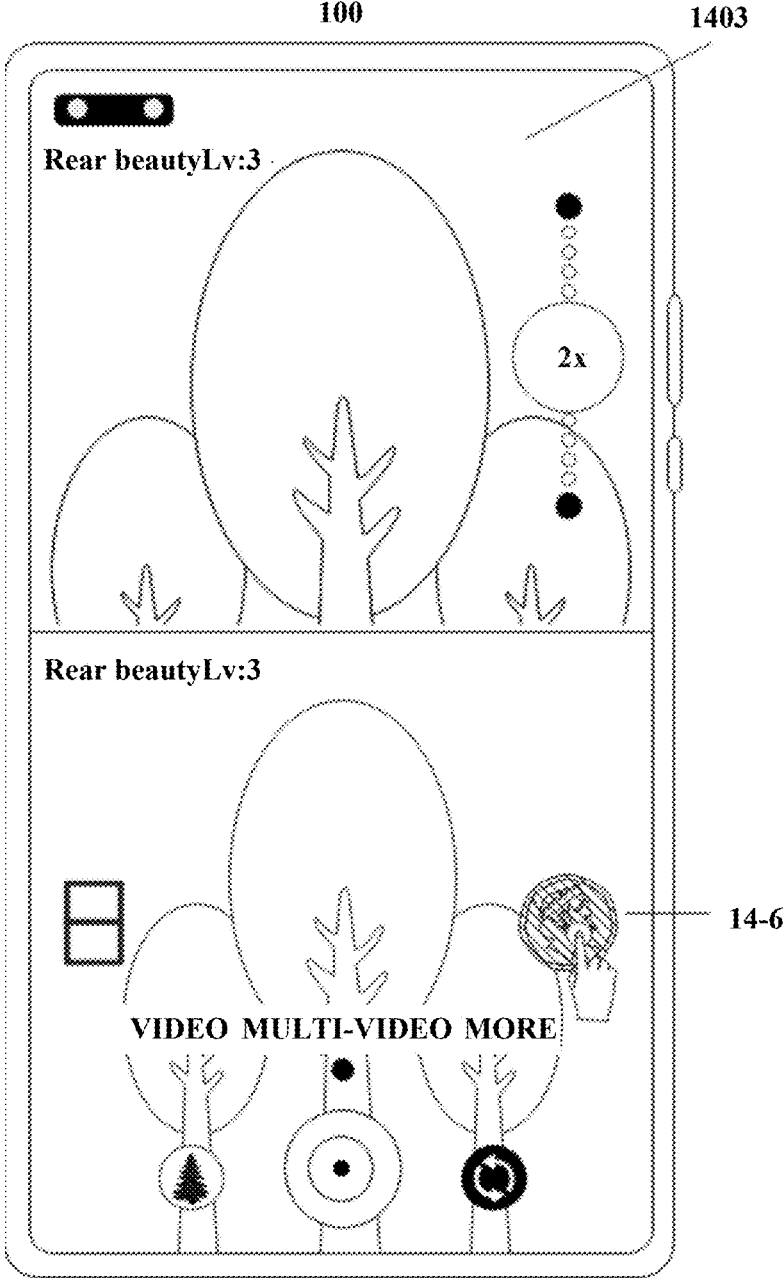
FIG. 14C is a schematic diagram of an interface of a rear-rear dual-camera mode of multi-lens video recording on a mobile phone according to an embodiment of this application.
Figure 14D:
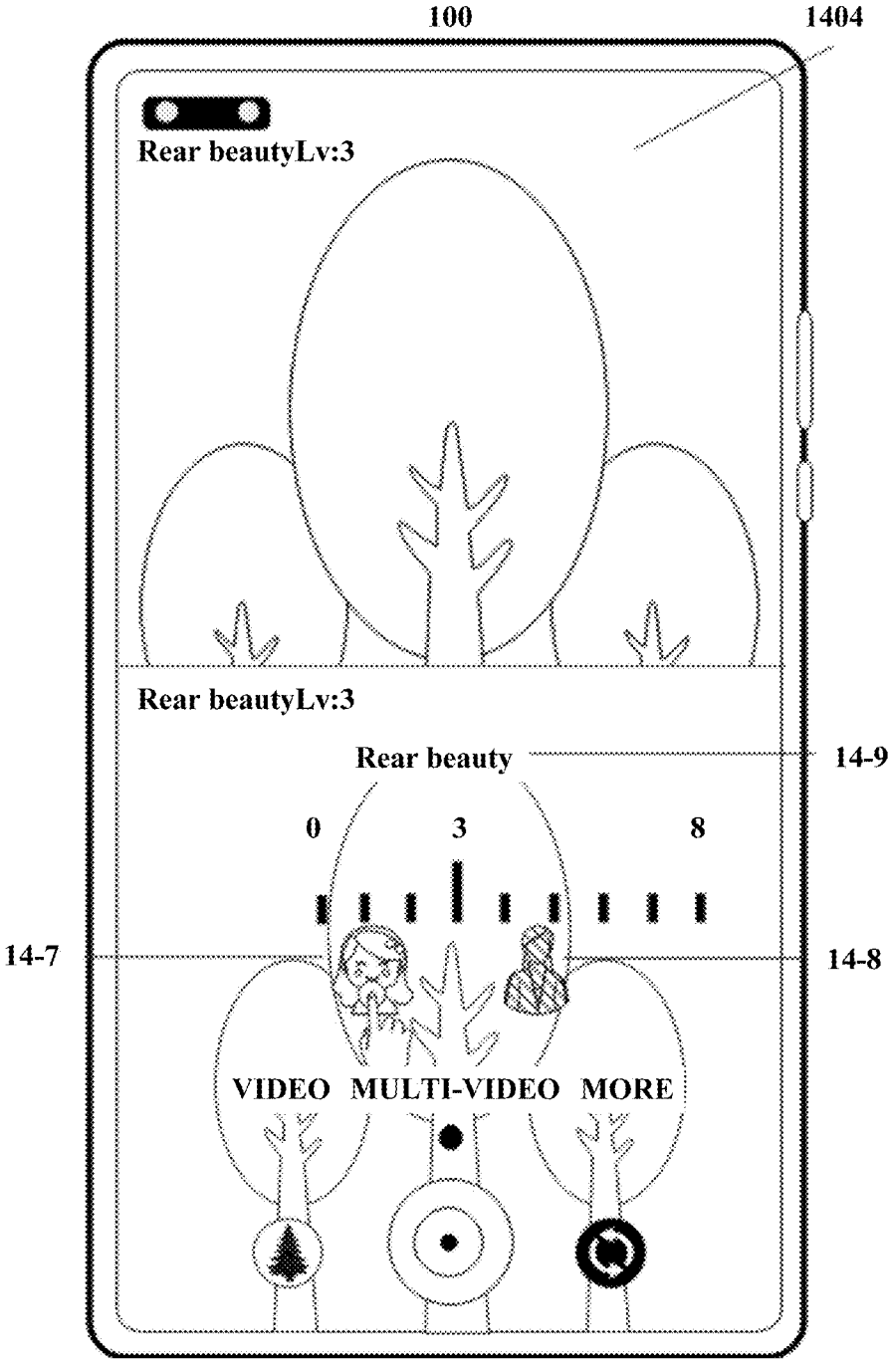
FIG. 14D is a schematic diagram of an interface of a rear-rear dual-camera mode of multi-lens video recording on a mobile phone according to an embodiment of this application.
Figure 14E:
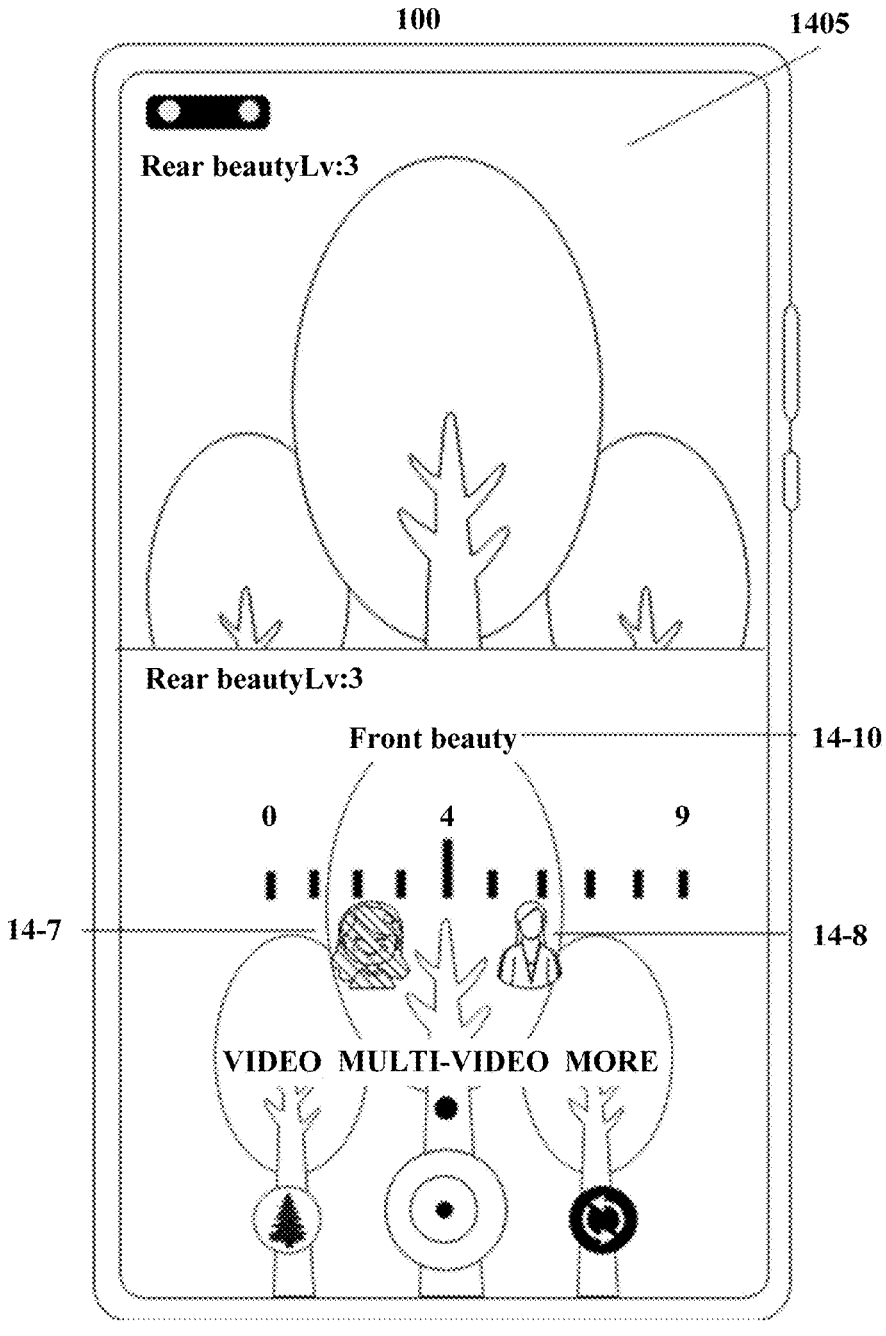
FIG. 14E is a schematic diagram of an interface of a rear-rear dual-camera mode of multi-lens video recording on a mobile phone according to an embodiment of this application.

FIG. 14C-FIG. 14E are schematic diagrams of an interface of a rear-rear dual-camera mode according to an embodiment of this application. For example, after the user taps a blank location in the camera interface 1402 or waits for preset time, the mobile phone 100 may display a camera interface 1403 shown in FIG. 14C. The preset time may be set based on an actual requirement. The camera interface 1403 includes a beauty control 14-6. The beauty control 14-6 is in an enabled state. If the user taps the beauty control 14-6, the mobile phone 100 may display a camera interface 1404 shown in FIG. 14D. The beauty control 14-6 expands into a front beauty control 14-7, a rear beauty control 14-8, and a rear configuration control 14-9. The front beauty control 14-7 is in an unselected state. The rear beauty control 14-8 is in a selected state. The rear beauty parameter value is 3. The user may configure the rear beauty parameter by adjusting the rear configuration control 14-9. If the user taps the front beauty control 14-7, the mobile phone 100 may display a camera interface 1405 shown in FIG. 14E. The camera interface 1405 includes the front beauty control 14-7, the rear beauty control 14-8, and a front configuration control 14-10. The front beauty control 14-7 is in a selected state. The rear beauty control 14-8 is in an unselected state. The front beauty parameter value is 4. The user may configure the front beauty parameter by adjusting the front configuration control 14-10. In this case, the mobile phone may perform beauty processing on two channels of video pictures of the rear-facing camera lens based on the beauty parameter value 3.

Figure 15A:
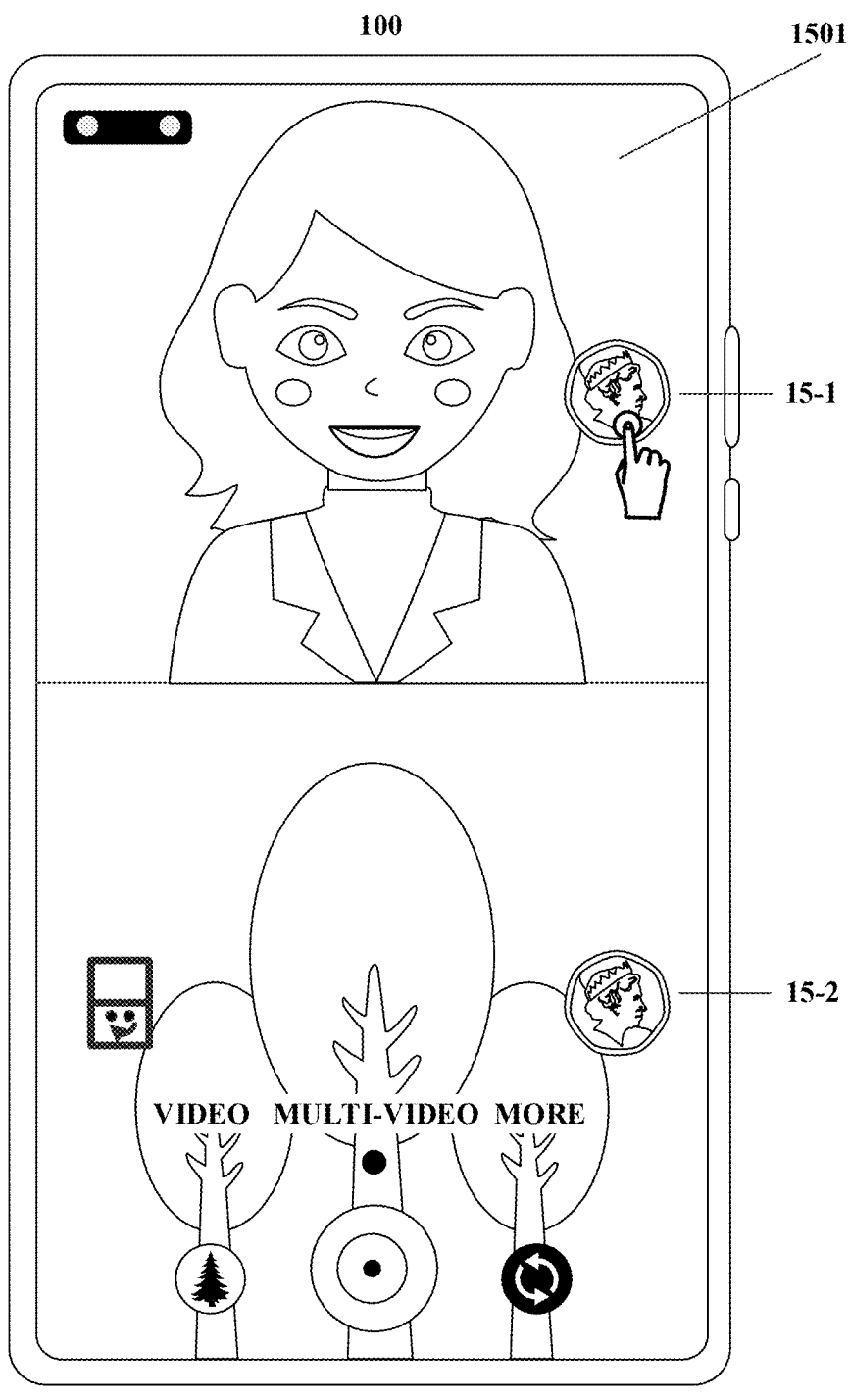
FIG. 15A is a schematic diagram of another interface of a front-rear dual-camera mode of multi-lens video recording on a mobile phone according to an embodiment of this application.
Figure 15B:
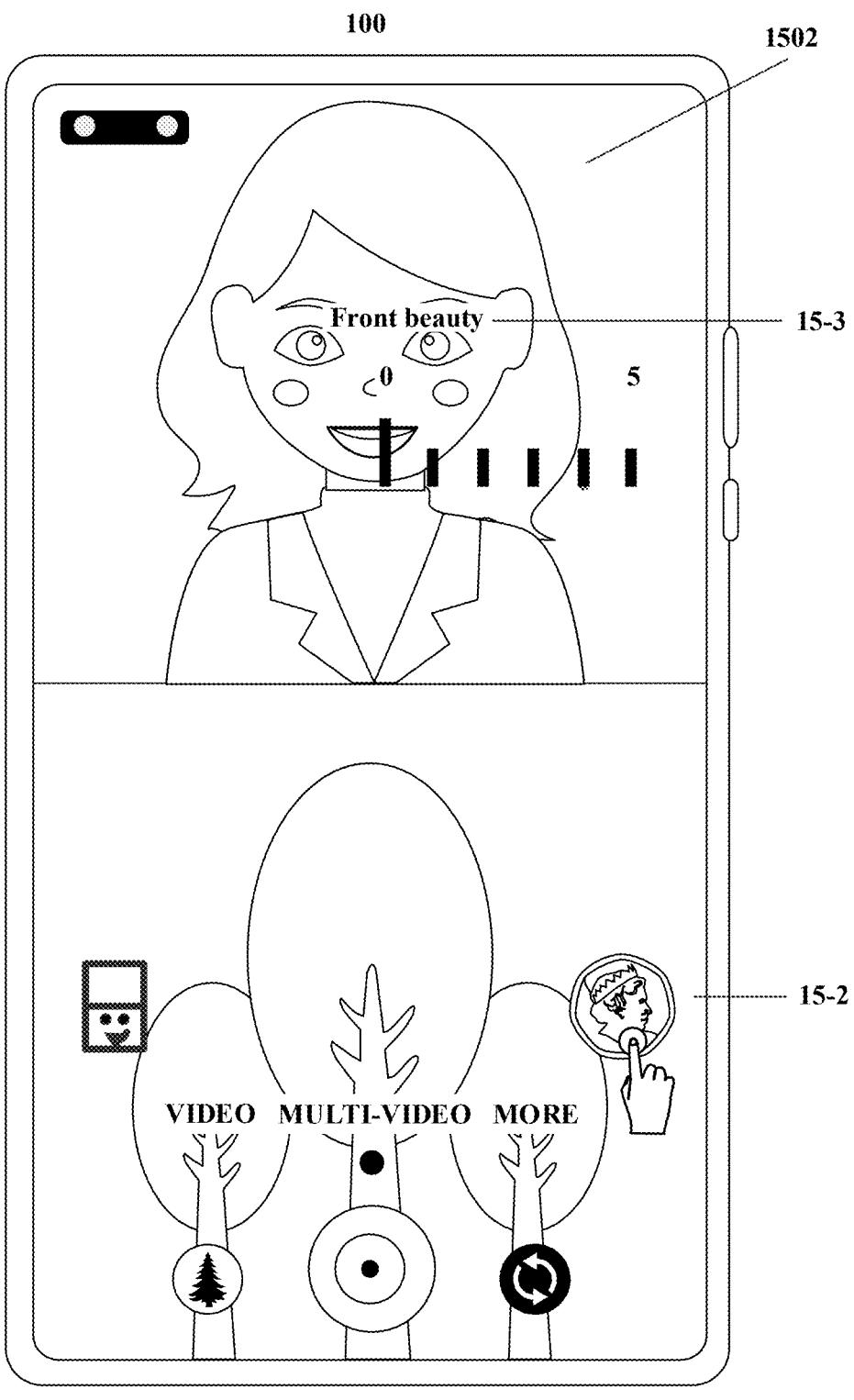
FIG. 15B is a schematic diagram of another interface of a front-rear dual-camera mode of multi-lens video recording on a mobile phone according to an embodiment of this application.
Figure 15C:
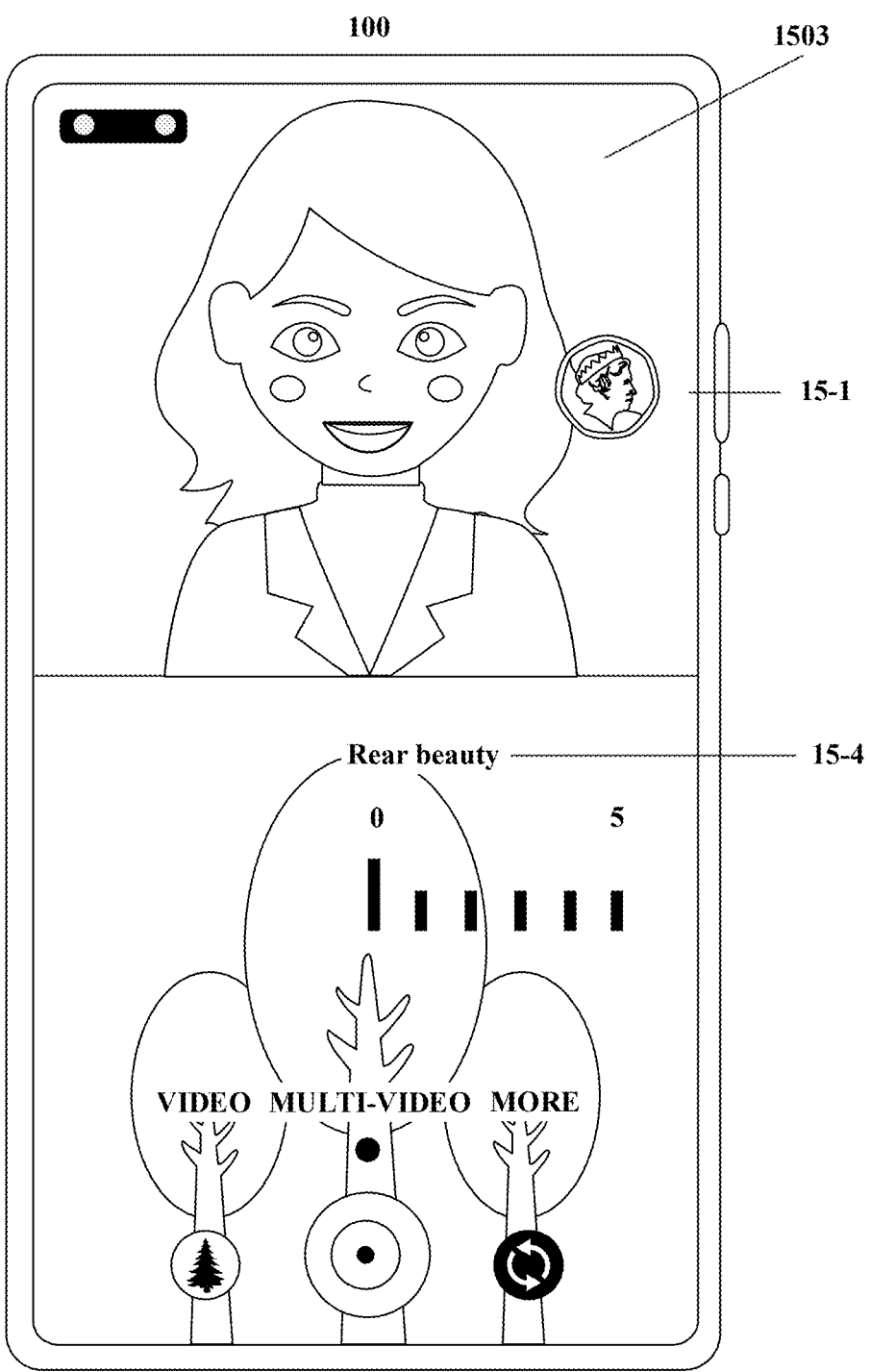
FIG. 15C is a schematic diagram of another interface of a front-rear dual-camera mode of multi-lens video recording on a mobile phone according to an embodiment of this application.

FIG. 15A-FIG. 15C are schematic diagrams of another interface of a front-rear dual-camera mode of multi-lens video recording on a mobile phone according to an embodiment of this application. For example, when the user selects a multi-lens video recording function 22 in the camera interface 202, the mobile phone 100 may display a camera interface 1501 shown in FIG. 15A. The camera interface 1501 includes a front beauty control 15-1 and a rear beauty control 15-2. The front beauty control 15-1 is in a disabled state. The rear beauty control 15-2 is in a disabled state. If the user taps the front beauty control 15-1, the mobile phone 100 may display a camera interface 1502 shown in FIG. 15B. The front beauty control 15-1 expands into a front configuration control 15-3. The user may configure the front beauty parameter by adjusting the front configuration control 15-3. Further, if the user taps the rear beauty control 15-2, the mobile phone 100 may display a camera interface 1503 shown in FIG. 15C. The rear beauty control 15-2 expands into a rear configuration control 15-4. The user may configure the rear beauty parameter by adjusting the rear configuration control 15-4.

Figure 15D:
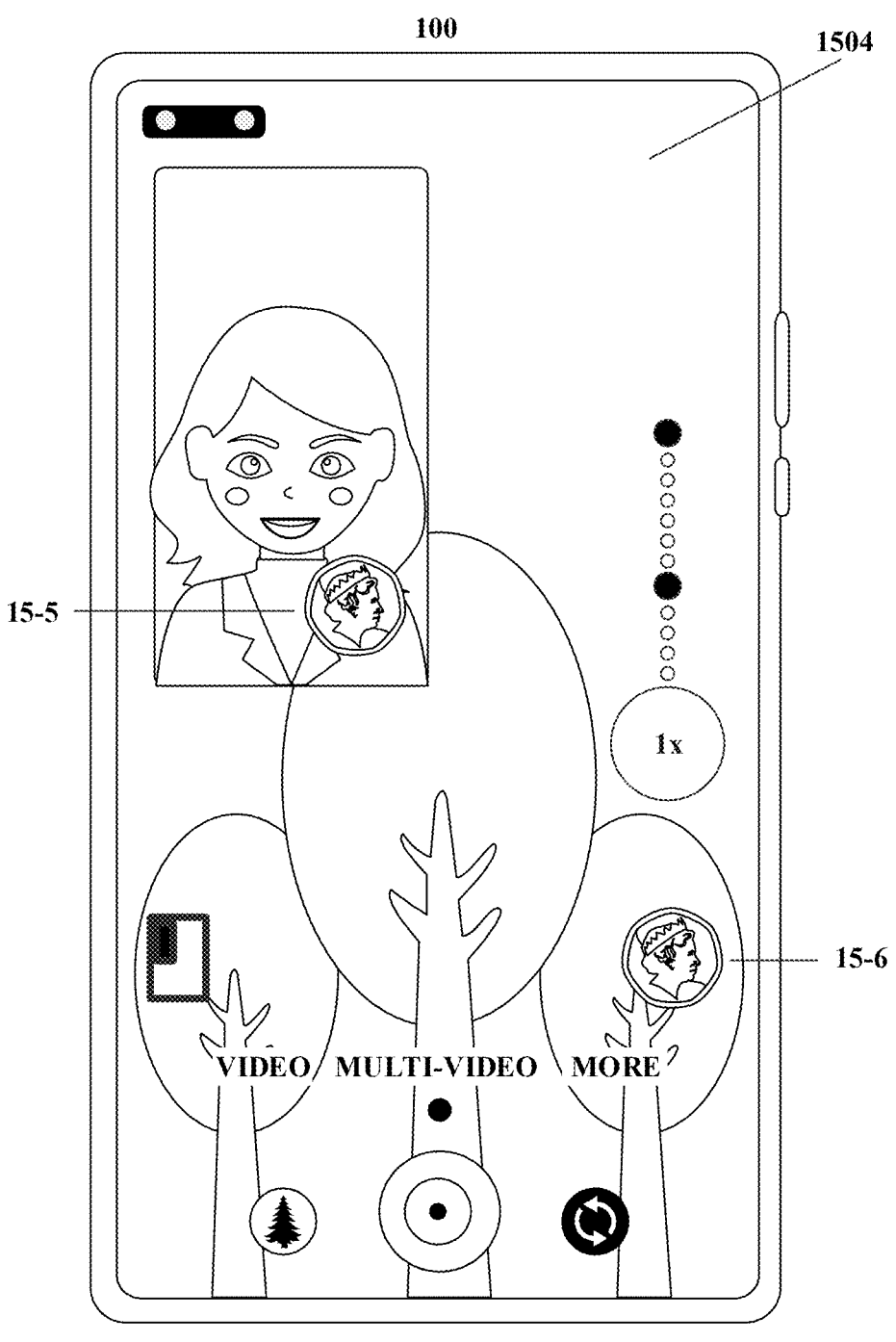
FIG. 15D is a schematic diagram of another interface of a picture-in-picture mode of multi-lens video recording on a mobile phone according to an embodiment of this application.

FIG. 15D is a schematic diagram of another interface of a picture-in-picture mode of multi-lens video recording on a mobile phone according to an embodiment of this application. For example, when the user selects a multi-lens video recording function 24 in the camera interface 202, the mobile phone 100 may display a camera interface 1504 shown in FIG. 15D. The camera interface 1504 includes a front beauty control 15-5 and a rear beauty control 15-6. The front beauty control 15-5 is in a disabled state. The rear beauty control 15-6 is in a disabled state. If the user taps the front beauty control 15-5, a front configuration control may be invoked, and the user may configure the front beauty parameter by adjusting the front configuration control. If the user taps the rear beauty control 15-6, a rear configuration control may be invoked, and the user may configure the rear beauty parameter by adjusting the rear configuration control.

Figure 15E:
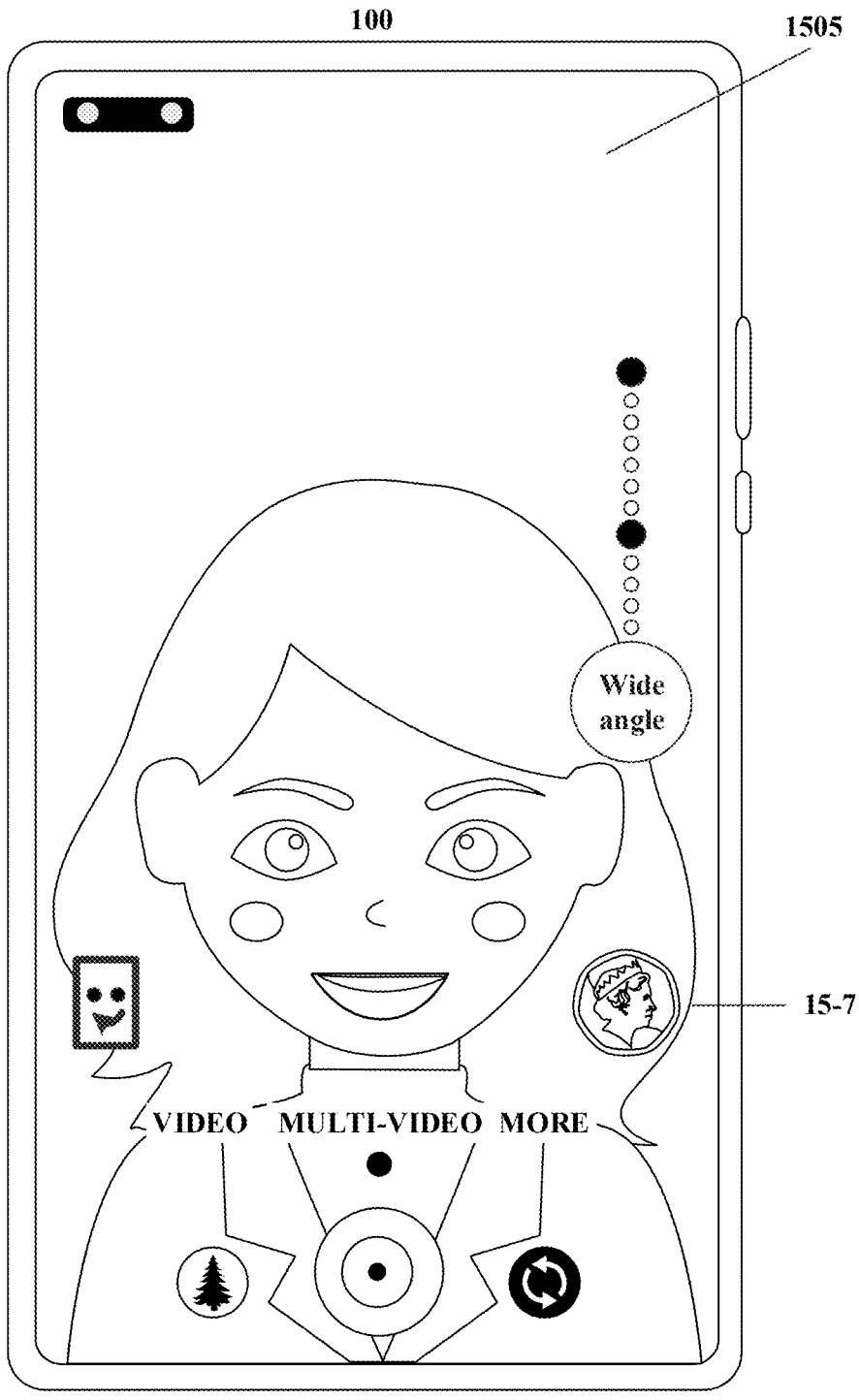
FIG. 15E is a schematic diagram of another interface of a front single-camera mode of multi-lens video recording on a mobile phone according to an embodiment of this application.

FIG. 15E is a schematic diagram of another interface of a front single-camera mode of multi-lens video recording on a mobile phone according to an embodiment of this application. For example, when the user selects a multi-lens video recording function 26 in the camera interface 202, the mobile phone 100 may display a camera interface 1505 shown in FIG. 15E. The camera interface 1505 includes a front beauty control 15-7. The front beauty control 15-7 is in a disabled state. If the user taps the front beauty control 15-7, a front configuration control may be invoked, and the user may configure the front beauty parameter by adjusting the front configuration control.

Figure 15F:
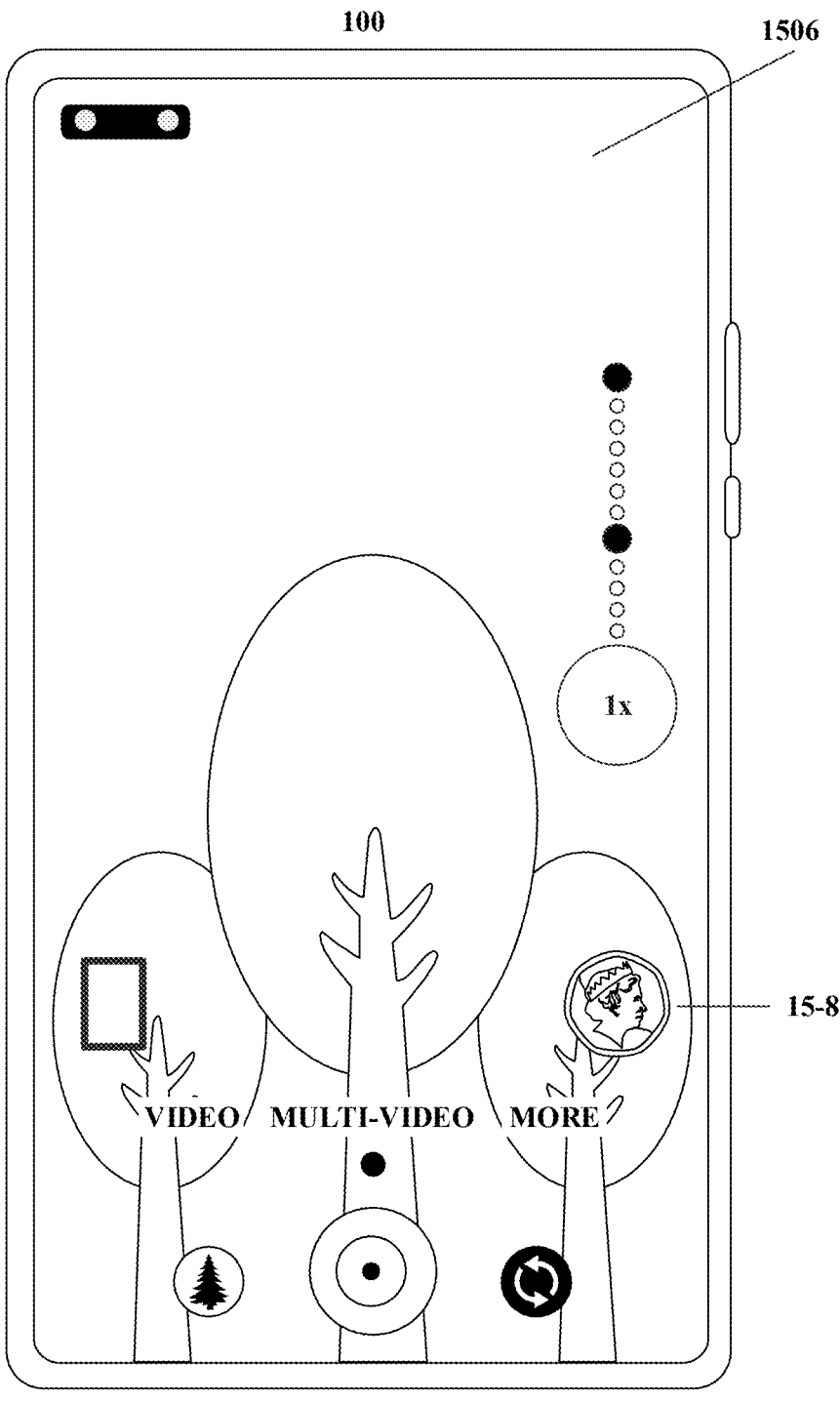
FIG. 15F is a schematic diagram of another interface of a rear single-camera mode of multi-lens video recording on a mobile phone according to an embodiment of this application.

FIG. 15F is a schematic diagram of another interface of a rear single-camera mode of multi-lens video recording on a mobile phone according to an embodiment of this application. For example, when the user selects a multi-lens video recording function 25 in the camera interface 202, the mobile phone 100 may display a camera interface 1506 shown in FIG. 15F. The camera interface 1506 includes a rear beauty control 15-8. The rear beauty control 15-8 is in a disabled state. If the user taps the rear beauty control 15-8, a rear configuration control may be invoked, and the user may configure the rear beauty parameter by adjusting the rear configuration control.

Figure 15G:
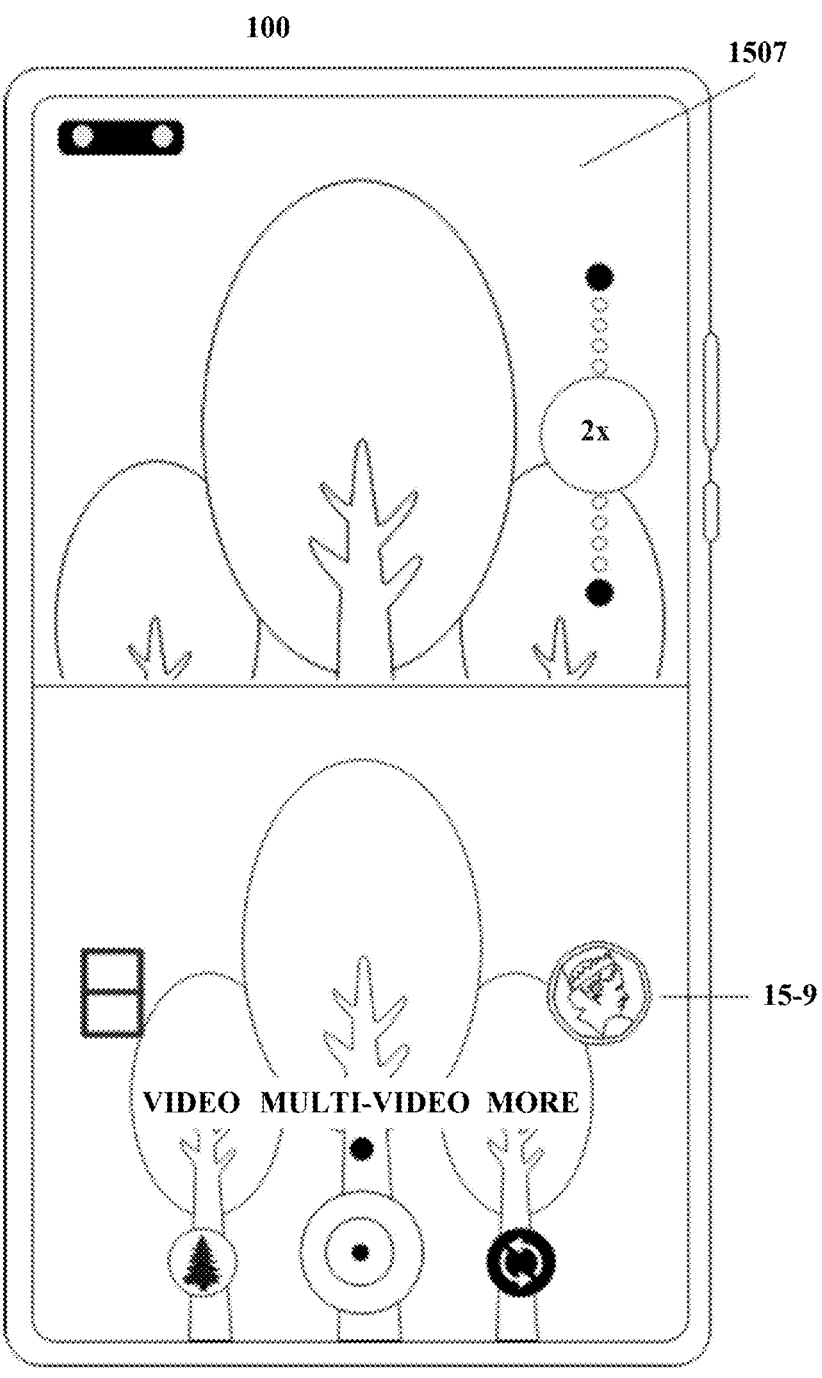
FIG. 15G is a schematic diagram of another interface of a rear-rear dual-camera mode of multi-lens video recording on a mobile phone according to an embodiment of this application.
Figure 16A:
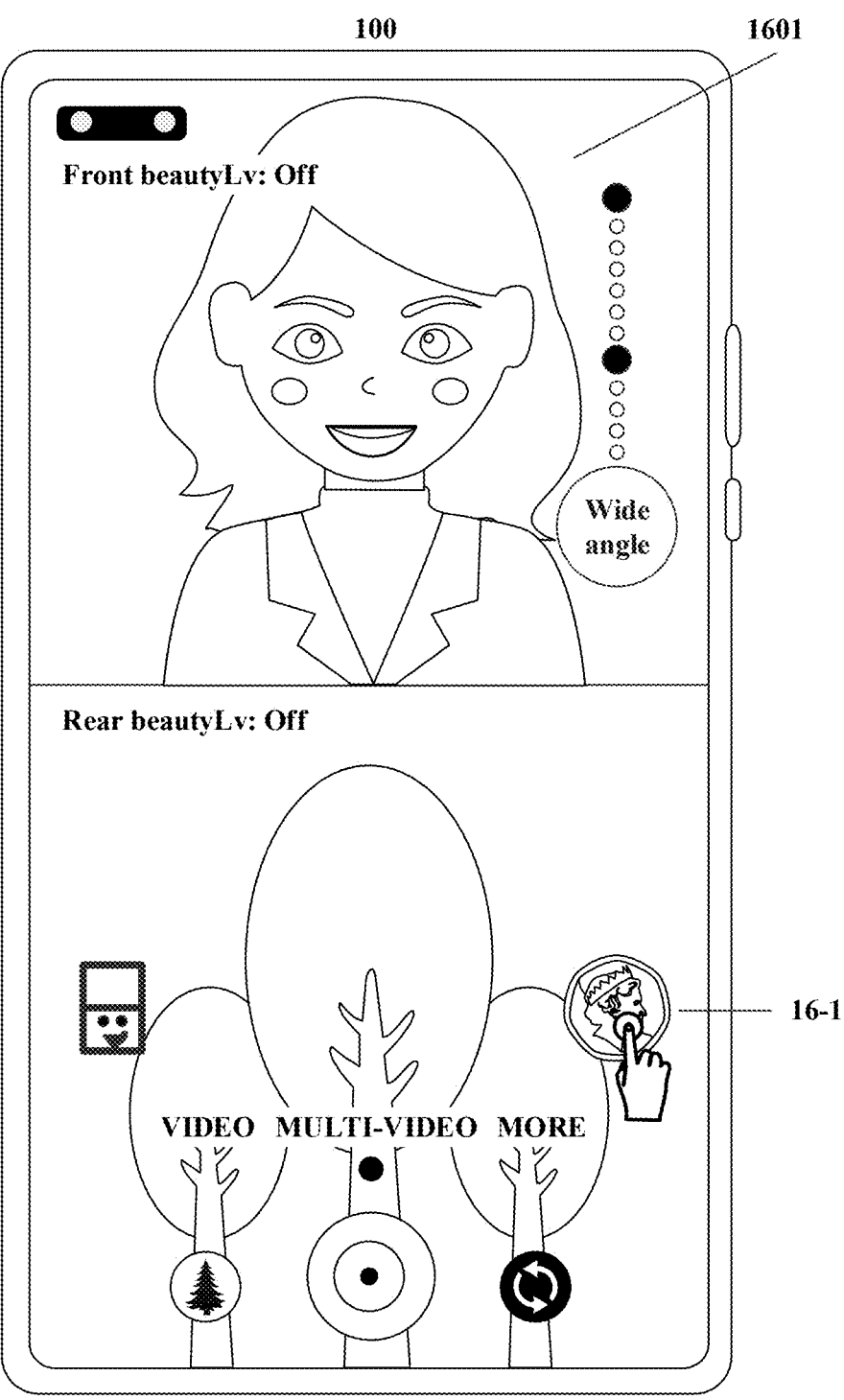
FIG. 16A is a schematic diagram of another interface of a front-rear dual-camera mode of multi-lens video recording on a mobile phone according to an embodiment of this application.
Figure 16B:
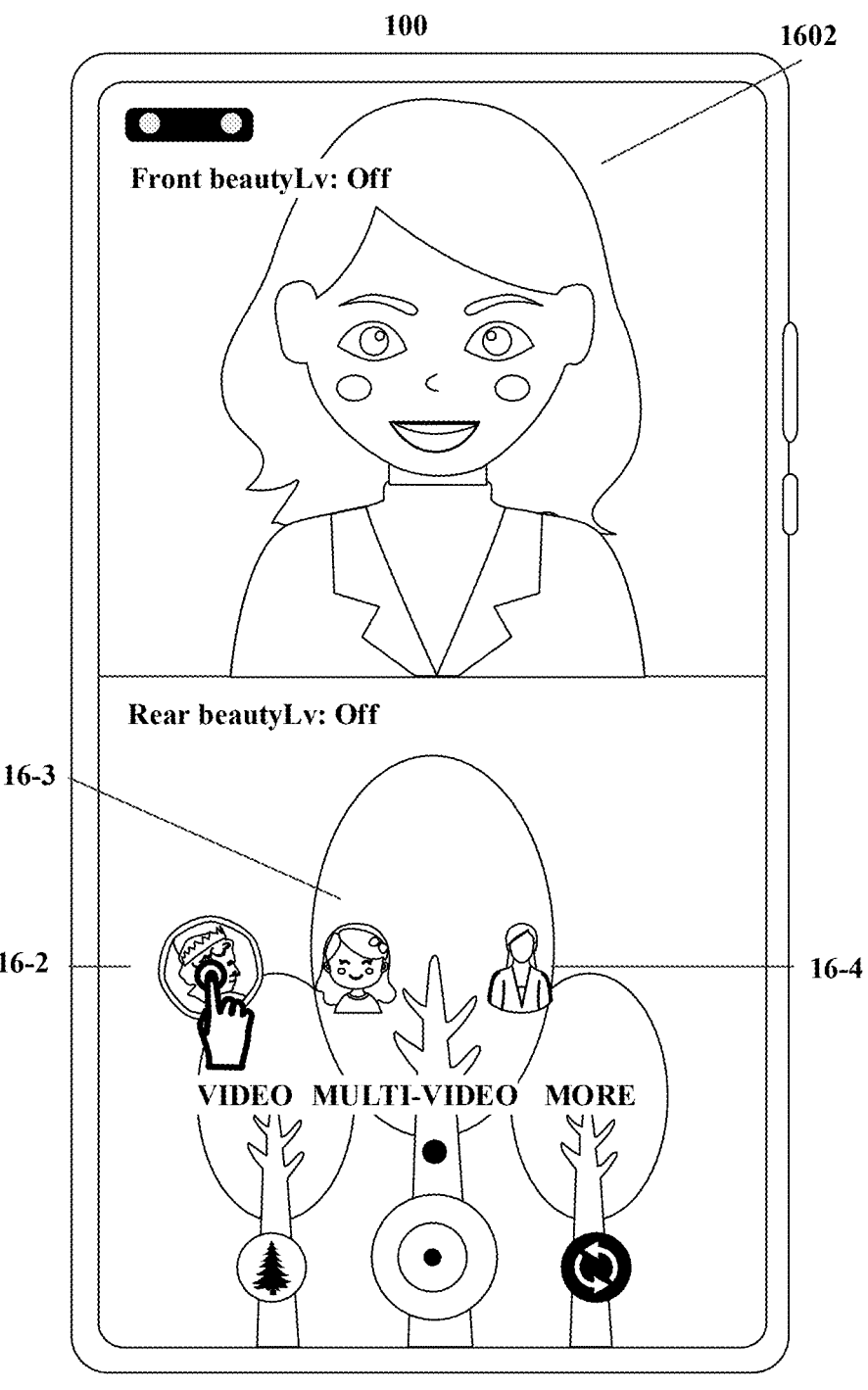
FIG. 16B is a schematic diagram of another interface of a front-rear dual-camera mode of multi-lens video recording on a mobile phone according to an embodiment of this application.
Figure 16C:
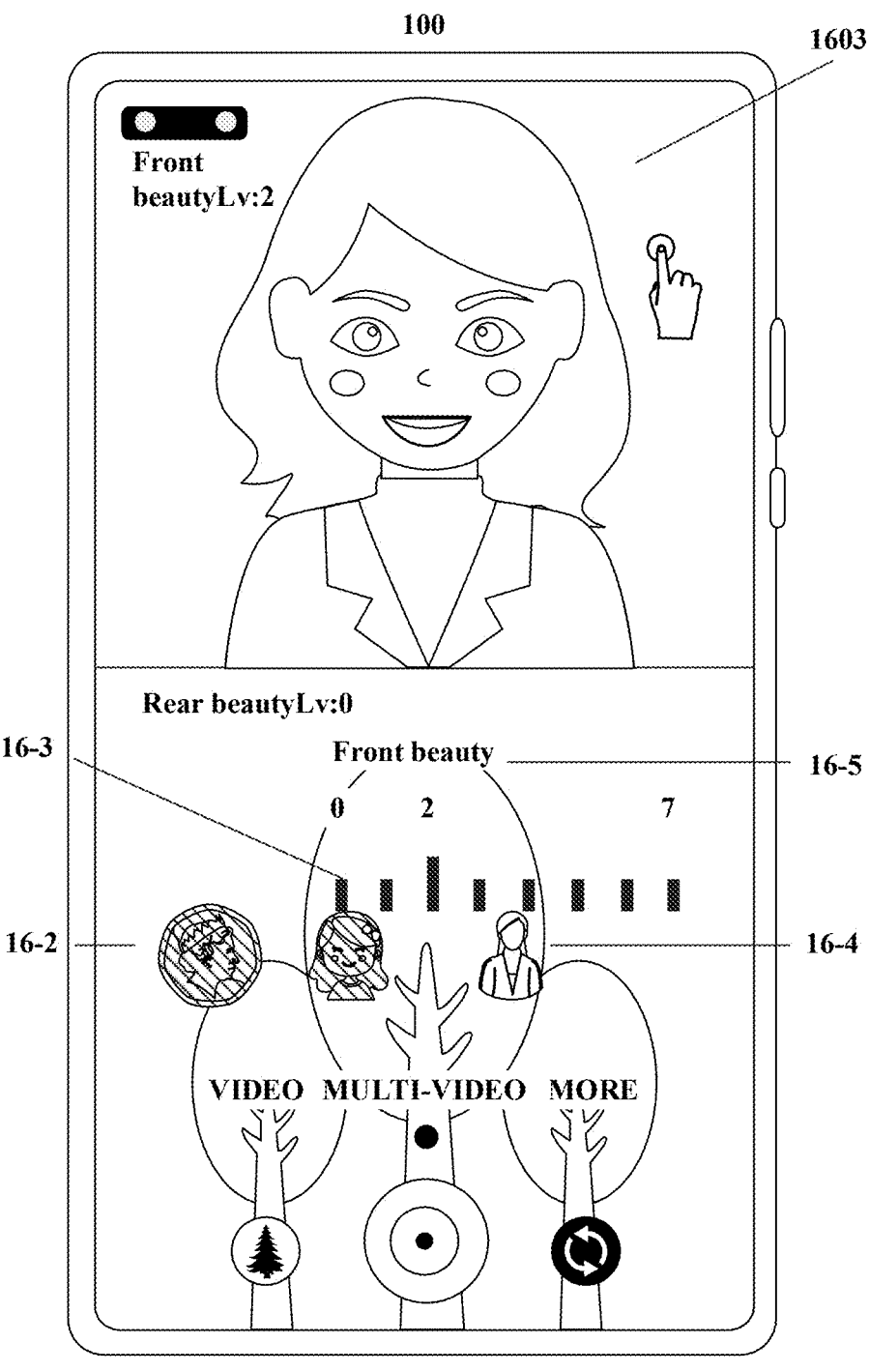
FIG. 16C is a schematic diagram of another interface of a front-rear dual-camera mode of multi-lens video recording on a mobile phone according to an embodiment of this application.
Figure 16D:
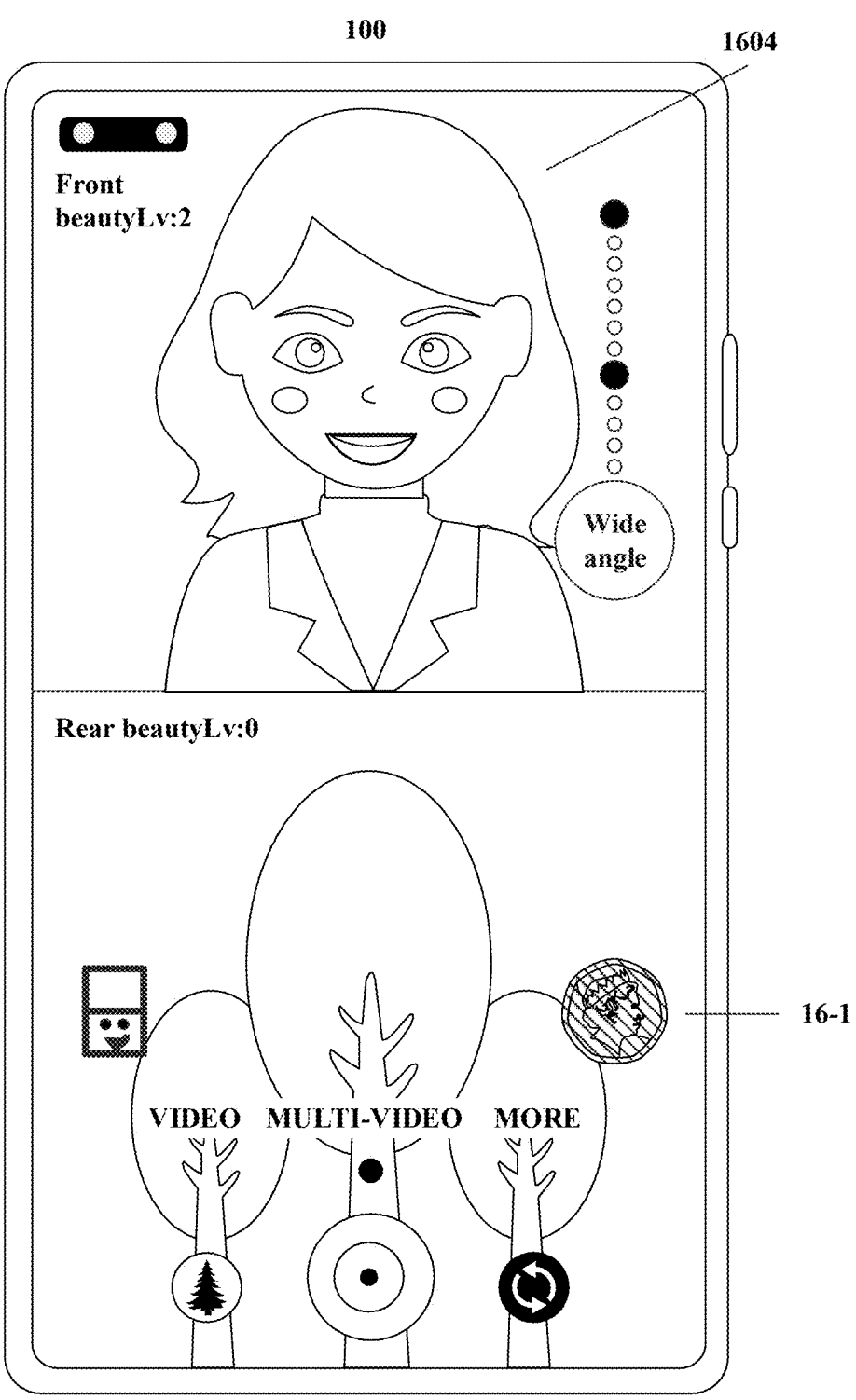
FIG. 16D is a schematic diagram of another interface of a front-rear dual-camera mode of multi-lens video recording on a mobile phone according to an embodiment of this application.

FIG. 15G is a schematic diagram of another interface of a rear-rear dual-camera mode of multi-lens video recording on a mobile phone according to an embodiment of this application. For example, when the user selects a multi-lens video recording function 23 in the camera interface 202, the mobile phone 100 may display a camera interface 1507 shown in FIG. 15G. The camera interface 1507 includes a rear beauty control 15-9. The rear beauty control 15-9 is in a disabled state. If the user taps the rear beauty control 15-9, a rear configuration control may be invoked, and the user may configure the rear beauty parameter by adjusting the rear configuration control.

According to this embodiment of this application, after the user configures the beauty parameter, regardless of whether the mobile phone 100 switches between the video recording mode and the multi-lens video recording mode, or switches between different multi-lens video recording modes, a mode obtained after switching inherits a beauty parameter configured in a previous mode. FIG. 16A-FIG. 16D are schematic diagrams of another interface of a front-rear dual-camera mode of multi-lens video recording on a mobile phone according to an embodiment of this application. For example, when the user selects a multi-lens video recording function 93 in the camera interface 903, the mobile phone 100 may display a camera interface 1601 shown in FIG. 16A. The camera interface 1601 includes a beauty control 16-1. The beauty control 16-1 is in a disabled state. If the user taps the beauty control 16-1, the mobile phone 100 may display a camera interface 1602 shown in FIG. 16B. The beauty control 16-1 expands into a beauty on/off control 16-2, a front beauty control 16-3, and a rear beauty control 16-4. The beauty on/off control 16-2 is in a disabled state. The front beauty control 16-3 is in an unselected state. The rear beauty control 16-4 is in an unselected state. The beauty on/off control 16-2 is used to control a beauty function to be enabled or disabled. If the user taps the beauty on/off control 16-2, the mobile phone 100 may display a camera interface 1603 shown in FIG. 16C. The camera interface 1603 includes the beauty on/off control 16-2, the front beauty control 16-3, the rear beauty control 16-4, and a front configuration control 16-5. The beauty on/off control 16-2 is in an enabled state. The front beauty control 16-3 is in a selected state. The rear beauty control 16-4 is in an unselected state. The front beauty parameter value is 2. The user may configure the front beauty parameter by adjusting the front configuration control 16-5. Still further, if the user taps a blank location in the camera interface 1603 or waits for preset time, the mobile phone 100 may display a camera interface 1604 shown in FIG. 16D. The preset time may be set based on an actual requirement. The camera interface 1604 includes a beauty control 16-1. The beauty control 16-1 is in an enabled state. Then, if the user taps the beauty control 16-1, the mobile phone may display a camera picture 1603 shown in FIG. 16D.

Figure 17:
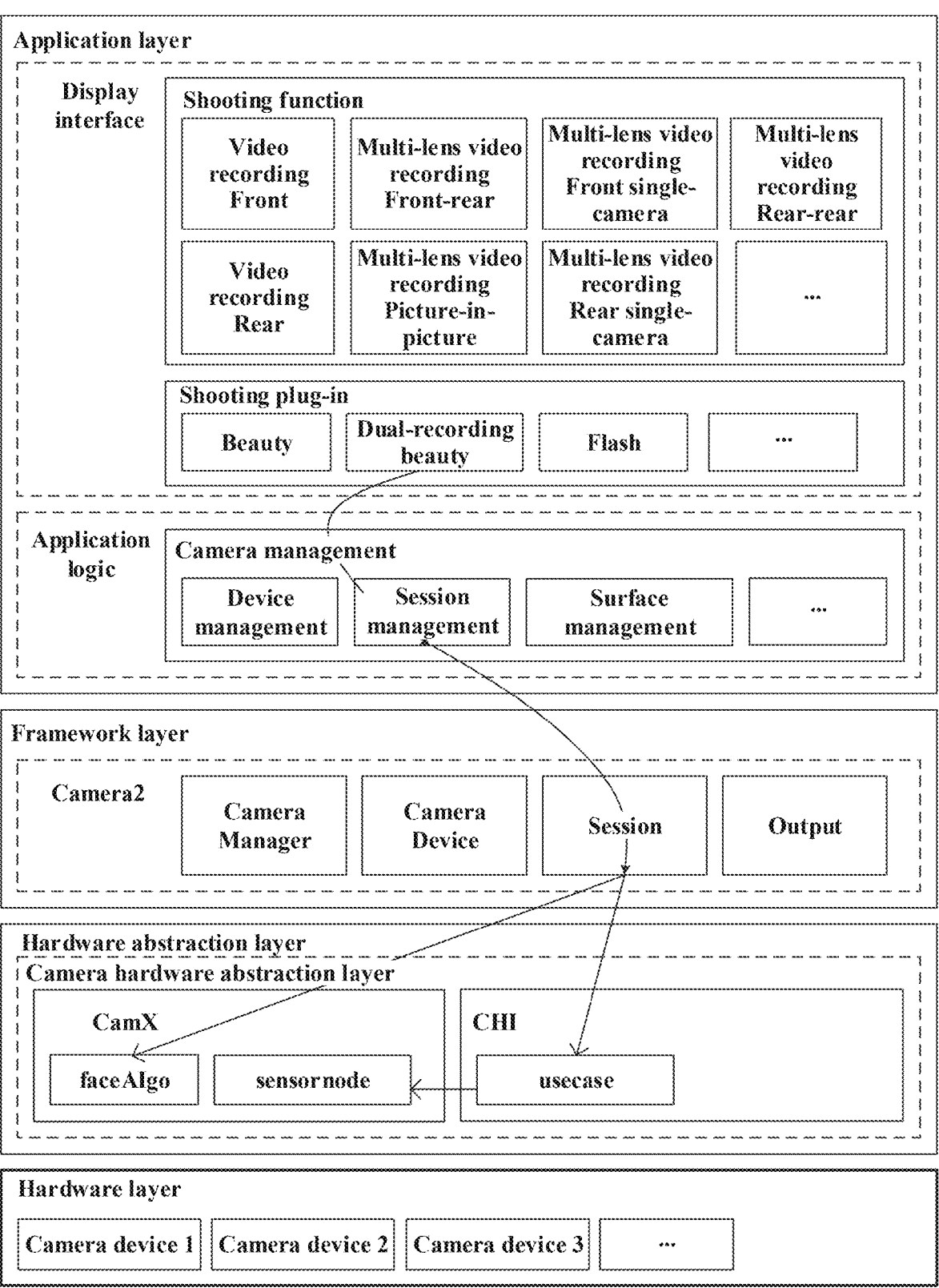
FIG. 17 is a block diagram of a software structure of an electronic device according to an embodiment of this application.

FIG. 17 is a block diagram of a software structure of an electronic device according to an embodiment of this application. The software structure of the electronic device may use a layered architecture. In this embodiment of this application, the software structure of the mobile phone 100 is described by using an Android (Android) system of a layered architecture as an example.

In the layered architecture, software is divided into several layers, and each layer has a clear role and task. The layers communicate with each other through software interfaces. In some embodiments, the Android (Android) system is divided into four layers from top to bottom: an application program layer (referred to as an application layer), an application framework layer (referred to as a framework layer), a hardware abstraction layer (hardware abstract layer, HAL), and a hardware layer.

The application layer (Application, App) may include a series of application packages. For example, the application package may include a camera application. The application layer may be further divided into a display interface (UI) and application logic.

A display interface of the camera application includes a shooting function and a shooting plug-in. The shooting function includes a front mode of video recording, a rear mode of video recording, a front-rear dual-camera mode of multi-lens video recording, a picture-in-picture mode of multi-lens video recording, front single-camera mode of multi-lens video recording, a rear single-camera mode of multi-lens video recording, a rear-rear dual-camera mode of multi-lens video recording, and the like. The shooting plug-in includes a beauty plug-in, a dual-recording beauty plug-in, and a flash plug-in.

The application logic of the camera application includes camera management. The camera management includes a device management module, a session management module, a surface management module, and the like.

The framework layer (Framework, FWK) provides an application programming interface (application programming interface, API) and a programming framework for an application at the application layer, including some predefined functions. The framework layer includes a camera access interface (Camera2 API). Camera2 API is a set of interfaces for accessing a camera lens device that is introduced by Android, and uses a pipeline design, so that a data stream flows from a camera lens to Surface. Camera2 API includes a camera manager (CameraManager), a camera device (CameraDevice), session control (Session), and an output interface (Output). CameraManager is a management class of the Camera device. Camera device information of a device may be queried by using an object of this class to obtain a CameraDevice object. CameraDevice provides a series of fixed parameters related to the Camera device, for example, basic settings and an output format.

The hardware abstraction layer (HAL) is an interface layer that is located between an operating system kernel and a hardware circuit, and is intended to abstract hardware. The hardware abstraction layer hides hardware interface details of a specific platform, provides a virtual hardware platform for an operating system, and makes the operating system hardware-independent and capable of being ported across a plurality of platforms. In FIG. 17, HAL includes a camera hardware abstraction layer (Camera HAL), and Camera HAL is deployed with CamX and CHI, where CamX represents a set of code implementations for generic functional interfaces, and CHI represents a set of code implementations for customizable requirements.

The hardware layer (HardWare, HW) is hardware located at a bottom layer of the operating system. In FIG. 17, HW includes a camera device (CameraDevice) 1, a camera device (CameraDevice) 2, a camera device (CameraDevice) 3, and the like. CameraDevice1, CameraDevice2, and CameraDevice3 may correspond to a plurality of camera lenses on the electronic device.

Based on the software architecture provided in FIG. 17, a user may select a camera application by using the display interface of the application layer, and select a multi-lens video recording function and a dual-recording beauty plug-in in a display interface of the camera application. An example in which the user selects the front-rear dual-camera mode of multi-lens video recording is used. After selecting the dual-recording beauty plug-in, the user may configure a front beauty parameter beautyLv1 and a rear beauty parameter beautyLv2. The session management module of the application layer creates session1 and session2, to separately deliver beautyLv1 and beautyLv2 to CamX and CHI of the hardware abstraction layer via the framework layer by using session1 and session2.

A faceAlgo algorithm module of CamX separately performs beauty processing on each frame of image for a corresponding video picture based on beautyLv1 and beautyLv2. In addition, usecase1 and usecase2 of CHI separately determine a currently supported frame rate based on beautyLv1 and beautyLv2, and send the determined real-time frame rate to sensornode1 and sensornode2 of CamX, so that sensornode1 and sensornode2 separately perform exposure based on the determined real-time frame rate. Correspondingly, the frame rates of the video pictures corresponding to beautyLv1 and beautyLv2 are also dynamically adjusted in real time.

The foregoing embodiment is a procedure in which the mobile phone performs beauty processing on a plurality of channels of videos (a video picture of a front-facing camera lens and a video picture of a rear-facing camera lens) in the front-rear dual-camera mode of multi-lens video recording. In addition, in the picture-in-picture mode and the rear-rear dual-camera mode of multi-lens video recording, the mobile phone also performs beauty processing by using a similar procedure.

However, in the front single-camera mode and the rear single-camera mode of multi-lens video recording, only the front beauty parameter beautyLv1 or the rear beauty parameter beautyLv2 takes effect. In this case, the session management module of the application layer creates one session to deliver beautyLv1 or beautyLv2. Correspondingly, in this case, at the hardware abstraction layer, only one sensornode in CamX and only one usecase in CHI relate to beauty processing of a video.

Compared with a conventional technology, in this application, in a multi-channel video beauty scenario, frame rates of a plurality of channels of videos are dynamically adjusted, thereby avoiding a problem that a system is stuck, a frame is lost, or a device is heating due to high system load when beauty processing is performed on the plurality of channels of videos, so that system running is more stable.

Figure 18:
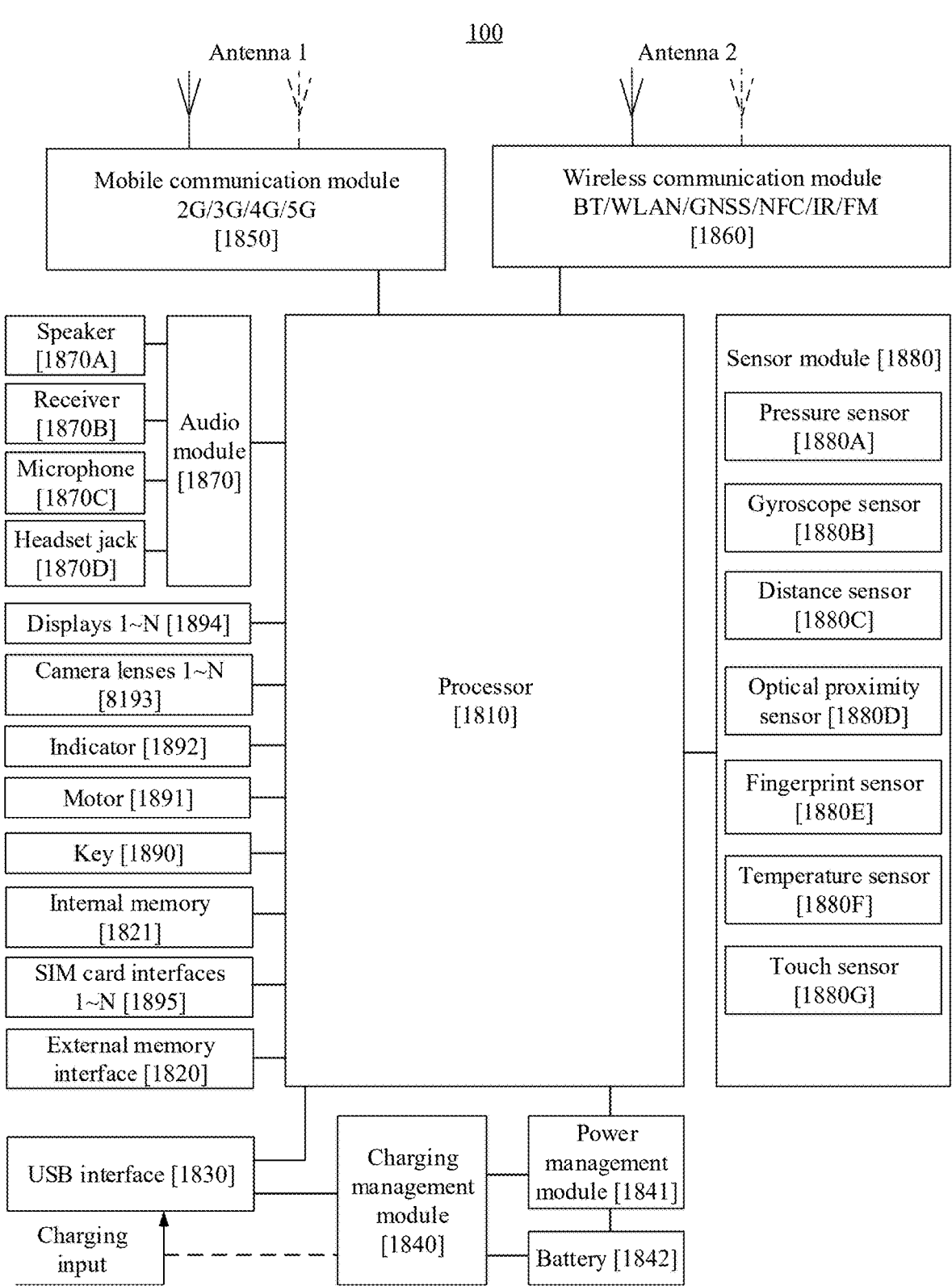
FIG. 18 is a schematic diagram of a hardware structure of a mobile phone 100 related to an embodiment of this application.

With reference to FIG. 18, the following describes a schematic diagram of a hardware structure of the mobile phone 100 that implements the foregoing method.

As shown in FIG. 18, the mobile phone 100 may include a processor 1810, an external memory interface 1820, an internal memory 1821, a universal serial bus (universal serial bus, USB) interface 1830, a charging management module 1840, a power management module 1841, a battery 1842, an antenna 1, an antenna 2, a mobile communication module 1850, a wireless communication module 1860, an audio module 1870, a speaker 1870A, a receiver 1870B, a microphone 1870C, a headset jack 1870D, a sensor module 1880, a key 1890, a motor 1891, an indicator 1892, a camera lens 1893, a display 1894, and the like. The sensor module 1880 may include a pressure sensor 1880A, a gyroscope sensor 1880B, a distance sensor 1880C, an optical proximity sensor 1880D, a fingerprint sensor 1880E, a temperature sensor 1880F, a touch sensor 1880G, and the like.

It may be understood that the structure illustrated in this embodiment of this application does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by using hardware, software, or a combination of software and hardware.

A memory may be further disposed in the processor 1810, to store instructions and data. In some embodiments, the memory in the processor 1810 is a cache memory. The memory may store instructions or data just used or cyclically used by the processor 1810. If the processor 1810 needs to use the instructions or the data again, the processor may directly invoke the instructions or the data from the memory. This avoids repeated access and reduces waiting time of the processor 1810, thereby improving system efficiency. In some embodiments of this application, the processor 1810 may be configured to implement beauty processing on a plurality of channels of video pictures of the foregoing mobile phone.

In some embodiments, the processor 1810 may include one or more interfaces. The external memory interface 1820 may be configured to be connected to an external memory, for example, a Micro SD card, to expand a storage capability of the mobile phone 100. The external memory communicates with the processor 1810 through the external memory interface 1820, to implement a data storage function. For example, the external memory 1820 stores a shot picture before a user taps a photographing button or a recording button, or stores a video obtained after the user taps a photographing button or a recording button and stops recording.

The internal memory 1821 may be configured to store computer executable program code, and the executable program code includes instructions. The internal memory 1821 may include a program storage area and a data storage area. The program storage area may store program code corresponding to the video recording setting method in this application. In this way, when the program code is executed, the mobile phone 100 can perform the video recording setting method in this application. The data storage area may store a shot picture in the video recording setting method in this application. In some embodiments, the data storage area may be divided into several logical partitions to store the foregoing image or video data in the video recording setting method in this application.

A wireless communication function of the mobile phone 100 may be implemented by using the antenna 1, the antenna 2, the mobile communication module 1850, the wireless communication module 1860, the modem processor, the baseband processor, and the like.

The antenna 1 and the antenna 2 are configured to transmit and receive electromagnetic wave signals. The mobile communication module 1850 may provide a solution for wireless communication that is applied to the mobile phone 100 and that includes 2G/3G/4G/5G and the like. The wireless communication module 1860 may provide a solution for wireless communication that is applied to the mobile phone 100 and that includes a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like.

The touch sensor 1880G may be disposed on the display 1894. The touch sensor 1880G and the display 1894 form a touchscreen, which is also referred to as a "touch control screen". The touch sensor 1880G is configured to detect a touch operation performed on or near the touch sensor. The touch sensor may transmit the detected touch operation to the application processor to determine a type of a touch event. In some embodiments, a visual output related to the touch operation may be provided by using the display 1894. In some other embodiments, the touch sensor 1880G may alternatively be disposed on a surface of the mobile phone 100, and is at a location different from that of the display 1894. This is not limited in this application.

An embodiment of this application further provides an electronic device. The electronic device includes at least one processor, a memory, and a computer program stored in the memory and capable of running on the at least one processor. When executing the computer program, the processor implements the steps in any one of the foregoing method embodiments.

An embodiment of this application further provides a computer-readable storage medium. The computer-readable storage medium stores a computer program, and when the computer program is executed by a processor, the steps in the foregoing method embodiments may be implemented.

An embodiment of this application provides a computer program product. When the computer program product runs on a mobile terminal, the mobile terminal is enabled to implement steps in the foregoing method embodiments.

In this application, all or a part of the procedures in the methods in the foregoing embodiments may be implemented by a computer program instructing related hardware. The computer program may be stored in a computer-readable storage medium. When the computer program is executed by a processor, the steps in the foregoing method embodiments may be implemented. The computer program includes computer program code, and the computer program code may be in a source code form, an object code form, an executable file, some intermediate forms, or the like. The computer-readable medium may include at least any entity or apparatus capable of adding computer program code to a photographing apparatus/terminal device, a recording medium, a computer memory, a read-only memory (read-only memory, ROM), a random access memory (random access memory, RAM), an electrical carrier signal, a telecommunications signal, and a software distribution medium, for example, a USB flash drive, a removable hard disk, a magnetic disk, or an optical disc. In some jurisdictions, the computer-readable medium cannot be an electrical carrier signal or a telecommunications signal according to legislation and patent practice.

In the foregoing embodiments, the descriptions of the embodiments have respective focuses. For a part that is not detailed or described in an embodiment, refer to related descriptions in other embodiments.

Persons of ordinary skill in the art may be aware that the units and the algorithm steps in the examples described with reference to the embodiments disclosed in this specification can be implemented by using electronic hardware or a combination of computer software and electronic hardware. Whether these functions are performed by hardware or software depends on specific applications and design constraints of the technical solutions. Persons skilled in the art may use different methods to implement the described functions for each specific application, but it should not be considered that such an implementation goes beyond the scope of this application.

It should be understood that when being used in this specification and the appended claims of this application, the term "include" indicates presence of a described feature, entirety, step, operation, element, and/or component, but does not rule out presence or addition of one or more other features, entireties, steps, operations, elements, components, and/or sets thereof.

The foregoing embodiments are merely used to describe the technical solutions of this application, instead of limiting the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in embodiments of this application, and shall fall within the protection scope of this application.

The invention claimed is:

1. A video recording setting method, applied to an electronic device comprising a front-facing camera lens and a rear-facing camera lens, wherein the method comprises:

displaying, by the electronic device, a first video picture, a second video picture, and a first control, wherein the first video picture is a video picture collected in real time by the front-facing camera lens, the second video picture is a video picture collected in real time by the rear-facing camera lens, the first video picture has a first beauty effect, and the second video picture has a second beauty effect;

displaying, by the electronic device, a second control, a third control, and a fourth control in response to a first user operation performed on the first control, wherein the second control is displayed in a selected state, the third control is displayed in an unselected state, and the first video picture has a third beauty effect in response to a second user operation performed on the fourth control;

stopping displaying, by the electronic device, the first video picture in response to a third user operation; and displaying, by the electronic device, the second control, the third control, and a fifth control in response to a fourth user operation performed on the first control, wherein the second control is displayed in an unselected state, the third control is displayed in a selected state, and the second video picture has a fourth beauty effect in response to a fifth user operation performed on the fifth control.

2. The method according to claim 1, wherein the method further comprises:

adjusting, by the electronic device, a frame rate of the first video picture in response to the second user operation performed on the fourth control; and adjusting, by the electronic device, a frame rate of the second video picture in response to the fifth user operation performed on the fifth control.

3. The method according to claim 1, after the stopping displaying, by the electronic device, the first video picture in response to a third user operation, further comprising:

adjusting, by the electronic device, a display ratio of the second video picture.

4. The method according to claim 1, wherein before the electronic device receives the third user operation, the method further comprises:

in response to a sixth user operation performed on the third control, stopping displaying, by the electronic device, the fourth control, displaying the fifth control, displaying the second control in an unselected state, and displaying the third control in a selected state, wherein the second video picture has a fifth beauty effect in response to a seventh user operation performed on the fifth control.

5. The method according to claim 1, wherein before the electronic device receives the fifth user operation, the method further comprises:

in response to an eighth user operation performed on the second control, stopping displaying, by the electronic device, the fifth control, displaying the fourth control, displaying the second control in a selected state, and displaying the third control in an unselected state; and in response to a ninth user operation performed on the fourth control, storing, by the electronic device, a sixth beauty effect that is set by a user.

6. The method according to claim 5, wherein after in response to a ninth user operation performed on the fourth control, the method further comprises:

displaying, by the electronic device, a third video picture in response to a tenth user operation, wherein the third video picture is a video picture collected in real time by the front-facing camera lens, and the third video picture has the sixth beauty effect.

7. The method according to claim 6, wherein after the displaying, by the electronic device, a third video picture in response to a tenth user operation, the method further comprises:

stopping displaying, by the electronic device, the second video picture.

8. A video recording setting method, applied to an electronic device comprising a front-facing camera lens and a rear-facing camera lens, wherein the method comprises:

displaying, by the electronic device, a first video picture, a second video picture, a second control, and a third control, wherein the first video picture is a video picture collected in real time by the front-facing camera lens, the second video picture is a video picture collected in real time by the rear-facing camera lens, the first video picture has a first beauty effect, and the second video picture has a second beauty effect;

in response to an eleventh user operation performed on the second control, stopping displaying, by the electronic device, the second control, and displaying a fourth control, wherein the first video picture has a third beauty effect in response to a twelfth user operation performed on the fourth control; and in response to a thirteenth user operation performed on the third control, stopping displaying, by the electronic device, the third control, and displaying the second control and a fifth control, wherein the second video picture has a fourth beauty effect in response to a fourteenth user operation performed on the fifth control.

9. The method according to claim 8, wherein the method further comprises:

adjusting, by the electronic device, a frame rate of the first video picture in response to the twelfth user operation performed on the fourth control; and adjusting, by the electronic device, a frame rate of the second video picture in response to the fourteenth user operation performed on the fifth control.

10. The method according to claim 8, wherein before the electronic device receives the eleventh user operation, the method further comprises:

stopping displaying, by the electronic device, the first video picture and the second control in response to a fifteenth user operation; and in response to a sixteenth user operation performed on the third control, stopping displaying, by the electronic device, the third control, and displaying the fifth control, wherein the second video picture has a fifth beauty effect in response to a seventeenth user operation performed on the fifth control.

11. An electronic device, comprising one or more processors, a memory, and one or more computer programs, wherein the one or more computer programs are stored in the memory, the one or more computer programs comprise instructions, and when the instructions are executed by the electronic device, the electronic device is enabled to perform:

displaying, by the electronic device, a first video picture, a second video picture, and a first control, wherein the first video picture is a video picture collected in real time by a front-facing camera lens, the second video picture is a video picture collected in real time by a rear-facing camera lens, the first video picture has a first beauty effect, and the second video picture has a second beauty effect;

displaying, by the electronic device, a second control, a third control, and a fourth control in response to a first user operation performed on the first control, wherein the second control is displayed in a selected state, the third control is displayed in an unselected state, and the first video picture has a third beauty effect in response to a second user operation performed on the fourth control;

stopping displaying, by the electronic device, the first video picture in response to a third user operation; and displaying, by the electronic device, the second control, the third control, and a fifth control in response to a fourth user operation performed on the first control, wherein the second control is displayed in an unselected state, the third control is displayed in a selected state, and the second video picture has a fourth beauty effect in response to a fifth user operation performed on the fifth control.

12. The electronic device according to claim 11, wherein the electronic device is further enabled to perform:

adjusting, by the electronic device, a frame rate of the first video picture in response to the second user operation performed on the fourth control; and adjusting, by the electronic device, a frame rate of the second video picture in response to the fifth user operation performed on the fifth control.

13. The electronic device according to claim 11, after the stopping displaying, by the electronic device, the first video picture in response to a third user operation, further comprising:

adjusting, by the electronic device, a display ratio of the second video picture.

14. The electronic device according to claim 11, wherein before the electronic device receives the third user operation, wherein the electronic device is further enabled to perform:

in response to a sixth user operation performed on the third control, stopping displaying, by the electronic device, the fourth control, displaying the fifth control, displaying the second control in an unselected state, and displaying the third control in a selected state, wherein the second video picture has a fifth beauty effect in response to a seventh user operation performed on the fifth control.

15. The electronic device according to claim 11, wherein before the electronic device receives the fifth user operation, wherein the electronic device is further enabled to perform:

in response to an eighth user operation performed on the second control, stopping displaying, by the electronic device, the fifth control, displaying the fourth control, displaying the second control in a selected state, and displaying the third control in an unselected state; and in response to a ninth user operation performed on the fourth control, storing, by the electronic device, a sixth beauty effect that is set by a user.

16. The electronic device according to claim 15, wherein after in response to a ninth user operation performed on the fourth control, wherein the electronic device is further enabled to perform:

displaying, by the electronic device, a third video picture in response to a tenth user operation, wherein the third video picture is a video picture collected in real time by the front-facing camera lens, and the third video picture has the sixth beauty effect.

17. The electronic device according to claim 16, wherein after the displaying, by the electronic device, a third video picture in response to a tenth user operation, wherein the electronic device is further enabled to perform:

stopping displaying, by the electronic device, the second video picture.

* * * * *